US012478334B2

(12) United States Patent
Yoshikawa et al.

(10) Patent No.: US 12,478,334 B2
(45) Date of Patent: Nov. 25, 2025

(54) X-RAY IMAGING APPARATUS

(71) Applicant: J.MORITA MANUFACTURING CORPORATION, Kyoto (JP)

(72) Inventors: Hideki Yoshikawa, Kyoto (JP); Masanori Otsuka, Kyoto (JP); Yoshito Sugihara, Kyoto (JP)

(73) Assignee: J.MORITA MANUFACTURING CORPORATION, Kyoto (JP)

( * ) Notice: Subject to any disclaimer, the term of this patent is extended or adjusted under 35 U.S.C. 154(b) by 267 days.

(21) Appl. No.: 18/251,131

(22) PCT Filed: Oct. 25, 2021

(86) PCT No.: PCT/JP2021/039275
§ 371 (c)(1),
(2) Date: Apr. 28, 2023

(87) PCT Pub. No.: WO2022/092017
PCT Pub. Date: May 5, 2022

(65) Prior Publication Data
US 2024/0008826 A1    Jan. 11, 2024

(30) Foreign Application Priority Data

Nov. 2, 2020   (JP) ................................. 2020-183733

(51) Int. Cl.
*A61B 6/04*         (2006.01)
*A61B 6/00*         (2024.01)
(Continued)

(52) U.S. Cl.
CPC ............ *A61B 6/0407* (2013.01); *A61B 6/032* (2013.01); *A61B 6/107* (2013.01); *A61B 6/4085* (2013.01);
(Continued)

(58) Field of Classification Search
CPC ....... A61B 6/4452; A61B 6/501; A61B 6/032; A61B 6/06; A61B 6/51; A61B 6/4085;
(Continued)

(56) References Cited

U.S. PATENT DOCUMENTS 6,493,415 B1 * 12/2002 Arai .......................... A61B 6/51
378/38
RE48,415 E * 2/2021 Yoshikawa .......... A61B 6/5223
(Continued)

FOREIGN PATENT DOCUMENTS

JP       2001-54515 A     2/2001
JP       2007-144136 A    6/2007
(Continued)

OTHER PUBLICATIONS

English translation of International Preliminary Report on Patentability and Written Opinion issued May 11, 2023 in PCT/JP2021/039275, 7 pages.

(Continued)

*Primary Examiner* — Irakli Kiknadze
(74) *Attorney, Agent, or Firm* — Oblon, McClelland, Maier & Neustadt, L.L.P.

(57) ABSTRACT

An X-ray detection unit includes an X-ray detector that receives and detects the X-ray beam transmitted through the head. The support supports the X-ray generation unit and the X-ray detection unit. A drive mechanism moves the support such that the X-ray generation unit and the X-ray detection unit turn about an axis extending in a direction parallel to an apparatus vertical direction and around the head. An X-ray generation source moving unit moves the X-ray generation source in the apparatus vertical direction. The X-ray imaging apparatus increases a spread in the apparatus vertical direction of the X-ray beam when the X-ray generation source is located on an apparatus upper side, and decreases a spread (Continued)

in the apparatus vertical direction of the X-ray beam when the X-ray generation source is located on an apparatus lower side.

17 Claims, 45 Drawing Sheets

(51) Int. Cl.
    *A61B 6/03*     (2006.01)
    *A61B 6/10*     (2006.01)
    *A61B 6/40*     (2024.01)
    *A61B 6/50*     (2024.01)

(52) U.S. Cl.
    CPC .......... *A61B 6/4441* (2013.01); *A61B 6/4476* (2013.01); *A61B 6/501* (2013.01)

(58) Field of Classification Search
    CPC ..... A61B 6/0407; A61B 6/4476; A61B 6/107; A61B 6/4021; A61B 6/4441; A61B 6/04; A61B 6/4435; A61B 6/542; A61B 6/035; A61B 6/08; A61B 6/102; A61B 6/544; A61B 6/588; A61B 6/589; A61B 6/4225; A61B 6/54; A61B 6/5282; A61B 6/4028; A61B 6/42; A61B 6/5205; A61B 6/40; A61B 6/4275; A61B 6/405; A61B 6/0487; A61B 6/14; A61B 6/587; A61B 6/0421; A61B 6/5223; A61B 6/469; A61B 6/512; A61B 6/0478; A61B 6/547; A61B 6/5241; H01J 35/1017; G01N 23/04; G21K 5/02; G21K 5/04

USPC ...................................... 378/4, 19, 38, 39, 62
See application file for complete search history.

(56) References Cited

U.S. PATENT DOCUMENTS

| | | | |
|---|---|---|---|
| 2011/0222646 A1 | 9/2011 | Suzuki et al. | |
| 2014/0126687 A1* | 5/2014 | Yoshikawa | .......... A61B 6/4441 378/39 |
| 2014/0254745 A1* | 9/2014 | Nakai | .................... A61B 6/545 378/62 |
| 2019/0059842 A1 | 2/2019 | Sugihara et al. | |
| 2021/0161486 A1 | 6/2021 | Giani et al. | |

FOREIGN PATENT DOCUMENTS

| | | |
|---|---|---|
| JP | 4777130 B2 | 9/2011 |
| JP | 2011-206534 A | 10/2011 |
| JP | 2014-94091 A | 5/2014 |
| JP | 2019-37393 A | 3/2019 |
| WO | WO 2020/025778 A1 | 2/2020 |

OTHER PUBLICATIONS

Extended European Search Report issued Sep. 9, 2024, in corresponding European Patent Application No. 21886135.9, 8 pages.
International Search Report issued Dec. 28, 2021 in PCT/JP2021/039275 filed on Oct. 25, 2021, 2 pages.
Japanese Office Action issued Jan. 24, 2023 in Japanese Application No. 2020-183733, 7 pages (with Machine Generated English Translation).

* cited by examiner

X-RAY IMAGING APPARATUS

TECHNICAL FIELD

The present invention relates to an X-ray imaging apparatus.

BACKGROUND ART

Patent Document 1 describes a technique related to an X-ray imaging apparatus. Patent Document 2 describes a technique related to an X-ray tube.

PRIOR ART DOCUMENTS

Patent Documents

Patent Document 1: Japanese Patent Application Laid-Open No. 2001-54515
Patent Document 2: Japanese Patent No. 4777130

SUMMARY

Problems to be Solved by the Invention

An X-ray detection unit that detects an X-ray beam transmitted through a subject is provided in the X-ray imaging apparatus. Depending on a position and range of an imaging target region in the subject, sometimes a distance between the X-ray detection unit and the subject is increased in order to prevent the X-ray detection unit from coming into contact with the subject. When the distance between the X-ray detection unit and the subject is increased, a magnification ratio in the X-ray imaging is increased. As a result, imaging resolution is decreased.

Therefore, an object of the present invention is to provide a technique capable of improving the imaging resolution.

Means to Solve the Problem

In order to solve the above problem, an X-ray imaging apparatus according to a first aspect includes: a subject holder that holds a head of a subject; an X-ray generation unit that includes an X-ray generation source generating an X-ray and an X-ray beam forming unit forming the X-ray into an X-ray beam, the X-ray generation unit irradiating the head held by the subject holder with the X-ray beam; an X-ray detection unit that includes an X-ray detector receiving and detecting the X-ray beam transmitted through the head; a support that supports the X-ray generation unit and the X-ray detection unit such that the X-ray generation unit and the X-ray detection unit are opposite to each other with the head interposed therebetween; a drive mechanism that relatively moves the support with respect to the subject while the head is sandwiched between the X-ray generation unit and the X-ray detection unit; and an X-ray generation source moving unit that moves the X-ray generation source with respect to the X-ray detector. When an apparatus vertical direction is determined such that an upper side of the head is determined as an apparatus upper side while a lower side of the head is determined as an apparatus lower side, the drive mechanism moves the support such that the X-ray generation unit and the X-ray detection unit turn around an axis extending in a direction parallel to the apparatus vertical direction and around the head, and the X-ray generation source moving unit relatively moves the X-ray generation source with respect to the X-ray detector in the apparatus vertical direction, and is configured to increase a spread in the apparatus vertical direction of the X-ray beam when the X-ray generation source is located on the apparatus upper side, and to decrease a spread in the apparatus vertical direction of the X-ray beam when the X-ray generation source is located on the apparatus lower side.

A second aspect is the X-ray imaging apparatus according to the first aspect, in which the X-ray generation unit includes a first extending unit that accommodates the X-ray generation source and extends from the support to the apparatus lower side, the X-ray detection unit includes a second extending a unit that accommodates the X-ray detector and extends from the support to the apparatus lower side, and the X-ray generation source moving unit moves the X-ray generation source in the apparatus vertical direction in the first extending unit.

A third aspect is the X-ray imaging apparatus according to the second aspect, in which a bottom portion of the X-ray detector is disposed at a bottom portion of the second extending unit.

A fourth aspect is the X-ray imaging apparatus of the third aspect, in which a detection surface of the X-ray detector includes an irradiation region irradiated with the X-ray beam, and the X-ray beam forming unit sets a position of an end of the X-ray beam on the apparatus upper side in the irradiation region when a spread in the apparatus vertical direction of the X-ray beam is small to a position lower than that when a spread in the apparatus vertical direction of the X-ray beam is large.

A fifth aspect is the X-ray imaging apparatus of the fourth aspect, in which the X-ray beam forming unit sets a position of an end of the X-ray beam on the apparatus lower side in the irradiation region when a spread in the apparatus vertical direction of the X-ray beam is small to the same position as that when a spread in the apparatus vertical direction of the X-ray beam is large.

A sixth aspect is the X-ray imaging apparatus according to any one of the first to fifth aspects, in which the X-ray beam forming unit includes a shielding unit that partially shields the X-ray generated from the X-ray generation source to form a passage region, the X-ray passing through the passage region is formed in the X-ray beam, and according to the movement of the X-ray generation source toward the apparatus upper side by the X-ray generation source moving unit, the X-ray beam forming unit drives the shielding unit to increase the spread in the apparatus vertical direction of the passage region, thereby increasing the spread in the apparatus vertical direction of the X-ray beam.

A seventh aspect is the X-ray imaging apparatus according to any one of the first to sixth aspects, in which the X-ray beam is an X-ray cone beam, and the X-ray CT imaging is performed by irradiating the head with the X-ray cone beam while the X-ray generation unit and the X-ray detection unit are turned.

An eighth aspect is the X-ray imaging apparatus according to the seventh aspect, in which a focal point of the X-ray generation source turns around the head according to turning of the X-ray generation unit and the X-ray detection unit, a turning plane is formed by a turning orbit of the focal point, and the X-ray beam forming unit forms the X-ray cone beam such that an X-ray component on the turning plane is included in an X-ray flux incident on the detection surface of the X-ray detector from the focal point.

A ninth aspect is the X-ray imaging apparatus of the eighth aspect, in which the X-ray beam forming unit forms the X-ray cone beam such that a center beam of the X-ray cone beam is parallel to the turning plane.

According to a tenth aspect, in the X-ray imaging apparatus of any one of the 7 to 9 aspects, in which when an axial direction of an axis extending in a direction parallel to the apparatus vertical direction is set to a vertical direction, the X-ray beam fondling unit regulates the X-ray such that a center beam of the X-ray cone beam passes in a plane orthogonal to the vertical direction, thereby performing horizontal irradiation of the X-ray cone beam.

An eleventh aspect is the X-ray imaging apparatus according to any one of the first to tenth aspects, in which the X-ray generation source moving unit is configured to move the X-ray generation source close to and away from the X-ray detector, a distance between the X-ray generation source and the X-ray detector is set small when the X-ray generation source is located on the apparatus upper side, and a distance between the X-ray generation source and the X-ray detector is large when the X-ray generation source is located on the apparatus lower side.

A twelfth aspect is the X-ray imaging apparatus according to any one of the first to eleventh aspects, in which the X-ray generation source includes a cathode and an anode that are opposite to each other, the anode includes an inclined surface inclined with respect to an axis line connecting the cathode and the anode, the X-ray is emitted lateral to the axis line from the inclined surface, and the X-ray generation unit includes the X-ray generation source such that one of the cathode and the anode is disposed on the apparatus upper side while the other of the cathode and the anode is disposed on the apparatus lower side, and such that an emission direction of the X-ray emitted from the inclined surface is directed to the X-ray detector.

A thirteenth aspect is the X-ray imaging apparatus of the twelfth aspect, in which the X-ray generation unit includes the X-ray generation source such that the cathode is disposed on the apparatus upper side and such that the anode is disposed on the apparatus lower side.

A fourteenth aspect is the X-ray imaging apparatus of the twelfth or thirteenth aspect, in which when a direction orthogonal to the apparatus vertical direction is set to an apparatus horizontal direction, the X-ray generation source moving unit drives the X-ray generation source such that an apparent size of a focal point of the X-ray generation source viewed in the apparatus horizontal direction from the X-ray detector side becomes large in the apparatus vertical direction when the spread in the apparatus vertical direction of an imaging target region in the head is large, and drives the X-ray generation source such that the apparent size of the focal point viewed in the apparatus horizontal direction from the X-ray detector side becomes small in the apparatus vertical direction when the spread in the apparatus vertical direction of the imaging target region is small.

A fifteenth aspect is the X-ray imaging apparatus according to any one of the twelfth to fourteenth aspects, in which the X-ray beam is an X-ray cone beam, and the X-ray generation source moving unit drives the X-ray generation source such that an angle formed by the axis line and a center beam of the X-ray cone beam decreases according to an expansion of the spread in the apparatus vertical direction of the X-ray beam according to the movement of the X-ray generation source toward the apparatus upper side by the X-ray generation source moving unit.

A sixteenth aspect is the X-ray imaging apparatus according to any one of the first to fifteenth aspects, in which the drive mechanism relatively changes a position of the support with respect to the head according to at least one of a position and a range of an imaging target region in the head.

A seventeenth aspect is the X-ray imaging apparatus according to any one of the first to sixteenth aspects, in which the X-ray generation source moving unit moves the X-ray generation source according to at least one of the position and the range of the imaging target region in the head to change a position of a focal point of the X-ray generation source.

An eighteenth aspect is the X-ray imaging apparatus according to any one of the first to seventeenth aspects further including an X-ray detection unit moving unit that moves the X-ray detection unit close to and away from the X-ray generation unit.

A nineteenth aspect is the X-ray imaging apparatus according to any one of the first to eighteenth aspects, in which a magnification ratio is changed in the X-ray imaging by approaching and separating at least one of the X-ray detector and the X-ray generation source to and from the head.

Effects of the Invention

According to the first aspect, the spread of the X-ray beam in the vertical direction of the apparatus is large when the X-ray generation source is located on the apparatus upper side, and the spread of the X-ray beam in the apparatus vertical direction is small when the X-ray generation source is located on the apparatus lower side. Consequently, there is a high possibility that the X-ray imaging can be executed without moving the X-ray detection unit to the apparatus lower side or without moving the X-ray detection unit to the apparatus lower side much in both the small imaging target region and the large imaging target region. Accordingly, the possibility that the necessity of increasing the distance between the X-ray detection unit and the head can be reduced in order to prevent the X-ray detection unit from coming into contact with the subject due to the movement of the X-ray detection unit to the apparatus lower side. As a result, the imaging resolution can be improved.

According to the second aspect, the X-ray generation source moving unit moves the X-ray generation source in the apparatus vertical direction in the first extending unit. Consequently, the first extending unit can be prevented from coming into contact with the subject due to the movement in the apparatus vertical direction of the X-ray generation source.

According to the third aspect, the bottom portion of the X-ray detector is disposed at the bottom portion of the second extension, so that the X-ray detection unit can be brought close to the head of the subject. Consequently, a magnification ratio in the X-ray imaging can be decreased. As a result, the imaging resolution can be improved.

According to the fourth aspect, the X-ray beam forming unit sets a position of an end of the X-ray beam on the apparatus upper side in the irradiation region when the spread in the apparatus vertical direction of the X-ray beam is small to a position lower than that when the spread in the apparatus vertical direction of the X-ray beam is large. Consequently, a high possibility that the X-ray imaging can be executed without moving the X-ray detection unit to the apparatus lower side or without moving the X-ray detection unit to the apparatus lower side much is further increased in both the small imaging target region and the large imaging target region. Accordingly, the possibility that the necessity of increasing the distance between the X-ray detection unit and the head can be further reduced in order to prevent the X-ray detection unit from coming into contact with the subject due to the movement of the X-ray detection unit to the apparatus lower side. As a result, the imaging resolution can be improved.

According to the fifth aspect, X-ray beam forming unit sets a position of an end of the X-ray beam on the apparatus lower side in the irradiation region when the spread in the apparatus vertical direction of the X-ray beam is small to the same position as that when the spread in the apparatus vertical direction of the X-ray beam is large. Consequently, a high possibility that the X-ray imaging can be executed without moving the X-ray detection unit to the apparatus lower side or without moving the X-ray detection unit to the apparatus lower side much is further increased in both the small imaging target region and the large imaging target region. Accordingly, the possibility that the necessity of increasing the distance between the X-ray detection unit and the head can be further reduced in order to prevent the X-ray detection unit from coming into contact with the subject due to the movement of the X-ray detection unit to the apparatus lower side. As a result, the imaging resolution can be improved.

According to the sixth aspect, the X-ray beam forming unit drives the shielding unit to increase the spread in the apparatus vertical direction of the passage region according to the movement of the X-ray generation source toward the apparatus upper side by the X-ray generation source moving unit, whereby the spread in the apparatus vertical direction of the X-ray beam increases. Consequently, the spread in the apparatus vertical direction of the X-ray beam can be easily adjusted using the shielding portion.

According to the seventh aspect, the X-ray CT imaging is performed by irradiating the head with the X-ray cone beam While the X-ray generation unit and the X-ray detection Unit are turning, so that a high-resolution X-ray CT image can be obtained.

According to the eighth aspect, the X-ray beam forming unit forms the X-ray cone beam such that the X-ray component on the turning plane in which the focal point turns is included in the X-ray flux incident on the detection surface of the X-ray detector from the focal point of the X-ray generation source. Consequently, the X-ray CT image can be reconstructed using a plurality of X-ray components transmitted through the head from the opposite directions during the turning of the X-ray detection unit and the X-ray generation unit. As a result, the resolution of the X-ray CT image can be improved.

According to the ninth aspect, the X-ray beam forming unit forms the X-ray cone beam such that the center beam of the X-ray cone beam is parallel to the turning plane of the focal point of the X-rays generation source. Consequently, the direction in which the center beam of the X-ray cone beam emitted from the X-ray generation unit at a certain position travels and the direction in which the center beam of the X-ray cone beam emitted from the X-ray generation unit at a position opposite to the certain position travels are opposite to each other during the turning of the X-ray detection unit and the X-ray generation unit. The resolution of the X-ray CT image can be improved by performing the X-ray CT imaging using the X-ray cone beam.

According to the tenth aspect, the X-ray beam forming unit regulates the X-ray such that the center beam of the X-ray cone beam passes in the plane orthogonal to the vertical direction, whereby the horizontal irradiation of the X-ray cone beam is performed. Consequently, the direction in which the center beam of the X-ray cone beam emitted from the X-ray generation unit at a certain position travels and the direction in which the center beam of the X-ray cone beam emitted from the X-ray generation unit at a position opposite to the certain position travels are opposite to each other during the turning of the X-ray detection unit and the X-ray generation unit. The resolution of the X-ray CT image can be improved by performing the X-ray CT imaging using the X-ray cone beam.

According to the eleventh aspect, the distance between the X-ray generation source and the X-ray detector is small when the X-ray generation source is located on the apparatus upper side, and the distance between the X-ray generation source and the X-ray detector is large when the X-ray generation source is located on the apparatus lower side. Consequently, the magnification ratio can be reduced when the spread in the apparatus vertical direction of the X-ray beam is small. Accordingly, the resolution of the X-ray imaging can be improved when the imaging target region in the head is small.

According to the twelfth aspect, in the case where a part to be observed in detail in if head is unevenly distributed at any position in the apparatus vertical direction within the range of the X-ray irradiation field, the X-ray of a good radiation quality having the small apparent focal size on the anode side included in the X-ray beam can be emitted toward the unevenly distributed site, so that the quality of the X-ray image of the region of interest can be improved.

According to the thirteenth aspect, the X-ray generation unit includes the X-ray generating source such that the cathode is disposed on the apparatus upper side and such that the anode is disposed on the apparatus lower side. Intensity on the anode side is relatively large in an intensity distribution of the X-ray beam on the detection surface of the X-ray detector, and the X-ray on the anode side of the X-ray beam received on the detection surface has the good radiation quality with the small apparent focal size, the resolution of the X-ray imaging with respect to the lower portion of the head can be improved by disposing the anode on the apparatus lower side.

According to the fourteenth aspect, when the X-ray generation source moving unit has the large spread in the apparatus vertical direction of the imaging target region in the head, the X-ray generation source is driven such that the apparent size of the focal point of the X-ray generation source viewed from the X-ray detector side in the apparatus horizontal direction is large in the apparatus vertical direction. The spread of the X-ray generated by the X-ray generation source is large when the apparent size of the focal point of the X-ray generation source is large, so that the X-ray generation unit can appropriately emit the X-ray beam in which the spread in the apparatus vertical direction is large when the spread in the apparatus vertical direction of the imaging target region is large. The X-ray generation source moving unit drives the X-ray generation source such that the apparent size of the focal point viewed in the apparatus horizontal direction from the X-ray detector side becomes small in the apparatus vertical direction when the spread in the apparatus vertical direction of the imaging target region is small. The resolution of the X-ray imaging can be improved when the apparent size of the focal point is small, so that the resolution of the X-ray imaging can be improved when the spread in the apparatus vertical direction of the imaging target region is small.

According to the fifteenth aspect, the X-ray generation source moving unit drives the X-ray generation source such that the angle formed between the axis line connecting the cathode and the anode of the X-ray generation source and the center beam of the X-ray cone beam decreases according to the expansion of the spread in the apparatus vertical direction of the X-ray beam according to the movement of the X-ray generation source to the apparatus upper side of the X-ray generation source by the X-ray generation source moving unit. Consequently, the apparent size of the focal point viewed in the apparatus horizontal direction from the X-ray detector side can be increased according to the expansion of the spread in the apparatus vertical direction of the X-ray beam. In other words, the apparent size of the focal point viewed in the apparatus horizontal direction from the X-ray detector side can be decreased according to the reduction of the spread in the apparatus vertical direction of the X-ray beam. Accordingly, the resolution of the X-ray imaging can be improved when the spread of the imaging target region in the apparatus vertical direction is small.

According to the sixteenth aspect, the drive mechanism relatively changes the position of the support with respect to the head according to at least one of the position and the range of the imaging target region in the head. Consequently, the positions of the X-ray detection unit and the X-ray generation unit can be changed to appropriate positions according to at least one of the position and the range of the imaging target region in the head.

According to the seventeenth aspect, the X-ray generation source moving unit changes the position of the point of the X-ray generation source by moving the X-ray generation source according to at least one of the position and the range of the imaging target region in the head. Consequently, the position of the focal point of the X-ray generation source can be changed to an appropriate position according to at least one of the position and the range of the imaging target region.

According to the eighteenth aspect, X-ray imaging apparatus further includes the X-ray detection unit moving unit that brings the X-ray detection unit close to and away from the X-ray generation unit. Consequently, the magnification ratio in the X-ray imaging can be adjusted by bringing the X-ray detection unit close to and away from the X-ray generation unit.

According to the nineteenth aspect, the magnification ratio in the X-ray imaging is changed by approaching and separating at least one of the X-ray detector and the X-ray generation source to and from the head. Consequently, the imaging resolution can be easily changed by approaching and separating at least one of the X-ray detector and the X-ray generation source to and from the head.

DESCRIPTION OF EMBODIMENT

<Entire Configuration Example of X-Ray Imaging Apparatus>

Figure 1:
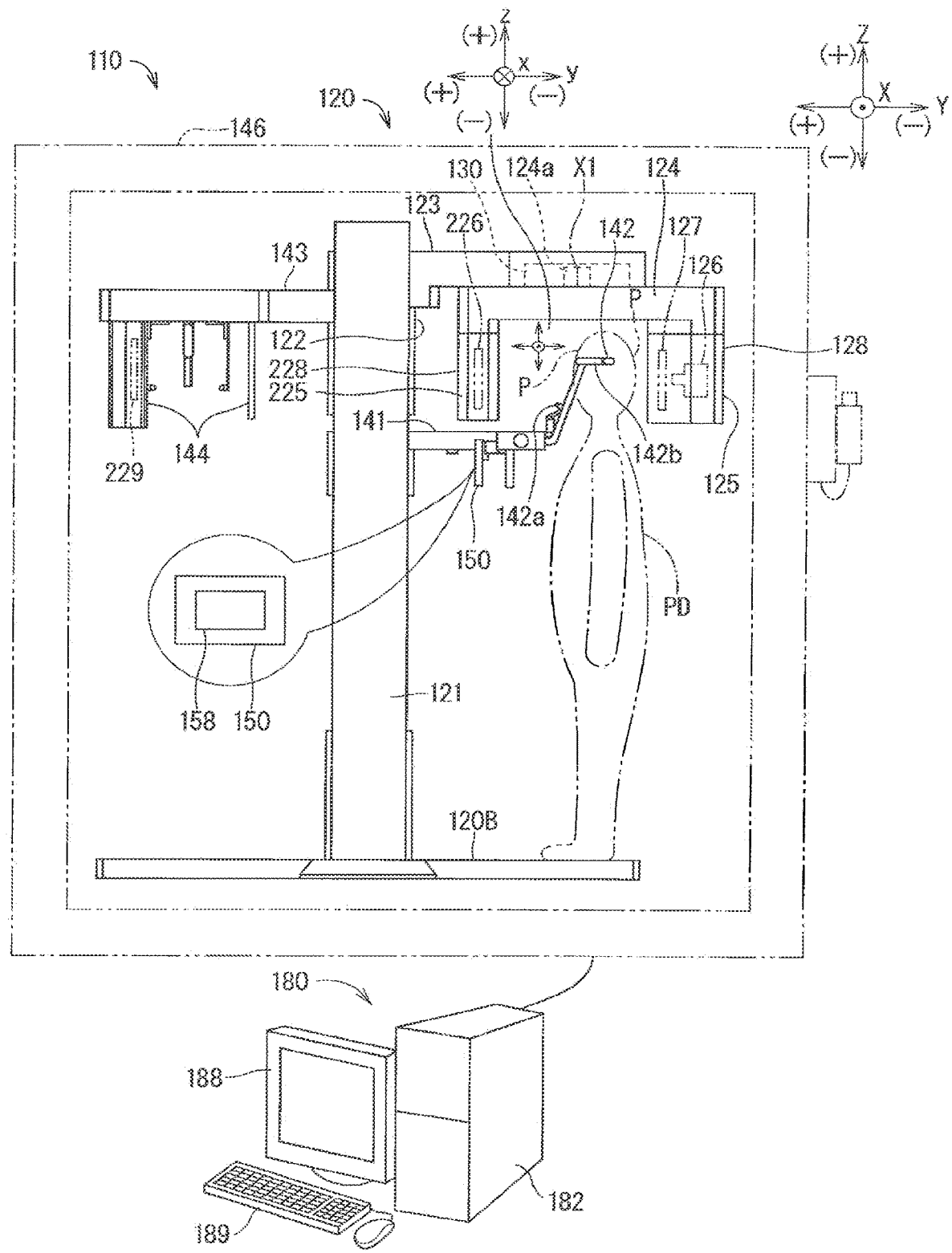
FIG. 1 is a schematic diagram illustrating an entire configuration example of an X-ray imaging apparatus.

FIG. 1 is a schematic diagram illustrating an entire configuration example of an X-ray imaging apparatus 110. As illustrated in FIG. 1, for example, the X-ray imaging apparatus 110 includes an imaging body 120 and an X-ray image processing apparatus 180 (also simply referred to as an image processing apparatus 180). For example, the imaging body 120 is configured to be capable of performing X-ray computed tomography (CT) imaging, panoramic imaging, and cephalogram imaging. The imaging body 120 performs the X-ray imaging such as the X-ray CT imaging to collect the X-ray imaging data (also referred to as projection data). The X-ray image processing apparatus 180 is an apparatus that processes the X-ray imaging data collected by the imaging body 120 and generates various X-ray images (specifically, an X-ray panoramic image, an X-ray CT image, and a cephalographic captured image). The X-ray imaging apparatus 110 may be a dedicated apparatus of the X-ray CT imaging and the X-ray CT image generation, or may be an apparatus performing at least one of the X-ray CT imaging and the X-ray CT image generation and the panoramic imaging and the panoramic image generation. The X-ray imaging apparatus 110 may have the imaging body 120 as a main configuration, and the X-ray image processing apparatus 180 may be omitted or only a part of the function of the X-ray image processing apparatus 180 may be provided.

The imaging body 120 includes a support 124 a drive mechanism 130 that moves the support 124, an X-ray generation unit 125, and an X-ray detection unit 225. The support 124 has an arm shape that is long in one direction. The support 124 supports the X-ray generation unit 125 and the X-ray detection unit 225 such that the X-ray generation unit 125 and the X-ray detection unit 225 are opposite to each other with a head P of a subject PD (in this case, a human) interposed therebetween. The support 124 may be referred to as a supporter. The X-ray generation unit 125 irradiates the head P with the X-ray beam. The X-ray detection unit receives and detects the X-ray beam transmitted through the head P. The drive mechanism 130 includes a turning mechanism 132 and a turning axis moving mechanism 134 (see FIG. 2). The turning mechanism 132 moves the support 124 such that the X-ray generation unit 125 and the X-ray detection unit 225 turn about a mechanical turning axis X1 between the X-ray generation unit 125 and the X-ray detection unit 225. The turning axis moving mechanism 134 is a mechanism that moves the mechanical turning axis X1 in a direction intersecting with the mechanical turning axis X1.

More specifically, in the imaging body 120, a post 121 is supported in a perpendicular posture on a base 120B. A lifting unit 122 is provided on the post 121 while being movable up and down. A lifting drive mechanism moves the lifting unit 122 up and down. The lifting drive mechanism is configured of a moving mechanism including a ball screw mechanism and the like including a motor, a ball screw, and a nut or a linear actuator such as a linear motor, and moves the lifting unit 122 up and down while being incorporated in the post 121. The lifting drive mechanism may be referred to as an elevator. The motor of the lifting drive mechanism may be referred to as an elevation driving motor. A horizontal arm 123 is attached to the lifting unit 122 so as to extend in a horizontal direction. The horizontal arm 123 is also a beam (beam). The drive mechanism 130 is incorporated to a leading end portion of the horizontal arm 123. A head fixing apparatus arm 141 (to be described later) extends from the post 121 in the same direction as the horizontal arm 123. A head fixing apparatus 142 is provided at the leading end portion of the head fixing apparatus arm 141, and the head fixing apparatus 142 holds the head P of the subject PD. It can be said that the head fixing apparatus 142 is a subject holder. The head fixing apparatus 142 may be referred to as a head holder. In FIG. 1, a base end portion of the lifting unit 122 moves up and down behind (a left side in FIG. 1) the post 121. Assuming that the side on which the base end portion of the lifting unit 122 moves up and down is a back face and that a reverse of the back face is a front face, the horizontal arm 123 extends from the lifting unit 122 to the right of the post 121 in FIG. 1. The head P is held in the head fixing apparatus 142 (subject holder) with the right in FIG. 3 as the rear and with the left as the front. The horizontal arm 123 supports the support 124 with a shaft 124a interposed therebetween. The lifting drive mechanism moves up and down the horizontal arm 123 by moving up and down the lifting unit 122, and moves up and down the support 124 by moving up and down the horizontal arm 123.

As described above, the drive mechanism 130 is a drive mechanism that relatively moves the support 124 with respect to the subject PD, more specifically, the head P. The drive mechanism 130 may be provided in the subject holder that holds the subject PD, and the subject PD nay be moved with respect to the fixed support 124. Furthermore, a part of the drive mechanism 130 may be provided on the drive side of the support 124, and another part of the drive mechanism 130 may be provided on the drive side of the subject holder. In any case, the movement of the support 124 with respect to the subject PD is relative. The drive mechanism 130 may be referred to as a supporter driver. The motor included in the drive mechanism 130 and moves the support 124 may be referred to as a support driving motor.

At this point, the direction is defined for convenience.

An XYZ-orthogonal coordinate system is an orthogonal coordinate system defined in a three-dimensional space in which the imaging body 120 is installed. A direction parallel to the axial direction of the mechanical turning axis X1 is set to a Z-axis direction. In the embodiment, the direction parallel to the axial direction of the mechanical turning axis X1 and the lifting direction of the lifting unit 122 are matched with each other as the Z-axis direction. A direction orthogonal to the Z-axis direction is set to a Y-axis direction, and a direction orthogonal to the Z-axis direction and the Y-axis direction is set to an X-axis direction. A front-rear direction of the head P fixed to the head fixing apparatus 142 is set to the Y-axis direction, and a right and left direction of the head P is set to the X-axis direction. In the present application, sometimes the Z-axis direction is referred to as a Z-direction, the Y-axis direction is referred to as a Y-direction, and the X-axis direction is referred to as an X-direction.

The direction from the head P toward the base 120B, namely, a lower side is set to a −Z-side, and the direction away from the base 120B from the head P, namely, an upper side is set to a +Z-side. The front side of the head P is set to a +Y-side, and the rear side is set to a −Y-side. The right side of the head P viewed from the face side is defined as a +X-side, and the left side is defined as a −X-side. Each axial direction, "+", and "−" are illustrated in FIG. 1.

When the apparatus vertical direction is defined with the upper side of the head P (the head fixing position of the head fixing apparatus 142) as the apparatus upper side and the lower side of the head P as the apparatus lower side, the turning axis X1 extends in a direction parallel to the apparatus vertical direction. In the XYZ-orthogonal coordinate system, the Z-direction is the apparatus vertical direction, the +Z-side is the apparatus upper side, and the −Z-side is the apparatus lower side.

An xyz-orthogonal coordinate system is an orthogonal coordinate system defined in the support 124, the X-ray generation unit 125, and the X-ray detection unit 225 that configure an imaging system that performs the X-ray generation and the X-ray detection, the imaging system rotating around the mechanical turning axis X1. At this point, the axial direction of the mechanical turning axis X1 is set to a z-axis direction, and the z-axis direction is matched with the Z-axis direction of the XYZ-orthogonal coordinate system. A direction in which the X-ray generation unit 125 and the X-ray detection unit 225 are opposed to each other is set to a y-axis direction, and a direction orthogonal to the y-axis direction and the z-axis direction is set to an x-axis direction. The support 124, the X-ray generation unit 125, and the X-ray detection unit 225 rotate with the mechanical turning axis X1 as the rotation axis, which allows the xyz-orthogonal coordinate system to rotate around the Z-axis (=z-axis) with respect to the XYZ-orthogonal coordinate system. In the present invention, sometimes the z-axis direction is referred to as a z-direction, the y-axis direction is referred to as a y-direction, and the x-axis direction is referred to as an x-direction.

In the y-axis direction, the side of the X-ray detection unit 225 is set to the +y-side, and the side of the X-ray generation unit 125 is set to the −y-side. In the z-axis direction, the upper side in the vertical direction is set to a +z-side, and the lower side is set to a −z-side. The +z-side and the −z-side in the z-axis direction correspond to the +Z-side and the −Z-side in the Z-axis direction, respectively. In the x-axis direction, the right side from the −y-side toward the +y-side in planar view from the +z-side to the −z-side is set to a +x-side, and the left side is set to a −x-side.

In the specification of the present application, in a case where there is a certain axial direction D and expressions of a "+D-direction" and a "−D-direction" in the D-axis direction (D-direction) are taken, assuming that there are two points in which positions are different in the D-axis direction, when comparing the respective D-coordinates, a direction from a small side to a large side of the numerical value is the +D-direction, and a direction from the large side to the small side of the numerical value is the −D-direction. The "+D-side" may be referred to as a "+D-direction side", and the "−D-side" may be referred to as a "−D-direction side". Viewing the +D-direction side from the −D-direction side may be referred to as "+D-direction view", and viewing the −D-direction side from the +D-direction side may be referred to as "−D-direction view".

The turning mechanism 132 rotates the support 124 that supports the X-ray generation unit 125 and the X-ray detection unit 225 about the turning axis X1. Thus, the X-ray generation unit 125 and the X-ray detection unit 225 turn about the axis extending in the direction parallel to the Z-direction (in other words, the apparatus vertical direction) and about the head P. The turning mechanism 132 includes a motor (also referred to as a rotation motor). The shaft 124a protruding upward from an intermediate portion in the extending direction of the support 124 is supported in the suspended state by the turning mechanism 132. The rotating movement of the motor of the turning mechanism 132 is transmitted to the shaft 124a, and the support 124 is turned about the shaft 124a by driving the motor. A center axis of the shaft 124a is the mechanical turning axis X1. The turning axis X1 is located between the X-ray generation unit 125 supported by the support 124 and the X-ray detection unit 225. The rotating movement of the motor of the turning mechanism 132 is transmitted to the shaft 124a as necessary with a transmission mechanism such as a gear and a pulley interposed therebetween. The shaft 124a is disposed along the vertical direction along a gravity direction. Accordingly, the mechanical turning axis X1 is also disposed along the vertical direction. As described above, the shaft 124a may be fixed to the support 124 to transmit the rotational motion to the shaft 124a, or the support 124 may be revolvably fixed to the shaft 124a that does not rotate, and the rotational motion of the motor of the turning mechanism 132 may be transmitted to the support 124 as necessary with a transmission mechanism such as a gear and a pulley interposed therebetween. The turning mechanism 132 may be referred to as a supporter rotation driver.

The turning axis moving mechanism 134 is a mechanism that moves the mechanical turning axis X1 in the direction intersecting with the mechanical turning axis X1, in this case, the direction orthogonal to the mechanical turning axis X1. The turning axis moving mechanism 134 can move the turning axis X1 in each of the X direction and the Y direction. When the turning axis moving mechanism 134 moves the turning axis X1 in the X-direction, the support 124, the X-ray generation unit 125, and the X-ray detection unit 225 move in the X-direction. When the turning axis moving mechanism 134 moves the turning axis X1 in the Y direction, the support 124, the X-ray generation unit 125, and the X-ray detection unit 225 move in the Y-direction.

For example, the turning axis moving mechanism 134 is configured of an XY-stage mechanism. The turning axis moving mechanism 134 moves the turning axis X1 in the direction intersecting with the turning axis X1 by moving the turning mechanism 132 to which the turning axis X1 is connected in the direction intersecting with the turning axis X1. For example, the XY-stage mechanism is a combination of two sets of linear actuators with moving directions of the linear actuators intersecting with each other. The moving directions of the two sets of linear actuators are set in the X-direction and the Y-direction. A linear moving mechanism including a ball screw mechanism and the like including a motor, a ball screw, a nut, a linear guide, and the like, a linear motor, or a linear actuator such as an air cylinder can be used as the linear actuator. The moving direction of each of the two sets of linear actuators of the XY-stage mechanism is set to the state intersecting with the mechanical turning axis X1, and the turning axis moving mechanism 134 supports the turning mechanism 132 such that the turning mechanism 132 can be moved in the moving direction of each of the two sets of linear actuators. Consequently, the turning mechanism 132 can be moved along a plane intersecting with the turning axis X1, and therefore the turning axis X1 can be moved along the plane intersecting with the turning axis X1.

The turning axis moving mechanism 134 moves the support 124 in the direction intersecting with the axial direction of the turning axis X1 by moving the shaft 124a in the direction intersecting with the axial direction of the turning axis X1. The turning axis moving mechanism 134 may be referred to as a cross axis supporter driver that moves the support 124 in the direction intersecting with the axial direction of the turning axis X1. The motor of the turning axis moving mechanism 134 may be referred to as a cross axis supporter driving motor that moves the support 124. The shaft 124a may be configured of a shaft. When the shaft 124a is configured of the shaft, the turning axis moving mechanism 134 may be called a shaft driver. In this case, the motor of the turning axis moving mechanism 134 may be referred to as a cross axis shaft driving motor that moves the shaft 124a.

A combined direction of the X-direction and the Y-direction is defined as an XY-combined direction. At least a direction including one of the X-direction, the Y-direction, and the XY-combined direction is defined as an XY-direction. The turning axis moving mechanism 134 may be called an XY-direction supporter driver that moves the support 124 in the XY-direction. The motor of the turning axis moving mechanism 134 may be referred to as an XY-direction support driving motor that moves the support 124 in the XY-direction. When the shaft 124a is configured of the shaft, the turning axis moving mechanism 134 may be referred to as an XY-direction shaft driver that moves the shaft 124a in the XY-direction. The motor of the turning axis moving mechanism 134 may be referred to as an XY-direction shaft driving motor that moves the shaft 124a in the XY-direction. The motor that moves the support 124 and the shaft 124a in the X-direction may be referred to as an X-direction driving motor. The motor that moves the support 124 and the shaft 124a in the Y-direction may be referred to as a Y-direction driving motor.

The X-ray generation unit 125 includes an X-ray generation source 126 that generates the X-ray and an X-ray beam forming nit 127 that forms the X-ray generated by the X-ray generation source 126 into the X-ray beam. The head P is irradiated with the X-ray beam emitted from the X-ray beam forming unit 127. The X-ray beam forming unit 127 can adjust a shape of the emitted X-ray beam. The X-ray generation unit 125 includes an extending unit 128 extending from one end portion in the longitudinal direction of the elongated support 124 toward the −Z-side. The X-ray generation source 126 and the X-ray beam forming unit 127 are accommodated in the extending unit 128. It can also be said that the extending unit 128 is a case (also referred to as a casing) that accommodates the X-ray generation source 126 and the X-ray beam forming unit 127. At least a part of the extending unit 128 is configured of the X-ray generation unit 125. The X-ray generation unit 125 is also an X-ray generation apparatus. The X-ray generation source 126 may be referred to as an X-ray generator.

The X-ray detection unit 225 includes an X-ray detector 226 that receives and detects the X-ray beam transmitted through the head P. For example, the X-ray detector 226 may be configured of a flat panel detector (FPD) including a detection surface spreading flat or an image intensifier (I.I.). The detection surface of the X-ray detector 226 is irradiated with the X-ray beam transmitted through the head P. The imaging body 120 generates the X-ray imaging data required for generating the X-ray image such as the X-ray CT image based on the output signal of the X-ray detector 226. The X-ray detection unit 225 includes an extending unit 228 extending from the other end portion in the longitudinal direction of the support 124 toward the −Z-side. The X-ray detector 226 is accommodated in the extending unit 228. It can also be said that the extending unit 228 is a case (also referred to as a casing) that accommodates the X-ray detector 226. At least a part of the extending unit 228 is configured of the X-ray detection unit 225. The X-ray detection unit 225 is also an X-ray detection apparatus. The X-ray detector 226 may be referred to as an X-ray detector.

For example, the extending units 128 and 228 are formed integrally with the support 124. In this example, the support 124 and the extending units 128 and 228 connected to the support 124 configure a U-shaped turning arm opened downward. In the illustrated example, the extending unit 128 is connected to one end of the support 124, and the extending unit 228 is connected to the other end. The entire body of the support 124, the extending unit 128, and the extending unit 228 may be regarded as the supports 124, 128, 228.

The imaging body 120 includes an X-ray generation source moving unit 136 (see FIG. 2) to be described later that moves the X-ray generation source 126 with respect to the X-ray detector 226. The imaging body 120 includes an X-ray detection unit moving unit 137 (see FIG. 2) to be described later that brings the X-ray detection unit 225 close to and away from the X-ray generation unit 125.

In the imaging body 120, the support 124 can relatively move up and down by the lifting unit 122 according to a height of the head P. The X-ray generation unit 125 and the X-ray detection unit 225 are moved up and down by the support 124 moving up and down, so that the imaging body 120 can move up and down the X-ray generation unit 125 and the X-ray detection unit 225 according to the height of the head P using the lifting unit 122. The imaging body 120 can turn the support 124 by the drive mechanism 130 such that the X-ray generation unit 125 and the X-ray detection unit 225 turn around the head P.

A lifting unit that moves up and down the subject PD in the subject holder that holds the subject PD and the height of the subject PD is changed with respect to the height fixed support 124, so that the height of the support 124 may be relatively changed with respect to the head P. In addition, both the support 124 and the subject PD may be moved up and down. Even in this case, the lifting and lowering are relative. Examples of the lifting unit provided in the subject holder include a mechanism that lifts and lowers a chair with a drive source such as a motor.

In the imaging body 120, the head fixing apparatus arm 141 extending in the horizontal direction is provided in a portion of the post 121 below the horizontal arm 123. The horizontal arm 123 and the head fixing apparatus arm 141 extend in the same direction with the side of the post 121 as the base end portion. The head fixing apparatus arm 141 extends toward the lower side of the horizontal arm 123, and the head fixing apparatus (in other words, subject holder) 142 is provided at the leading end portion of the head fixing apparatus arm 141. The head fixing apparatus 142 is located between the X-ray generation unit 125 and the X-ray detection unit 225. The head fixing apparatus 142 includes a chin rest 142a on which a chin of the head P can be placed and supported and a holder 142b that holds the head P while sandwiching the head P from both outsides. The chin of the head P is supported on the chin rest 142a and the head P is sandwiched by the holder 142b, whereby the head P is held at a fixed position between the X-ray generation unit 125 and the X-ray detection unit 225. The head fixing apparatus 142 may be configured of at least one of the chin rest 142a and the holder 142b.

A cephalogram imaging head fixing apparatus suspending arm 143 is provided in the imaging body 120 so as to extend in the horizontal direction on the side opposite to the side where the horizontal arm 123 extends from the post 121. A cephalogram imaging head fixing apparatus 144 is supported in a suspended state by the cephalogram imaging head fixing apparatus suspending arm 143. A cephalogram imaging X-ray detector 229 is incorporated in the cephalogram imaging head fixing apparatus 144.

A body controller 150 including an operation panel apparatus 158 is provided in an intermediate portion in the extending direction of the head fixing apparatus arm 141. In FIG. 1, the operation panel apparatus 158 of the body controller 150 is expanded and drawn in a balloon. The body controller 150 may be configured of a circuit. In this case, the body controller 150 may be referred to as a body control circuit.

The imaging body 120 performs the X-ray imaging while the head P is fixed by the head fixing apparatus 142, and while the support 124 is stopped or rotated according to a desired imaging mode. Consequently, the imaging body 120 can obtain the X-ray imaging data required for generating the X-ray CT image, the panoramic image, and the like. For example, the imaging body 120 can obtain the X-ray imaging data required for generating the X-ray CT image by performing the X-ray imaging while the support 124 is rotated, in other words, while the X-ray generation unit 125 and the X-ray detection unit 225 are rotated. In addition, the imaging body 120 can obtain the panoramic imaging data required for generating the panoramic image by performing the X-ray imaging while the support 124 is rotated within a certain range. As an example of performing the X-ray imaging while the support 124 is stopped, for example, preliminary imaging for positioning the subject may be performed for the X-ray CT imaging, and at that time, the X-ray imaging may be performed while the support 124 is stopped. Additionally, the imaging body 120 may also perform the X-ray imaging in order to obtain the cephalogram image and a pseudo-oral image. For example, the X-ray generation unit 125 is configured to be revolvable about the axis in the z-direction with respect to the support 124, and the imaging body 120 can obtain the X-ray imaging data necessary to generate the cephalographic image by fixing the head P to the cephalogram imaging head fixing apparatus 144 while stopping the support 124, and performing the X-ray imaging by performing the X-ray irradiation from the X-ray generation unit 125 directed toward the cephalogram imaging head fixing apparatus 144. A function of imaging the panoramic image and a function of imaging the cephalometric image are sometimes omitted.

The supports 124, 128, 228 are an example of the first support that supports the X-ray generation source 126, the X-ray beam forming unit 127, and the X-ray detector 226. The horizontal arm 123, the post 121, and the base 120B are examples of the second support that supports the first support. Among the second supports, there is a relationship in which the support is effective from the base 120B to the post 121 and from the post 121 to the horizontal arm 123.

The head fixing apparatus array 141 and the head fixing apparatus 142 are examples of the head support that fixes the head of the subject. For example, the shaft 124a is a shaft. The second support supports the first support with the shaft interposed therebetween. The motor of the turning mechanism 132 is an example of the first motor that drives the first support to turn around the shaft. The motor of the turning axis moving mechanism 134 is an example of the second motor that moves and drives the shaft. The first motor and the second motor are examples of the support drive motor that drives the first support.

The first support, the X-ray generation source 126, the X-ray beam forming unit 127, and the X-ray detector 226 are a rotation imager that performs the X-ray imaging by rotation.

The body controller 150 is configured of being able to receive each instruction to the imaging body 120, and is configured of being able to control each action of the imaging body 120. The body controller 150 is fixed to the head fixing apparatus arm 141 extending in the horizontal direction from the post 121. The body controller 150 includes the operation panel apparatus 158 that displays various information while receiving various inputs to the body controller 150. The operation panel apparatus 158 is a touch panel display including a display apparatus such as a liquid crystal display panel and a touch detection unit disposed on a display screen of the display apparatus. A touch operation of the user on the display screen is detected with the touch detector, which allows the operation panel apparatus 158 to receive the operation performed to the X-ray imaging apparatus 110. A push button may be provided near the operation panel apparatus 158. The display apparatus and the input apparatus that receives the operation of the user may separately be provided.

Each unit of the imaging body 120 is accommodated in an X-ray protection chamber 146. A push button switch called a deadman switch that issues an instruction of the X-ray irradiation to the body controller 150 is provided on an outside of a wall of the X-ray protection chamber 146.

The X-ray image processing apparatus 180 includes an information processing body 182 configured of, for example, a computer or a workstation. The information processing body 182 can transmit and receive various data to and from the imaging body 120 by, for example, a communication cable. The information processing body 182 can perform various pieces of image processing based on the data transmitted from the imaging body 120. Further, the transmission and reception of the data may be performed by wireless communication between the imaging body 120 and the X-ray image processing apparatus 180. A circuit that performs information processing of the information processing body 182 may be referred to as an information processing circuit.

A display 188 configured of a display apparatus such as a liquid crystal monitor and an operation unit 189 configured of a keyboard and a mouse are connected to the information processing body 182. The operator can perform various inputs to the information processing body 182 by operating a pointer through the mouse on characters or images displayed on the display 188. The display 188 may be configured of a touch panel display. The operation unit 189 is an operation interface and includes a physical interface that receives a physical operation such as a keyboard or a mouse.

Part or whole of the processing of the X-ray image processing apparatus 180 may be performed by the body controller 150. Alternatively, part or whole of the processing of the body controller 150 may be performed by the X-ray image processing apparatus 180.

<Example of Block Diagram of X-Ray Imaging Apparatus>

Figure 2:
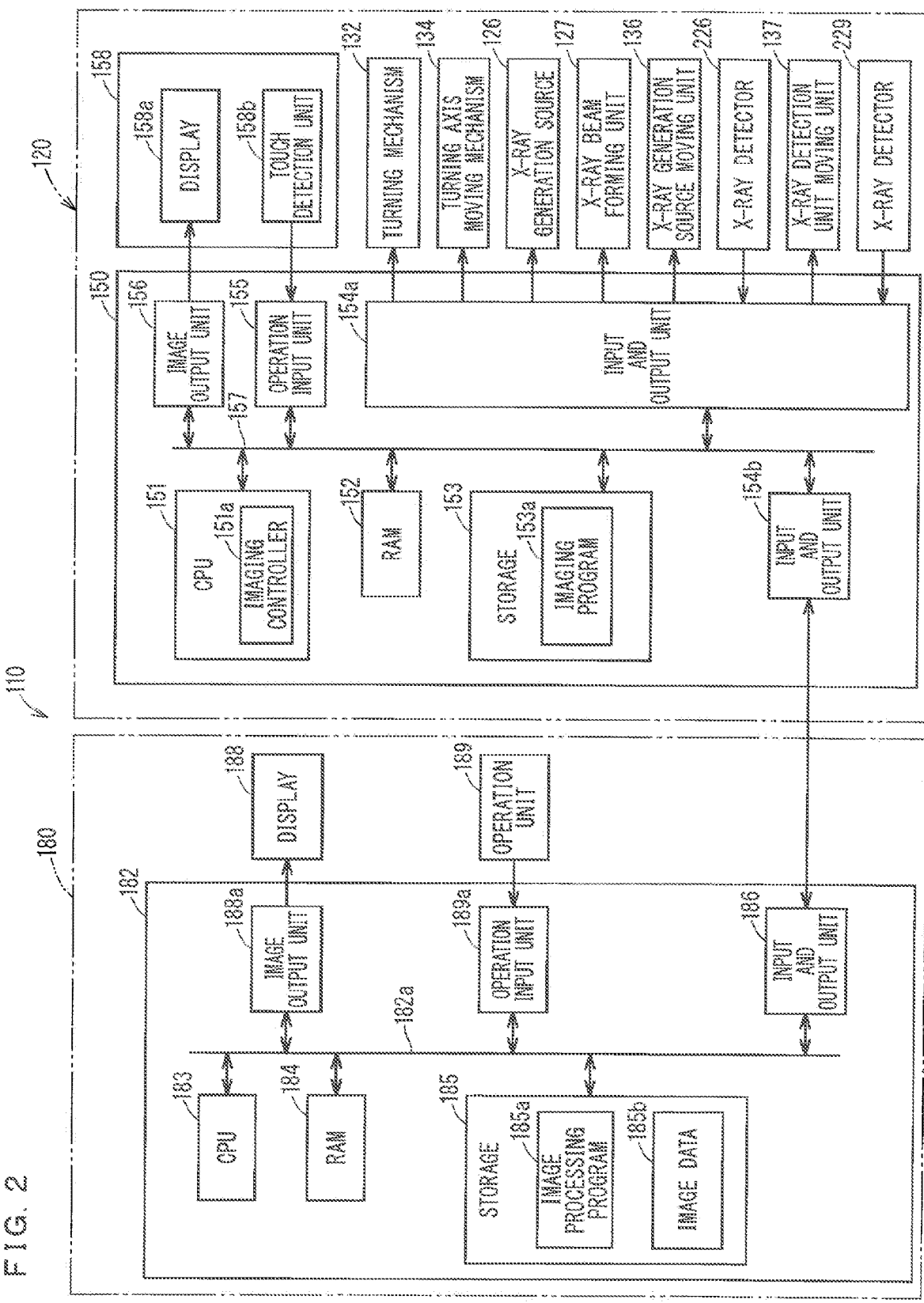
FIG. 2 is a block diagram illustrating an electric configuration of the X-ray imaging apparatus.

FIG. 2 is a block diagram illustrating an example of an electric configuration of the X-ray imaging apparatus 110. The body controller 150 of the imaging body 120 controls the X-ray imaging operation of the imaging body 120, and is a kind of computer apparatus. For example, the body controller 150 includes a central processing unit (CPU) 151 as at least one processor, a random access memory (RAM) 152, a storage (memory) 153, input and output units 154a, 154b, an operation input unit 155, and an image output unit 156. These configurations are interconnected through a bus line 157. The image output unit 156 may be configured of a circuit. In this case, the image output unit 156 may be referred to as an image output circuit. The operation input unit 155 may be configured of a physical interface. Each of the input and output units 154a, 154b may be configured of an input and output port.

The storage 153 is configured of a flash memory or a nonvolatile storage apparatus such as a hard disk drive. An imaging program 153a, which receives various instructions relating to the X-ray imaging while controlling the X-ray imaging operation by controlling the drive mechanism 130, the X-ray generation source 126, the X-ray beam forming unit 127, and the like according to the instructions, is stored in the storage 153. The CPU 151 executes the imaging program 153a to implement various functions of the CPU 151. For example, the CPU 151 includes an imaging controller 151a that controls an X-ray imaging operation in the imaging body 120 as a functional block.

The RAM 152 serves as a work area when the CPU 151 performs predetermined processing. The turning mechanism 132, the turning axis moving mechanism 134, the X-ray generation source 126, the X-ray beam forming unit 127, the X-ray generation source moving unit 136, the X-ray detector 226, the X-ray detection unit moving unit 137, and the X-ray detector 229 are connected to the input and output unit 154a.

The imaging controller 151a can control the turning mechanism 132 through the input and output unit 154a. The imaging controller 151a can turn the X-ray generation unit 125 and the X-ray detection unit 225 that are supported by the support 124 around the head P by controlling the turning mechanism 132.

The imaging controller 151a can control the turning axis moving mechanism 134 through the input and output unit 154a. The imaging controller 151a can move the support 124, the X-ray generation unit 125, and the X-ray detection unit 225 in the X-direction or the Y-direction by controlling the turning axis moving mechanism 134.

The imaging controller 151a can control the X-ray generation source 126 through the input and output unit 154a. For example, the imaging controller 151a controls voltage and/or current supplied to the X-ray tube included in the X-ray generation source 126, thereby allowing or not allowing the X-ray generation source 126 to emit the X-ray. The imaging controller 151a can control intensity of the X-ray emitted from the X-ray generation source 126 by controlling the voltage and/or current supplied to the X-ray tube.

The imaging controller 151a can control the X-ray generation source moving unit 136 through the input and output unit 154a. The imaging controller 151a can move the X-ray generation source 126 by controlling the X-ray generation source moving unit 136.

The imaging controller 151a can control the X-ray beam forming unit 127 through the input and output unit 154a. The imaging controller 151a can adjust the shape of the X-ray beam with which the head P is irradiated by controlling the X-ray beam forming unit 127. For example, the imaging controller 151a controls the X-ray beam forming unit 127 to cause the X-ray beam forming unit 127 to form the X-ray beam having the shape according to the imaging purpose.

The imaging controller 151a can control the X-ray detection unit moving unit 137 through the input and output unit 154a. The imaging controller 151a can bring the X-ray detection unit 225 close to or separate from the X-ray generation unit 125 by controlling the X-ray detection unit moving unit 137.

The imaging controller 151a can receive output signals of the X-ray detector 226, 229 through the input and output unit 154a. Based on the output signal of the X-ray detector 226, the imaging controller 151a generates the X-ray imaging data required for generating, for example, the X-ray CT image or the panoramic image. The imaging controller 151a generates the X-ray imaging data required for generating the cephalographic image based on the output signal of the X-ray detector 229.

The input and output unit 154b is communicably connected to the image processing apparatus 180. The CPU 151 can exchange data with the image processing apparatus 180 through the input and output unit 154b. The operation input unit 155 is connected to a touch detection unit 158b of the operation panel apparatus 158, and the image output unit 156 is connected to a display 158a of the operation panel apparatus 158. The image data generated by the CPU 151 is input to the image output unit 156. The image output unit 156 controls the display 158a based on the input image data to display an image on the display 158a. The CPU 151 can receive the output signal output from the touch detection unit 158b through the operation input unit 155. Thus, the CPU 151 can specify various operations detected by the touch detection unit 158b.

The image processing apparatus 180 is as type of computer apparatus that generates X-ray image data 185b based on the X-ray imaging data from the imaging body 120. The information processing body 182 of the X-ray image processing apparatus 180 includes a CPU 183 as at least one processor, a RAM 184, a storage (memory) 185, an input and output unit 186, an operation input unit 189a, and an image output unit 188a. These configurations are interconnected through a bus line 182a. The input and output unit 186 may be configured of an input and output port. The operation input unit 189a may be configured of a circuit. In this case, the operation input unit 189a may be referred to as an operation input circuit. The image output unit 188a may be configured of a circuit. In this case, the image output unit 188a may be referred to as an image output circuit.

The storage 185 is configured of a flash memory or a nonvolatile storage apparatus such as a hard disk drive. The storage 185 stores an image processing program 185a by which the information processing body 182 generates the X-ray image data 185b based on the X-ray imaging data from the imaging body 120. In addition, the storage 185 stores the image data 185b generated by the information processing body 182. The CPU 183 executes the image processing program 185a to implement various functions of the CPU 183.

The RAM 184 serves as a work area when the CPU 183 performs predetermined processing. The input and output unit 186 is connected to the input and output unit 154b of the imaging body 120. The CPU 183 can exchange data with the CPU 151 of the imaging body 120 through the input and output unit 186 and the input and output unit 154b. Thus, the CPU 183 can receive the X-ray imaging data generated by the imaging controller 151a from the imaging controller 151a. The CPU 183 generates the image data 185b of the X-ray CT image, the panoramic image, or the cephalogram image based on the X-ray imaging data from the imaging controller 151a.

The operation input unit 189a is connected to the operation unit 189, and the image output unit 188a is connected to the display 188. The image data such as image data 185b generated by the CPU 183 is input to the image output unit 188a. The image output unit 188a controls the display 188 based on the input image data to display the image on the display 188. Thus, the X-ray CT image, the panoramic image, or the cephalogram image is displayed on the display 188. The CPU 183 can receive the output signal output from the operation unit 189 through the operation input unit 189a. Thus, the CPU 183 can specify a content of the operation received by the operation unit 189.

A part or whole of the function implemented in each of the above units may be implemented in a hardware manner using a dedicated logic circuit or the like. A part or whole of the function implemented in each of the above units may be processed by a single processor in an integrated manner, or appropriately processed by a plurality of processors in a distributed manner.

In the X-ray imaging apparatus 110 having the above configuration, for example, the touch detection unit 158b of the operation panel apparatus 158 receives an imaging mode designation operation from the operator. The imaging controller 151a of the body controller 150 sets the imaging mode of the X-ray imaging apparatus 110 to the imaging mode designated by the imaging mode designation operation. Examples of the imaging mode include an X-ray CT imaging mode that performs the X-ray CT imaging, a panoramic imaging mode that performs the panoramic imaging, and a cephalogram imaging mode that performs that cephalogram imaging. For example, when the X-ray CT imaging mode is designated by an imaging mode designation operation, the imaging controller 151a sets the imaging mode of the X-ray imaging apparatus 110 to the X-ray CT imaging mode.

In the X-ray imaging apparatus 110, for example, the touch detection unit 158b receives an imaging target region designating operation from the operator. The imaging controller 151a sets the region designated by the imaging target region designation operation as the imaging target region on the head P. For example, the entire dental arch included in the head P is designated as the imaging target region by the operator, a local (such as a front tooth region or a molar region) of the dental arch is designated as the imaging target region, or a temporomandibular joint region including the dental arch is designated as the imaging target region. From the fact that the imaging target region of the head P is irradiated with the X-ray beam, it can be said that the imaging target region is the irradiation region of the X-ray beam in the head P. The imaging target region is also called an irradiation field.

The imaging controller 151a controls the turning mechanism 132, the turning axis moving mechanism 134, the X-ray generation source 126, the X-ray beam forming unit 127, the X-ray generation source moving unit 136, and the X-ray detection unit moving unit 137 according to the set imaging mode and imaging target region. Thus, in the imaging body 120, the X-ray imaging is performed on the imaging target region designated by the operator in the imaging mode designated by the operator, and the X-ray imaging data is collected. In the X-ray CT imaging, the X-ray detection unit 225 and the X-ray generation unit 125 may turn 360 degrees or 180 degrees around the head P. The X-ray detection unit 225 and the X-ray generation unit 125 may turn by an angle obtained by adding a divergence angle of the beam of the X-ray as viewed from the Z direction to 180°. The CPU 183 of the image processing apparatus 180 generates the image data 185b of the X-ray image according to the aging mode based on the X-ray imaging data collected by the imaging body 120. For example, when the imaging mode is the X-ray CT imaging mode, the CPU 183 reconstructs the X-ray imaging data (in other words, projection data) collected by the imaging body 120 to generate the image data 185b of the X-ray CT image. The X-ray imaging data collected by the imaging body 120 may be stored in the storage 185 as the image data 185b to be processed.

<Configuration Example of X-Ray Generation Source>

Figure 3:
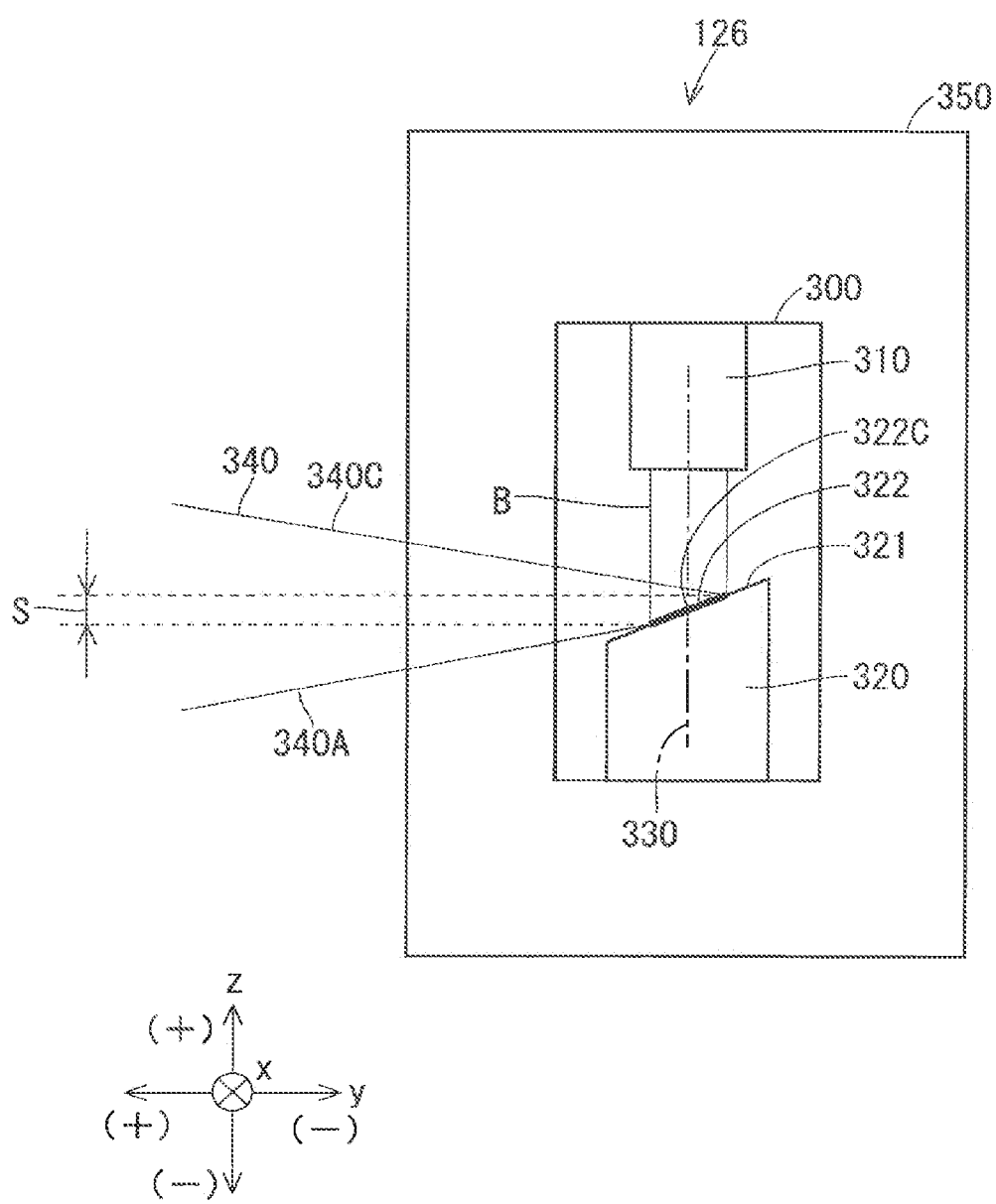
FIG. 3 is a schematic diagram illustrating a configuration example of an X-ray generation source.

FIG. 3 is a schematic diagram illustrating a configuration example of the X-ray generation source 126. As illustrated in FIG. 3, the X-ray generation source 126 includes an X-ray tube 300 and a case 350 accommodating the X-ray tube 300. For example, an inside of the case 350 is filled with insulating oil. The X-ray tube 300 includes a cathode 310 and an anode 320 disposed apart from the cathode 310. The cathode 310 includes a filament and emits an electron beam B toward the anode 320. For example, the cathode 310 is located on the +z-side, and the anode 320 is located on the −z-side. The cathode 310 may be located on the −z-side, and the anode 320 may be located on the +z-side.

A surface 321 of the anode 320 opposite to the cathode 310 is an inclined surface 321 inclined at a predetermined angle with respect to an axis line 330 (a straight line parallel to the emission direction of the electron beam B) connecting the cathode 310 and the anode 320 passing through the respective longitudinal axis centers. The inclined surface 321 is inclined with respect to the z-direction so as to face the +y-side. In other words, the inclined surface 321 is inclined with respect to the z-direction so as to face the side of the X-ray detector 26. The inclined surface 321 includes a target surface 322 with which the electron beam B from the cathode 310 collides, and the target surface 322 is indicated by a thick line in FIG. 3.

When the electron beam B emitted from the cathode 310 collides with the target surface 322, an X-ray 340 is emitted from the target surface 322 with a predetermined spread toward the reflection direction when viewed from the direction in which the electron beam B travels. The X-ray 340 is emitted from the target surface 322 to the side (+y-side) with respect to the axis line 330. The emission direction of the X-ray emitted from the target surface 322 is toward the X-ray detector 226. It can be said that the target surface 322 that emits the X-ray 340 is an X-ray generation surface that generates the X-ray 340.

There is a limit to the spread of the range of the X-ray 340 that can withstand practical use in the z-direction, and particularly, there is a boundary at which the energy of the X-ray 340 is rapidly lost in the spread farther from the cathode 310. In FIG. 3, in the spread of the X-ray 340, an end closer to the cathode 310 is defined as an X-ray end 340C, and an end farther from the cathode 310 is defined as an X-ray end 340A. The y-direction center of the target surface 322 of the anode 320 is defined as a target surface y-direction center 322C.

In the X-ray generation source 126, the target surface 322, in other words, the X-ray generation surface configures a focal point. As an apparent size S of the focal point (that is, the target surface 322) of the X-ray generation source 126 viewed in the y-direction from the side of the X-ray detector 226 is smaller, the blur in the X-ray imaging becomes smaller, and the imaging resolution is improved. Assuming that a direction orthogonal to the apparatus vertical direction (the Z-direction or the z-direction) is the apparatus horizontal direction, the imaging resolution is improved as the apparent size S of the focal point of the X-ray generation source 126 viewed from the side of the X-ray detector 226 in the apparatus horizontal direction is smaller. Hereinafter, the size S may be referred to as an apparent focal size S or simply as a focal size S.

<Configuration Example of X-Ray Beam Forming Unit>

Figure 4:
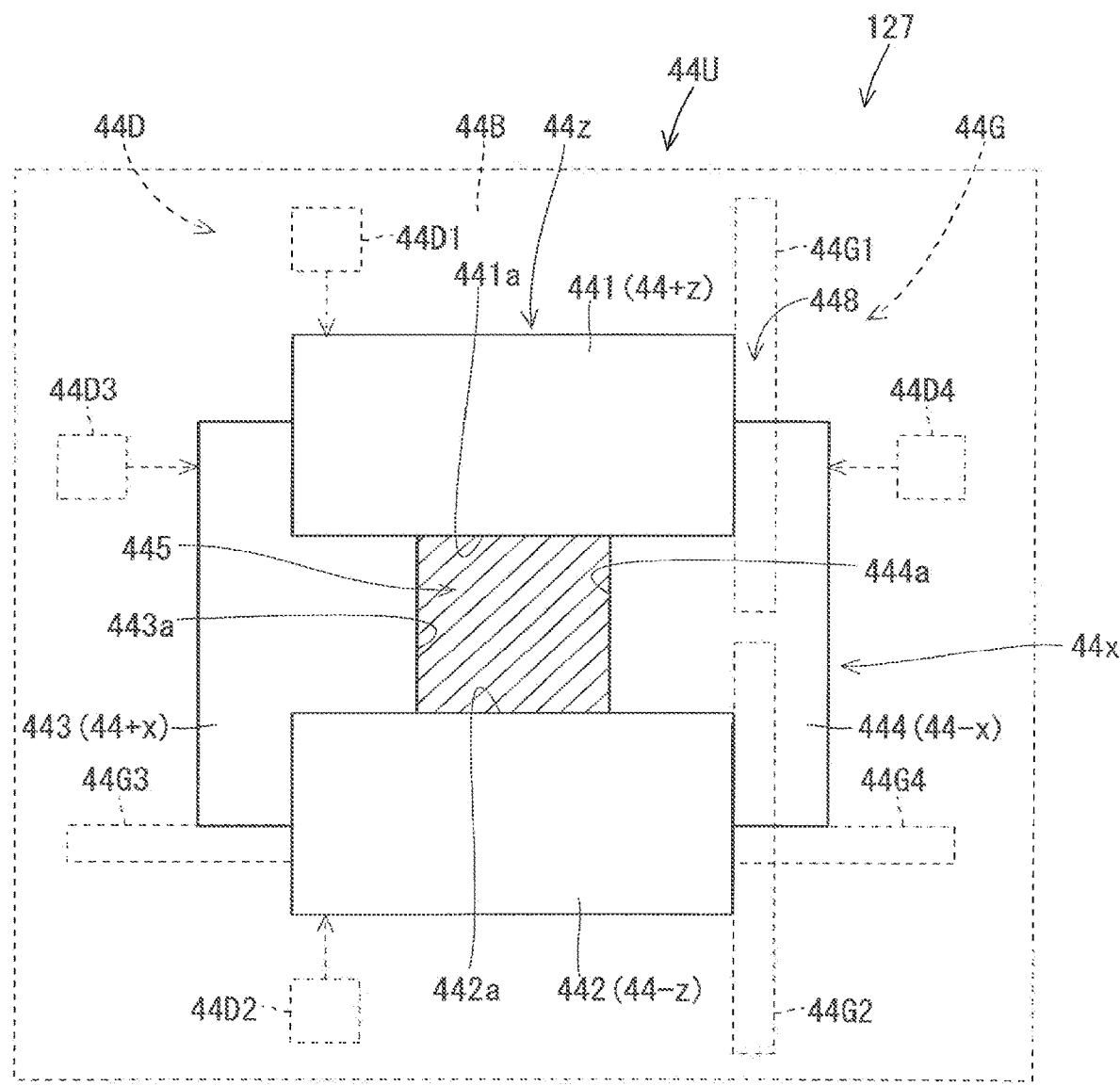
FIG. 4 is a schematic diagram illustrating a configuration example of an X-ray beam forming unit.
Figure 5:
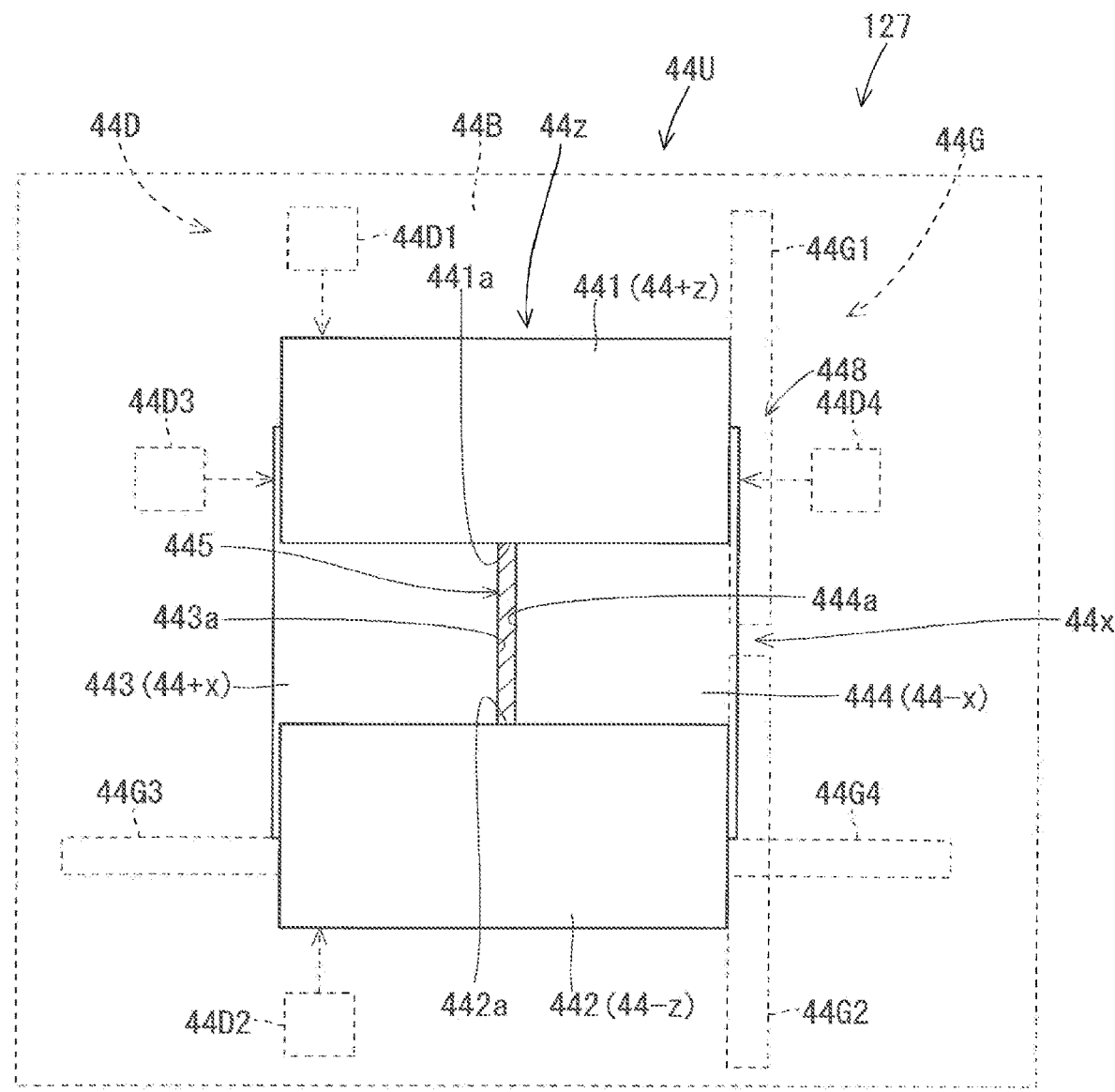
FIG. 5 is a schematic diagram illustrating a configuration example of the X-ray beam forming unit.

FIGS. 4 and 5 is a view illustrating a configuration example of the X-ray beam forming unit 127. The X-ray beam forming unit 127 regulates the spread of the X-ray 340 emitted from the X-ray generation source 126, and emits the X-ray beam having a shape according to the imaging purpose and the imaging target region. The X-ray beam forming unit 127 can control the irradiation range of the X-ray beam with respect to the head P.

As illustrated in FIGS. 4 and 5, for example, the X-ray beam forming unit 127 is configured of an X-ray beam forming unit 44U. The X-ray beam forming unit 44U mainly includes a shielding unit 448 that partially shields the X-ray 340 generated from the X-ray generation source 126. For example, the X-ray beam forming unit 44U includes four shielding members (shields) 441 to 444 arrayed at positions close to the X-ray generation source 126 as the shielding unit 448. The shielding members 441 to 444 are made of a material (such as lead) absorbing the X-rays, and are formed into a rectangular plate shape.

The shielding unit 448 is provided on a base 44B included in the X-ray beam forming unit 44U. The shielding unit 448 is guided by a collimation guide 44G fixed to the base 44B, and moved and driven by a shielding driving unit 44D. For example, the collimation guide 44G includes collimation guides 44G1, 44G2, 44G3, 44G4. For example, the shielding driving unit 44D includes shielding driving units 44D1, 44D2, 44D3, 44D4. For example, the shielding driving units 44D, 44D1, 44D2, 44D3, 44D4 include an appropriate actuator such as a motor.

The shielding member 441 is guided by the collimation guide 44G1 and moved and driven by the shielding driving unit 44D1. The shielding member 442 is guided by the collimation guide 44G2 and moved and driven by the shielding driving unit 44D2. The shielding member 443 is guided by the collimation guide 44G3 and moved and driven by the shielding driving unit 44D3. The shielding member 444 is guided by the collimation guide 44G4 and moved and driven by the shielding driving unit 44D4.

The shielding members 441 and 442 are arrayed on upper and lower sides (the +z-side and the −z-side) in a front view of an emission port the X-ray 340 of the X-ray generation source 126, and are arrayed such that each long side is parallel to the x-axis direction. The shielding member 441 is movable in the longitudinal direction (z-axis direction) by being guided by the collimation guide 44G1 and being moved and driven by the shielding driving unit 44D1. Similarly, the shielding member 442 is movable in the longitudinal direction (z-axis direction) by being guided by the collimation guide 44G2 and being moved and driven by the shielding driving unit 44D2.

The shielding members 441 and 442 configure a z-direction shielding unit 44z that regulates the spread of the X-ray beam in the z-axis direction by shielding. The shielding member 441 functions as a +z-direction-side shielding unit 44+z that restricts the spread of the X-ray beam on the +z-direction side, and the shielding member 442 functions as a −z-direction-side shielding unit 44−z that restricts the spread of the X-ray beam on the −z-direction side.

The shielding members 443 and 444 are arrayed on left and right sides (the +x-side and the −x-side) in a front view of the emission port of the X-ray generation source 126, and are arrayed such that each long side is parallel to the z-axis direction. The shielding member 443 is movable in the lateral direction (x-axis direction) by being guided by the collimation guide 44G3 and being moved and driven by the shielding driving unit 44D3. Similarly, the shielding member 444 is movable in the lateral direction (x-axis direction) by being guided by the collimation guide 44G4 and being moved and driven by the shielding driving unit 44D4.

The shielding members 443 and 444 configure an x-direction shielding unit 44x that restricts the spread of the X-ray beam in the x-axis direction by shielding. The shielding member 443 functions as a +x-direction-side shielding unit 44+x that restricts the spread of the X-ray beam on the +x-direction side, and the shielding member 444 functions as a −x-direction-side shielding portion 44−x that restricts the spread of the X-ray beam on the −x-direction side.

The respective positions of the shielding members 441 to 444 are controlled by the shielding driving unit 44D, so that an opening 445 formed by opposing edges 441a and 442a of the shielding members 441 and 442 and opposing edges 443a and 444a of the shielding members 443 and 444 has a shape and a dimension according to the imaging purpose and the imaging target region. The opening 445 serves as a passage region 445 of the X-ray 340 generated by the X-ray generation source 126. A basic opening that allows the passage of the X-ray is formed around an opening and passage region 445 in the base 44B, and the periphery of the basic opening is surrounded by the shielding members 441 to 444. It can be said that the shielding unit 448 configured of the shielding members 441 to 444 forms the passage region 445 through which the X-ray 340 passes.

For example, as illustrated in FIG. 4, a distance between the edges 441a and 442a and a distance between the edges 443a and 444a are relatively largely adjusted, so that the opening 445 has a square shape in a front view. The X-ray 340 emitted from the X-ray generation source 126 is shaped into an X-ray cone beam spreading in a regular quadrangular pyramidal shape toward the X-ray detector 226 by passing through the square-shaped opening 445. The X-ray cone beam is used in the X-ray CT imaging. When the imaging mode is set to the X-ray CT imaging mode, the imaging controller 151a controls the shielding driving unit 44D of the X-ray beam forming unit 127 to emit the X-ray cone beam according to the imaging target region from the X-ray beam forming unit 127. The imaging body 120 performs the X-ray CT imaging by irradiating the imaging target region in the head P with the X-ray cone beam while the X-ray generation unit 125 and the X-ray detection unit 225 are turning. The X-ray detector 226 receives the X-ray cone beam transmitted through the head P. The X-ray beam forming unit 127 drives the shielding unit 448 to expand and reduce the spread in the z-direction of the opening 445, so that the spread in the z-direction of the X-ray cone beam can be enlarged and reduced. The X-ray beam forming unit 127 drives the shielding unit 448 to enlarge and reduce the spread in the x-direction of the opening 445, so that the spread in the x-direction of the X-ray cone beam can be expanded and reduced.

As illustrated in FIG. 5, the distance between the edges 443a and 444a is adjusted relatively large and the distance between the edges 441a and 442a is adjusted small, so that the opening 445 becomes a vertically elongated rectangular shape with a high aspect ratio (width in the z-direction/width in the x-direction) in a front view. The X-ray 340 emitted from the X-ray generation source 126 is shaped into an X-ray slit beam spreading in a vertically elongated truncated pyramidal shape by passing through the rectangular opening 445. The x-ray slit beam is used during the panoramic imaging. When the imaging mode is set to the panoramic imaging mode, the imaging controller 151a controls the shielding driving unit 44D of the X-ray beam forming unit 127 to emit the X-ray slit beam according to the imaging target region from the X-ray beam forming unit 127. The X-ray slit beam irradiates the imaging target region in the head P. The X-ray detector 226 receives the X-ray slit beam transmitted through the head P.

The configuration of the X-ray beam forming unit 127 is not limited to the above example. For example, the X-ray beam forming unit 127 may also be configured of a single shielding member in which a plurality of openings are formed according to the imaging purpose and the imaging target region and the moving mechanism. In this case, the single shielding member may be moved by the moving mechanism such that the X-ray 340 emitted from the X-ray generation source 126 passes through the opening according to the imaging purpose and the imaging target region.

<Configuration Example of X-Ray Generation Source Moving Unit>

Figure 6:
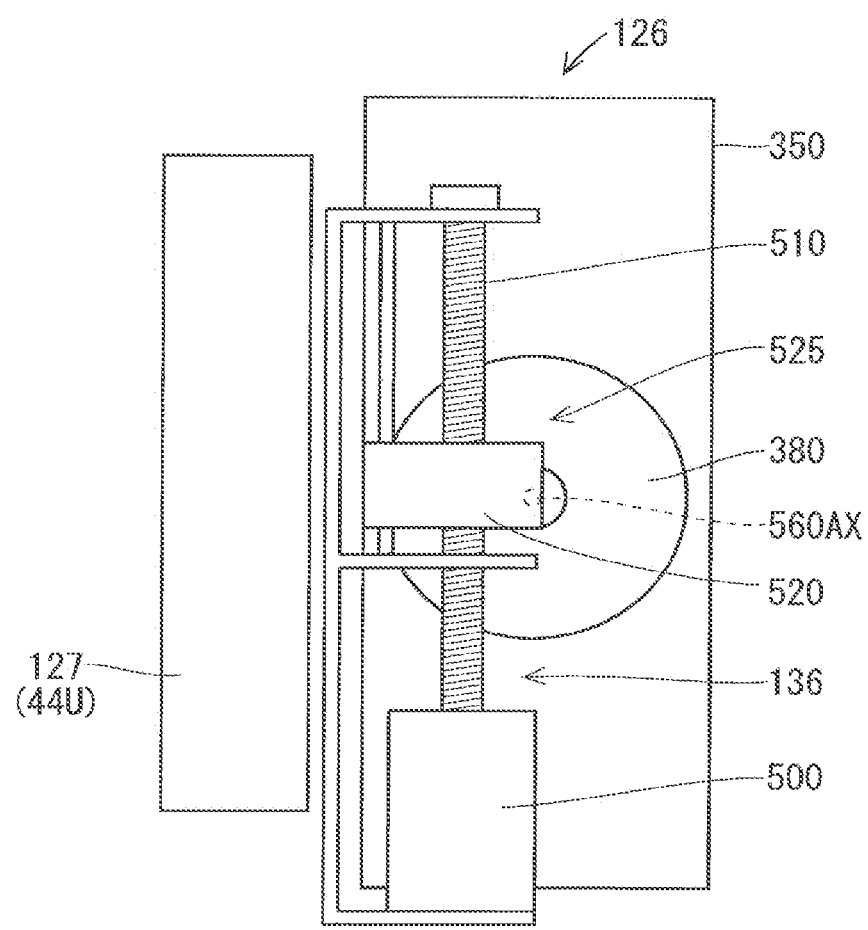
FIG. 6 is a schematic diagram illustrating a configuration example of an X-ray generation source moving unit.

FIG. 6 is a schematic diagram illustrating a configuration example of the X-ray generation source moving unit 136 (also simply referred to as the moving unit 136). The X-ray generation source moving unit 136 is also an X-ray generation source moving apparatus. The X-ray generation source moving unit 136 may be referred to as an X-ray generator driver or an X-ray generator elevation driver. The moving unit 136 is accommodated in the extending unit 128 extending from the support 124 toward the −z-side together with the X-ray generation source 126. A rubber chamber 380 absorbing thermal expansion of the insulating oil in the case 350 of the X-ray generation source 126 is also accommodated in the extending unit 128. The moving unit 136 can move the X-ray generation source 126 toward the z-direction in the extending unit 128. In this example, the X-ray beam forming unit 127 (X-ray beam forming unit 44U) is not fixed to the X-ray generation source 126 and does not move according to the movement of the X-ray generation source 126. For example, the X-ray beam forming unit 127 is fixed to the inner surface of the extending unit 128 by a fixing member.

For example, the moving unit 136 includes a ball screw mechanism 525. The ball screw mechanism 525 is fixed to the inner surface of the extending unit 128 by a fixing member. For example, the ball screw mechanism 525 includes a motor 500, a ball screw 510 extending in the z-direction (Z-direction), and a nut 520. The ball screw 510 is rotationally driven in both forward and reverse directions by the motor 500. The nut 520 is screwed With the ball screw 510. When the ball screw 510 is rotated by the motor 500, the nut 520 moves in the z-direction. The imaging controller 150a of the body controller 151 can control the motor 500. The X-ray generation source 126 is fixed to the nut 520, so that the X-ray generation source 126 moves in the z-direction by the movement in the z-direction of the nut 520. The motor 500 may be referred to as an X-ray generator driving motor that moves the X-ray generation source 126. The ball screw 510 transmits the driving force of the motor 500 to the nut 520. However, because the ball screw 510 defines the moving direction of the nut 520, namely, the moving direction of the X-ray generation source 126, the ball screw 510 is also a guide member (guide) in the moving direction of the X-ray generation source 126.

When the motor 500 forwardly rotates the ball screw 510 under the control of the imaging controller 151a, the nut 520 moves in the +z-direction and rises. On the other hand, when the motor 500 reversely rotates the ball screw 510 under the control of the imaging controller 151a, the nut 520 moves in the −z-direction and lowers.

The moving unit 136 having the above configuration can move the X-ray generation source 126 in the axial direction of the ball screw 510 within a predetermined range. The axial direction of the ball screw 510 is parallel to the z-direction, the moving unit 136 can move the X-ray generation source 126 in the z-direction within a predetermined range.

Figure 7:
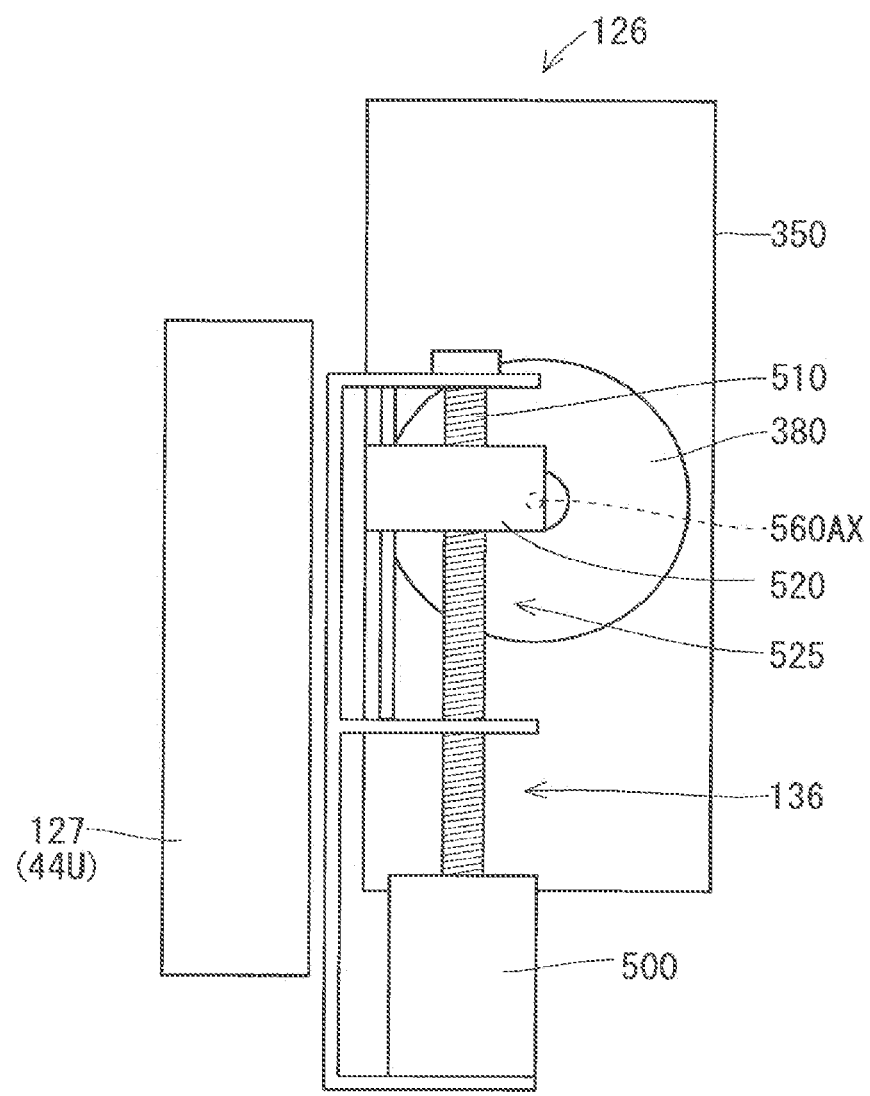
FIG. 7 is a schematic diagram illustrating a configuration example of the X-ray generation source moving unit.

FIG. 7 is a view illustrating an example of a state after the moving unit 136 moves the X-ray generation source 126 in FIG. 6 to the +z-direction side. When the X-ray generation source 126 is located on the most −z-direction side in the movement range in the z-direction of the X-ray generation source 126, for example, the position of the X-ray generation source 126 is as illustrated in FIG. 6. On the other hand, when the X ray generation source 126 is located on the most +z-direction side, for example, the position of the X-ray generation source 126 is as illustrated in FIG. 7.

Figure 8:
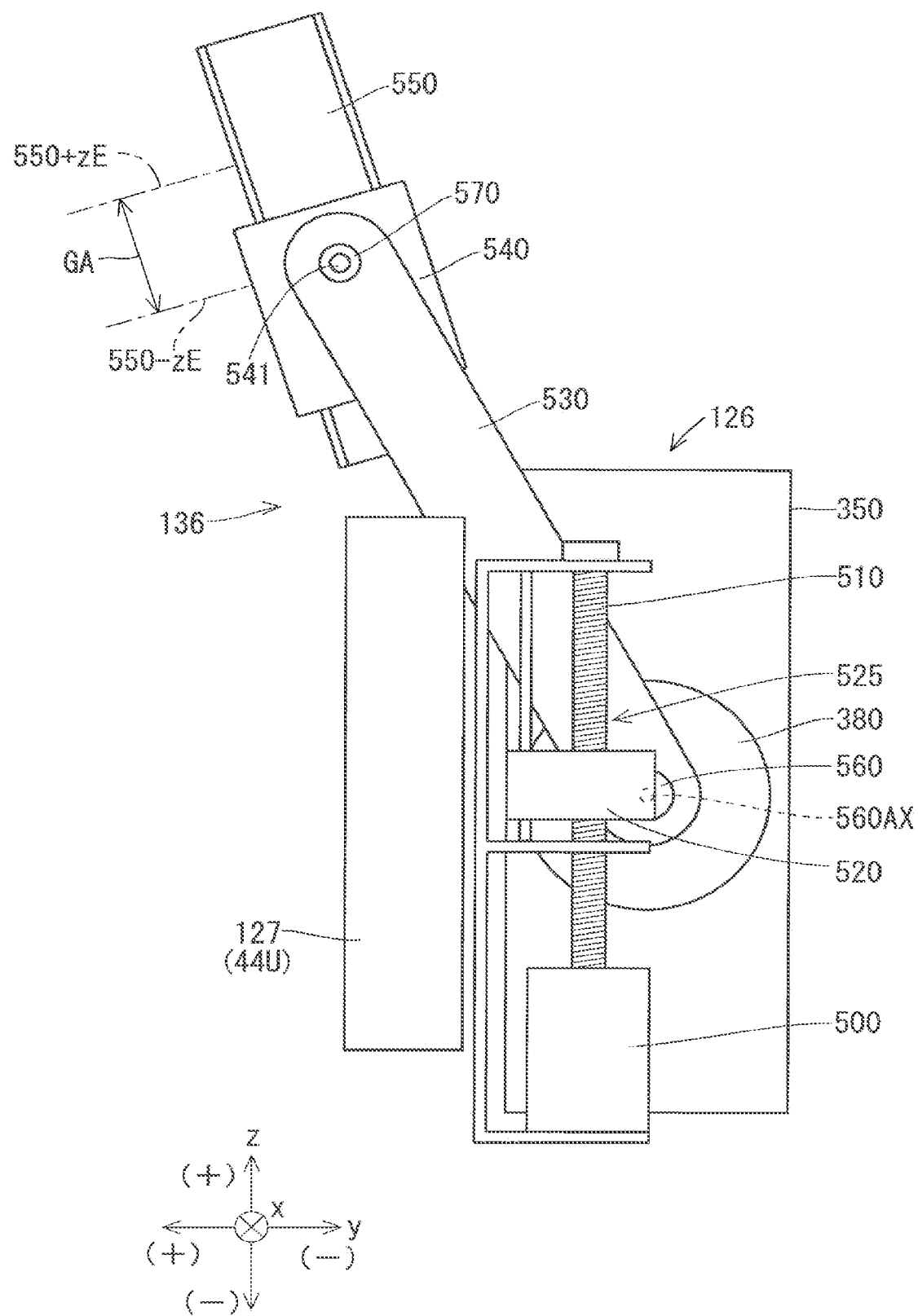
FIG. 8 is a schematic diagram illustrating a configuration example of the X-ray generation source moving unit.

FIG. 8 is a schematic diagram illustrating another example of the configuration of the X-ray generation source moving unit 136. The configuration example in FIG. 8 is different from the configuration examples in FIGS. 6 and 7 in that the structure of the movement of the X-ray generation source 126 in the z-direction is common, but in that the X-ray generation source 126 is tilted. In addition to the ball screw mechanism 525, the moving unit 136 includes a long link plate 530, a long guide rail 550, and a slide member 540 that slides on the guide rail 550. The ball screw mechanism 525 and the guide rail 550 are fixed to the inner surface of the extending unit 128 by a fixing member.

A shaft 560AX extends from the nut 520 to the +x-side, and one end portion of the link plate 530 is revolvably attached to the shaft 560AX by a ball bearing 560. The slide member 540 is slidably attached to the guide rail 550. A shaft 541 extends from the slide member 540 to the −x-side, and the other end portion of the link plate 530 is revolvably attached to the shaft 541 by a ball bearing 570. The case 350 of the X-ray generation source 126 is fixed to one end portion of the link plate 530. In the illustrated example, the case 350 is fixed to one end portion of the link plate 530 with the chamber 380 or the like interposed therebetween. When viewed from the −x-side (as viewed from the front side in FIG. 8), the center of the ball bearing 560 is matched with the target surface y-direction center 322C (see FIG. 3) of the target surface 322 of the X-ray tube 300 in the case 350.

At this point, a guide region GA of the slide member 540 of the guide rail 550, more specifically, an end on the +z-direction side in the guide region GA of the shaft 541 is defined as a +z-direction-side end 550+zE, and an end on the −z-direction side is defined as a −z-direction-side end 550−zE. In the example of FIG. 8, the −z-direction-side end 550−zE is closer to the +y-direction than the shaft 560AX, and the +z-direction-side end 550+zE is closer to the +y-direction than the −z-direction-side end 550−zE. In addition, the −z-direction-side end 550−zE is closer to the +y-direction than the target surface y-direction center 322C, and the +z-direction-side end 550+zE is closer to the +y-direction than the −z-direction-side end 550−zE. When the positions of the shaft 541 and the shaft 560AX are compared with each other, the shaft 541 is closer to the +z-direction and the +x-direction, and the shaft 560AX is closer to the −z-direction than the −x-direction.

The link plate 530 extends obliquely upward between the +z-direction and the +y-direction from the shaft 560AX extending from the nut 520. The link plate 530 is inclined with respect to the z-direction such that the end portion on the side of the slide member 540 falls to the +y-side.

The guide rail 550 is located on the +y-side and the +z-side with respect to the X-ray generation source 126, and is disposed obliquely with respect to the z-direction. The guide rail 550 is a linear motion rail in the illustrated example, and is inclined with respect to the z-direction such that one end portion on the +z-side falls to the +y-side. In the guide rail 550, the +z-direction-side end portion is located closer to the +y-direction than the −z-direction end portion. That is, with respect to both end portions of the guide rail 550, the +z-direction end portion is located closer to the +y-direction, and the −z-direction-side end portion is located closer to the −y-direction. The inclination angle of the link plate 530 with respect to the z-direction and the inclination angle of the guide rail 550 with respect to the z-direction can be appropriately determined such that the displacement of the X-ray generation source 126 is optimized.

The moving unit 136 having the above configuration can change the posture of the X-ray generation source 126 according to the movement of the X-ray generation source 126 in the z-direction. In this example, because the X-ray beam forming unit 127 is not fixed to the X-ray generation source 126, the movement of the shielding members 441 to 444 in the X-ray beam forming unit 127 is required to be adapted to the displacement of the X-ray generation source 126, but the X-ray beam forming unit 127 may be fixed to the X-ray generation source 126 as in the example of FIG. 45 described later. In this case, the X-ray beam forming unit 127 also moves similarly to the movement of the X-ray generation source 126. Similarly to the posture change of the X-ray generation source 126, the posture of the X-ray beam forming unit 127 also changes.

Figure 9:
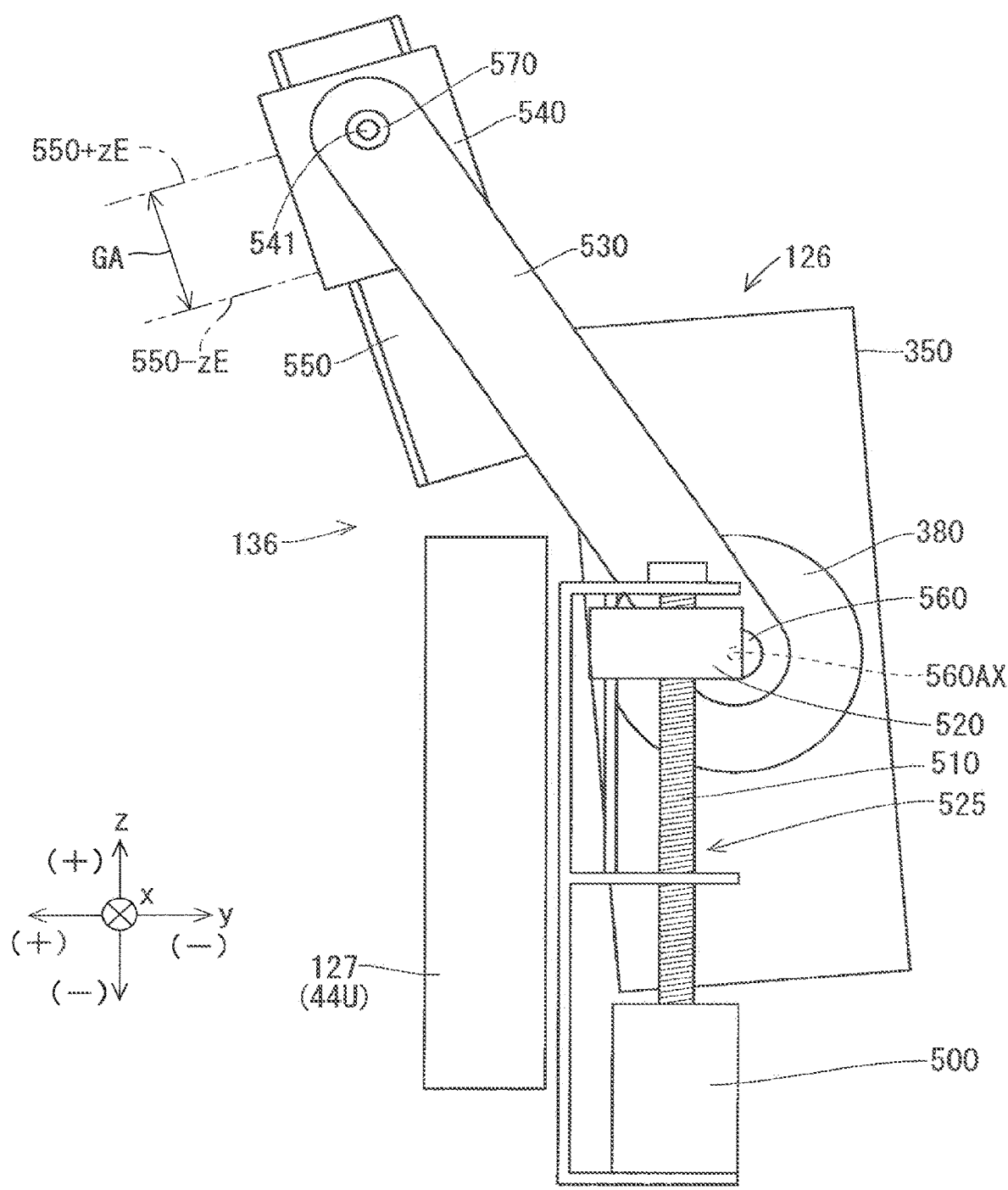
FIG. 9 is a schematic diagram illustrating a configuration example of the X-ray generation source moving unit.

FIG. 9 is a view illustrating an example of a state after the moving unit 136 moves the X-ray generation source 126 in FIG. 8 to the +z-side. When the X-ray generation source 126 is located on the most −z-side in the movement range in the z-direction of the X-ray generation source 126, for example, the posture of the X-ray generation source 126 is as illustrated in FIG. 8. On the other hand, when the X-ray generation source 126 is located closest to the +z-side, for example, the posture of the X-ray generation source 126 is as illustrated in FIG. 9.

When the motor 500 forwardly rotates the ball screw 510 under the control of the imaging controller 151a, the nut 520 moves to the +z-side and rises. At this point, the slide member 540 slides up on the guide rail 550, and the link plate 530, the X-ray generation source 126, and the chamber 380 move up to the +z-side. Furthermore, the end portion of the link plate 530 on the side of the ball bearing 570 is guided in the combined direction of the +z-direction and the +y-direction by the inclined guide rail 550, so that the inclination of the link plate 530 increases according to the rise of the link plate 530, the X-ray generation source 126 rotates (in other words, revolves) counterclockwise when viewed from the −x-side (when viewed from the front side of the drawing), and the posture of the X-ray generation source 126 changes. The rotation amount of the X-ray generation source 126 also increases according to the rising amount of the link plate 530.

On the other hand, when the motor 500 reversely rotates the ball screw 510 under the control of the imaging controller 151a, the nut 520 moves to the −z-side and descends. At this point, the slide member 540 slides down on the guide rail 550, and the link plate 530, the X-ray generation source 126, and the chamber 380 move down to the −z-side. Furthermore, the inclination of the link plate 530 decreases as the link plate 530 descends, and the X-ray generation source 126 rotates clockwise as viewed from the −x-side. The rotation amount of the X-ray generation source 126 also increases according to the lowering amount of the link plate 530. The motor 500, the ball screw 510, the nut 520, the guide rail 550, the link plate 530, and the Slide member 540 are components that tilting-drive the X-ray generation source 126 while rising and lowering the X-ray generation source 126, and function as a tilt driver.

Figure 10:
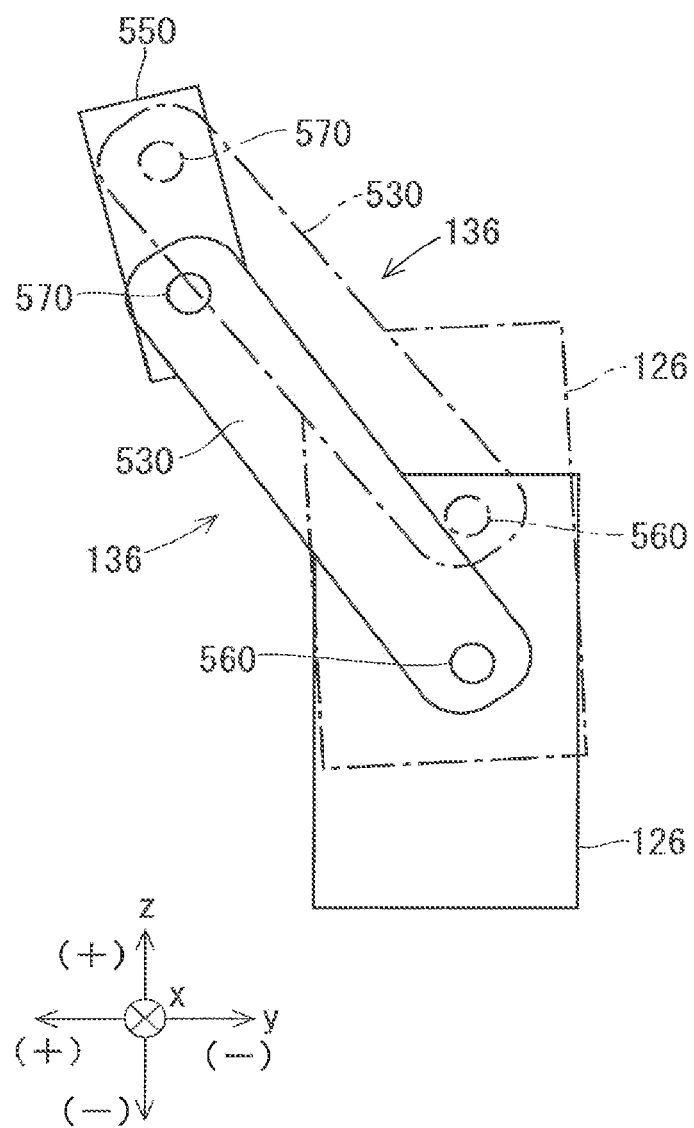
FIG. 10 is a schematic diagram illustrating an example of a state in which the X-ray generation source moves.

FIG. 10 is a view schematically illustrating the structure in FIG. 8 and the structure in FIG. 9 in an overlapping manner. In FIG. 10, the structure in FIG. 8 is indicated by a solid line, and the structure in FIG. 9 is indicated by a one-dot chain line.

As described above, the X-ray generation source 126 moves in the z-direction by being driven by the moving unit 136, and revolves around the x-direction according to the movement. When the X-ray generation source 126 rotates around the x-direction, the target surface 322 of the anode 320 of the X-ray generation source 126 also rotates around the x-direction. For example, when the X-ray generation source 126 revolves counterclockwise as viewed from the −x-side, the target surface 322 also rotates counterclockwise as viewed from the −x-side. Consequently, the inclination amount of the target surface 322 with respect to the z-direction changes according to the movement of the X-ray generation source 126 in the z-direction.

The X-ray generation source moving unit 136 is a moving unit that relatively moves the X-ray generation source 126 in the apparatus vertical direction with respect to the X-ray detector 226. The relative movement of the X-ray generation source 126 in the apparatus vertical direction with respect to the X-ray detector 226 may be implemented by performing the movement of the X-ray generation source 126 in the apparatus vertical direction on the side of the X-ray generation unit 125 as in the example. Alternatively, for example, a mechanism (an X-ray generation source moving unit that relatively moves) that moves the X-ray detector 226 in the apparatus vertical direction with respect to the base of the X-ray detection unit 225 may be provided without moving the X-ray generation source 126 in the apparatus vertical direction on the side of the X-ray generation unit 125. In this ease, when the X-ray detector 226 moves in the apparatus downward direction, the X-ray generation source 126 may move relative to the X-ray detector 226 in the apparatus upward direction. Alternatively, when the X-ray detector 226 moves in the apparatus upward direction, the X-ray generation source 126 may move relative to the X-ray detector 226 in the apparatus downward direction. The head fixing apparatus 142 (subject holder) may be configured of being movable up and down with respect to the support 124, and the head fixing apparatus 142 (subject holder) may be moved in the apparatus upward direction together with the movement of the X-ray detector 226 in the apparatus downward direction such that the head fixing apparatus 142 (subject holder) is moved in the apparatus downward direction together with the movement of the X-ray detector 226 in the apparatus downward direction. When the X-ray detector 226 moves in the apparatus downward direction, the lifting unit 122 may raise the support 124 to prevent the abutment of the X-ray detector 226 on the subject PD. The lifting unit 122 may lower the support 124 when the X-ray detector 226 moves in the apparatus upward direction. Both the movement of the X-ray generation source 126 on the side of the X-ray generation unit 125 in the apparatus vertical direction and the movement of the X-ray detector 226 on the side of the X-ray detection unit 225 in the apparatus vertical direction may be performed.

Figure 11:
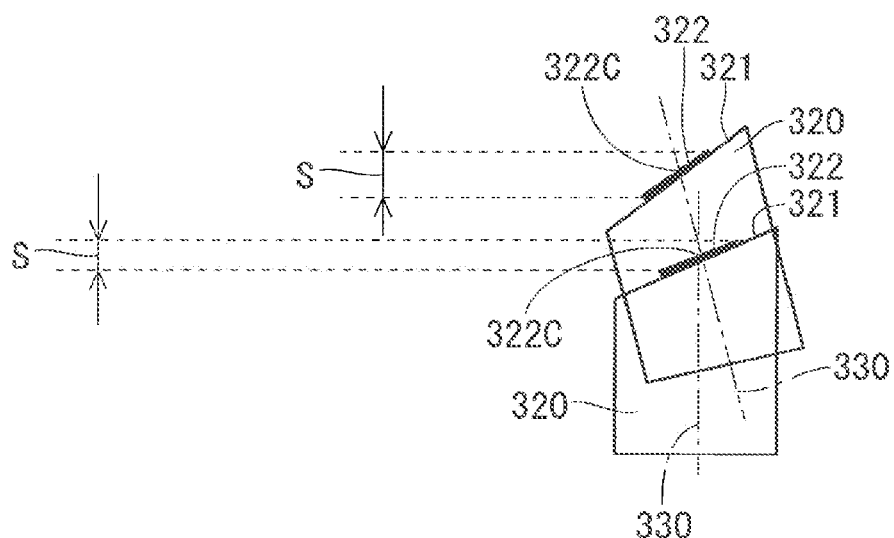
FIG. 11 is a schematic diagram illustrating an example of a state in which an apparent focal size changes.
Figure 11:
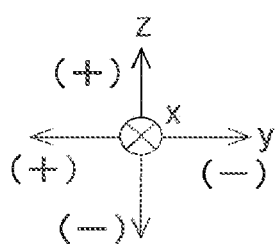

FIG. 11 is a view illustrating an example of the state in which the inclination amount of the target surface 322 with respect to the z-direction changes according to the movement in the z-direction of the X-ray generation source 126.

When the X-ray generation source 126 moves to the +z-side, namely, when the anode 320 moves to the +z-side and rises, the target surface 322 accordingly revolves counterclockwise when viewed from the −x-side, and the inclination amount of the target surface 322 with respect to the z-direction increases. That is, when the target surface 322 is viewed from the side of the X-ray detector 226 (+y-side), the posture of the target surface 322 changes so as to rise according to the rise of the X-ray generation source 126. The rotation amount of the target surface 322 also increases according to the rising amount of the X-ray generation source 126. On the other hand, when the X-ray generation source 126 moves to the −z-side and lowers, the target surface 322 accordingly revolves clockwise when viewed from the −x-side, and the inclination amount of the target surface 322 with respect to the z-direction decreases. That is, when the target surface 322 is viewed from the side of the X-ray detector 226 (+y-side), the posture of the target surface 322 changes so as to lie down according to the lowering of the X-ray generation source 126. The rotation amount of the target surface 322 also increases according to the lowering amount of the X-ray generation source 126.

When the target surface 322 revolves counterclockwise as viewed from the −x-side according to the rise of the X-ray generation source 126, the focal size S (apparent focal size S) of the X-ray generation source 126 increases. Specifically, the spread in the z-direction of the focal size S increases. In this example, the rotation amount of the target surface 322 increases according to the rising amount of the X-ray generation source 126, so that the focal size S increases by the rising amount of the X-ray generation source 126.

On the other hand, when the target surface 322 revolves clockwise as viewed from the −x-side according to the lowering of the X-ray generation source 126, the focal size S of the X-ray generation source 126 decreases. Specifically, the spread in the z direction of the focal size S decreases. In this example, the rotation amount of the target surface 322 increases according to the lowering amount of the X-ray generation source 126, so that the focal size S decreases by the lowering amount of the X-ray generation source 126.

Figure 12:
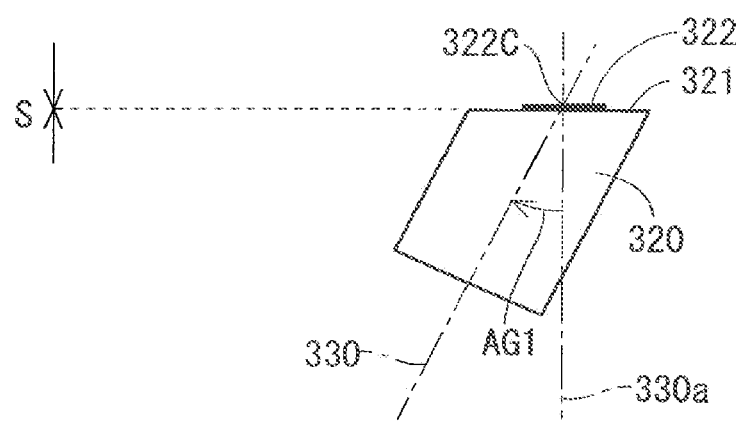
FIG. 12 is a schematic diagram illustrating an example of the state in which the apparent focal size changes.
Figure 12:
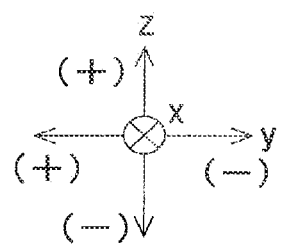
Figure 13:
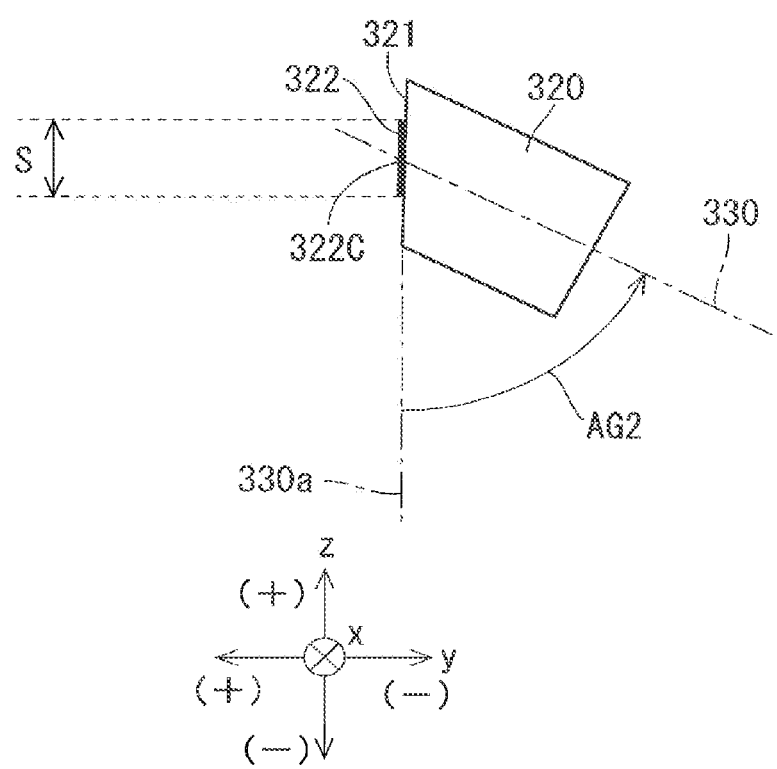
FIG. 13 is a schematic diagram illustrating an example of the state in which the apparent focal size changes.

When the axis line 330 extends in the z-direction, the target surface 322 is a surface in which the −y-direction side is inclined in the +z-direction and the +y-direction side is inclined in the −z-direction with respect to an xy-plane that expands two-dimensionally in the x-direction and the y-direction. At this point, the case where the target surface 322 is rectangular, the axis line 330 passes through the target surface y-direction center 322C, and the target surface 322 is rotated about an axis extending in the x-direction from the reference posture around the target surface y-direction center 322C is considered. The reference posture is the posture of the target surface 322 when the axis line 330 extends in the z-direction. In this case, as illustrated in FIG. 12, when the target surface 322 rotates clockwise by an angle AG1 as viewed from the −x-side, the angle formed by the target surface 322 and the y-direction as viewed in the +x-direction becomes zero, and the apparent focal size S as viewed in the −y-direction becomes minimum. On the other hand, as illustrated in FIG. 13, when the target surface 322 rotates counterclockwise by an angle AG2 as viewed from the −x-side, the angle formed by the target surface 322 and the y-direction as viewed in the +x-direction is 90 degrees, and the apparent focal size S as viewed in the −y-direction is maximized. In FIGS. 12 and 13, the axis line 330 when the target surface 322 is in the reference posture is illustrated as an axis line 330a. When the angle formed between the target surface 322 and the y-direction is within the range of 0 to 90°, the closer to zero, the smaller the apparent focal size S, and the closer to 90°, the larger the apparent focal size S. In the present specification, the fact that the angle formed by a certain direction (the line-of-sight direction, the y-direction) with respect to a certain surface (target surface 322) is closer to zero may be expressed as "an acute angle is high", and the fact that the angle formed by the certain direction (the line-of-sight direction, the y-direction) with respect to the certain surface (target surface 322) is closer to 90° may be expressed as "the acute angle is low". In the example of FIG. 11, the focal size S is small because the acute angle in the line-of-sight direction with respect to the target surface 322 is high, and the focal size S is large because the acute angle in the line-of-sight direction with respect to the target surface 322 is low.

In the example of the posture change of the X-ray generation source 126 in FIG. 11, the axis line 330 extends in the z-direction when the X-ray generation source 126 (anode 320) is located closer to the −z-side, and the axis line 330 is inclined with respect to the z-direction such that the +z-side of the axis line 330 is inclined to the +y-side when the X-ray generation source 126 (anode 320) is located closer to the +z-side. However, the state in which the X-ray generation source 126 changes the posture according to the movement in the z-direction is not limited to the example in FIG. 11.

Figure 14:
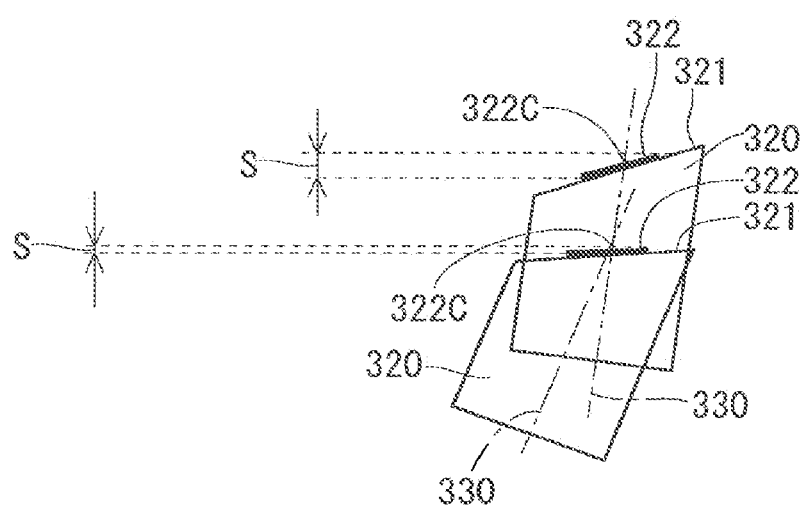
FIG. 14 is a schematic diagram illustrating an example of the state in which the apparent focal size changes.
Figure 14:
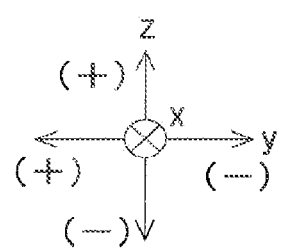
Figure 15:
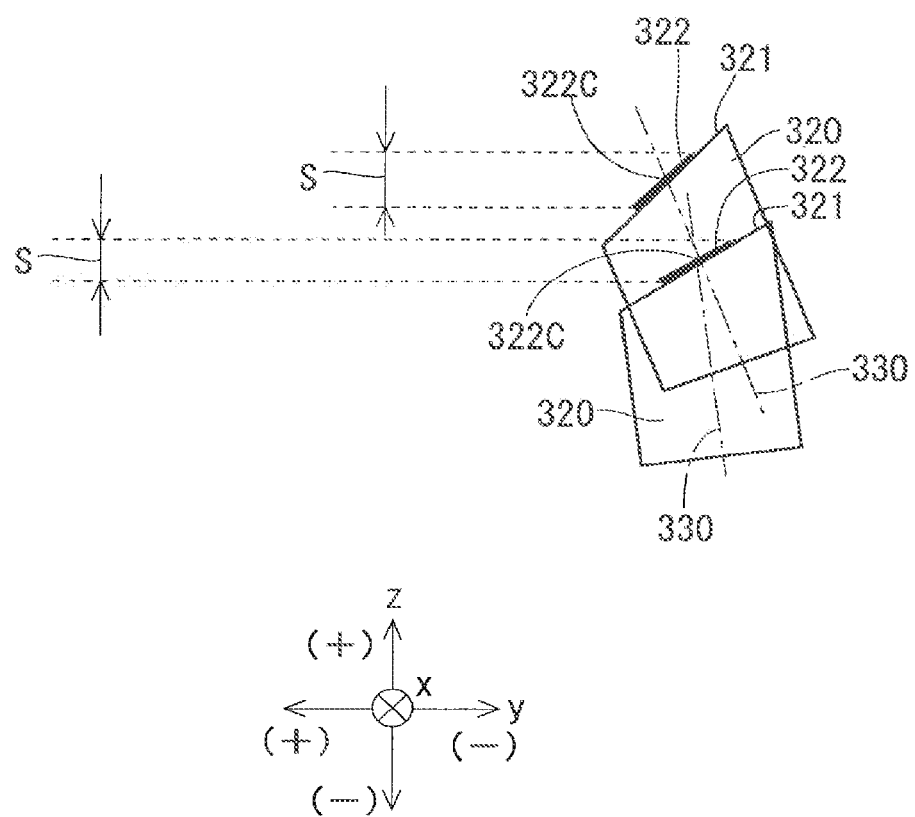
FIG. 15 is a schematic diagram illustrating an example of the state in which the apparent focal size changes.
Figure 16:
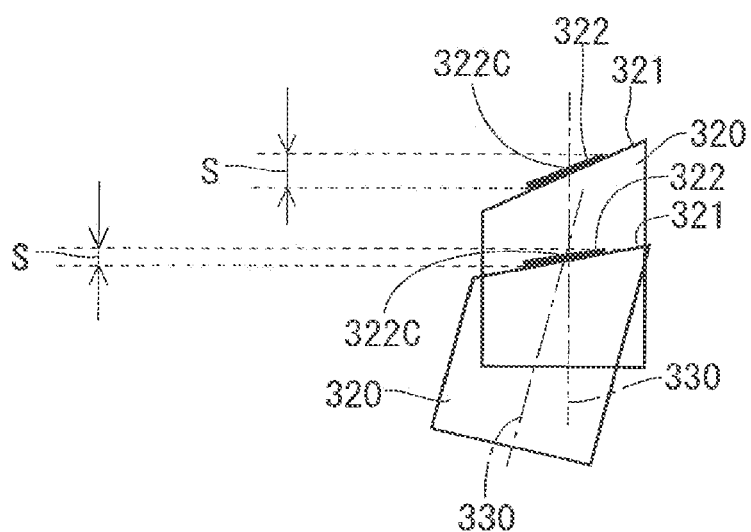
FIG. 16 is a schematic diagram illustrating an example of the state in which the apparent focal size changes.
Figure 16:
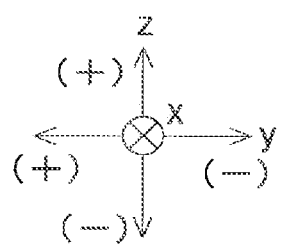
Figure 17:
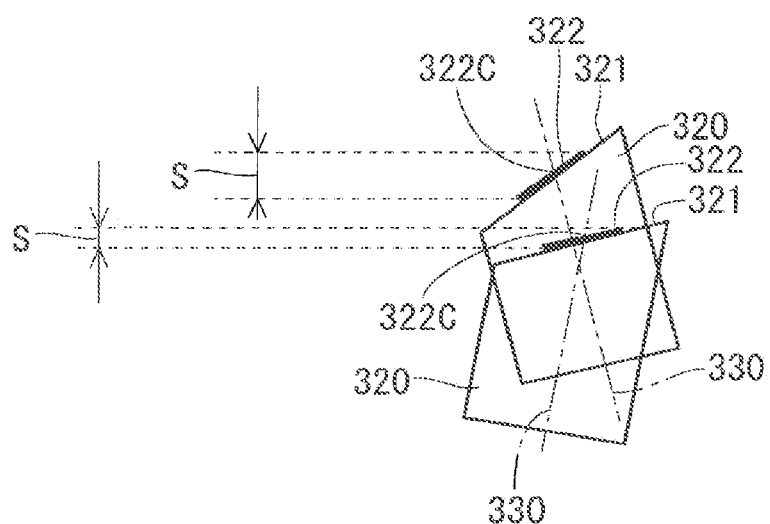
FIG. 17 is a schematic diagram illustrating an example of the state in which the apparent focal size changes.
Figure 17:
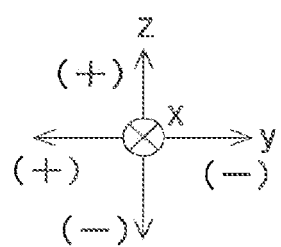

For example, as illustrated in FIG. 14, the axis line 330 may be inclined with respect to the z-direction such that the +z-side of the axis line 330 is inclined to the −y-side in both the case where the X-ray generation source 126 (anode 320) is located closer to the −z-side and the case where the X-ray generation source 126 is located closer to the +z-side. Alternatively, as illustrated in FIG. 15, the axis line 330 may be inclined with respect to the z-direction such that the +z-side of the axis line 330 is inclined to the +y-side in both the case where the X-ray generation source 126 is located closer to the −z-side and the case where the X-ray generation source 126 is located closer to the +z-side. Alternatively, as illustrated in FIG. 16, the axis line 330 may be inclined with respect to the z-direction such that the +z-side of the X-ray generation source 126 is inclined to the −y-side when the axis line 330 is located closer to the −z-side, and the axis line 330 may extend in the z-direction when the X-ray generation source 126 is located closer to the +z-side. Alternatively, as illustrated in FIG. 17, the axis line 330 may be inclined with respect to the z-direction such that the +z-side of the axis line 330 is inclined to the −y-side when the X-ray generation source 126 is located closer to the −z-side, and the axis line 330 may be inclined with respect to the z-direction such that the +z-side of the axis line 330 is inclined to the +y-side when the X-ray generation source 126 is located closer to the +z-side.

Figure 18:
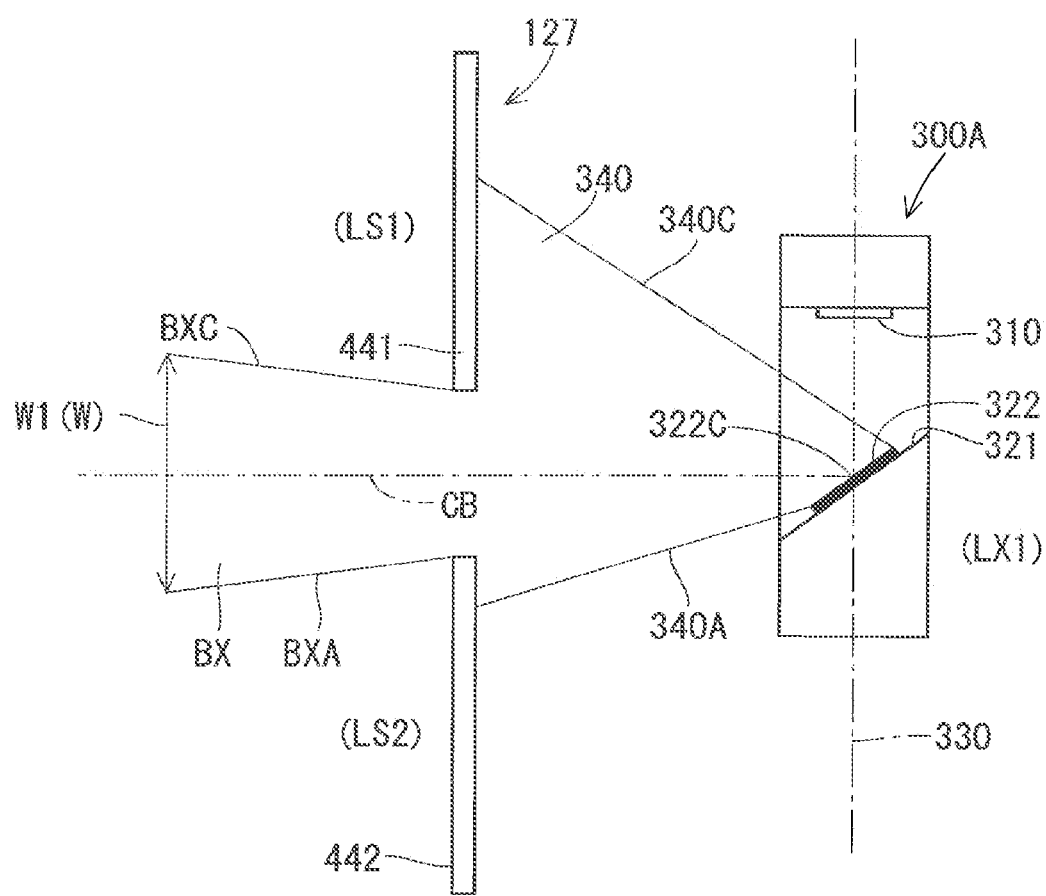
FIG. 18 is a view illustrating an example of spread of an X-ray cone beam.
Figure 19:
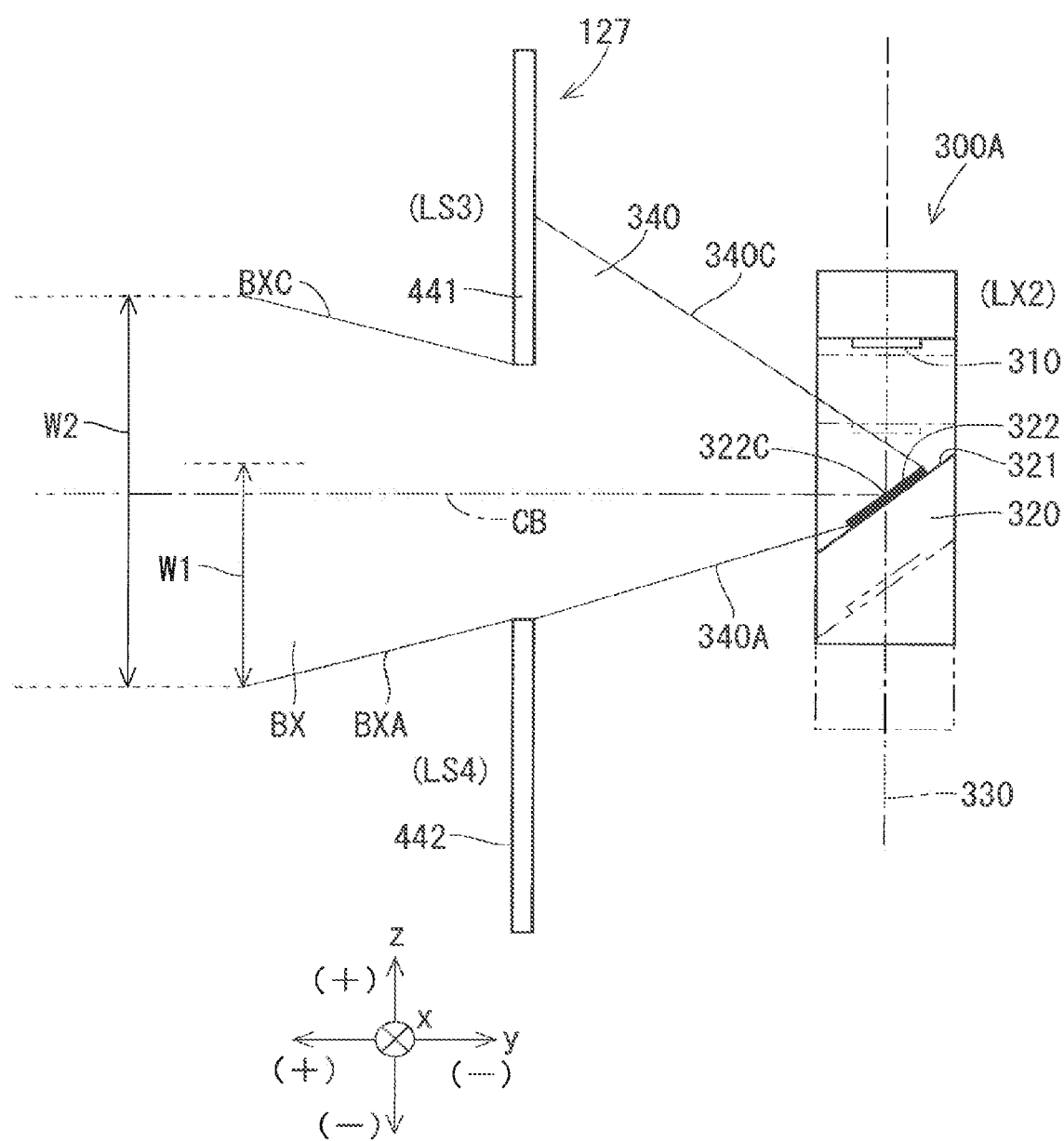
FIG. 19 is a view illustrating an example of the spread of the X-ray cone beam.
Figure 20:
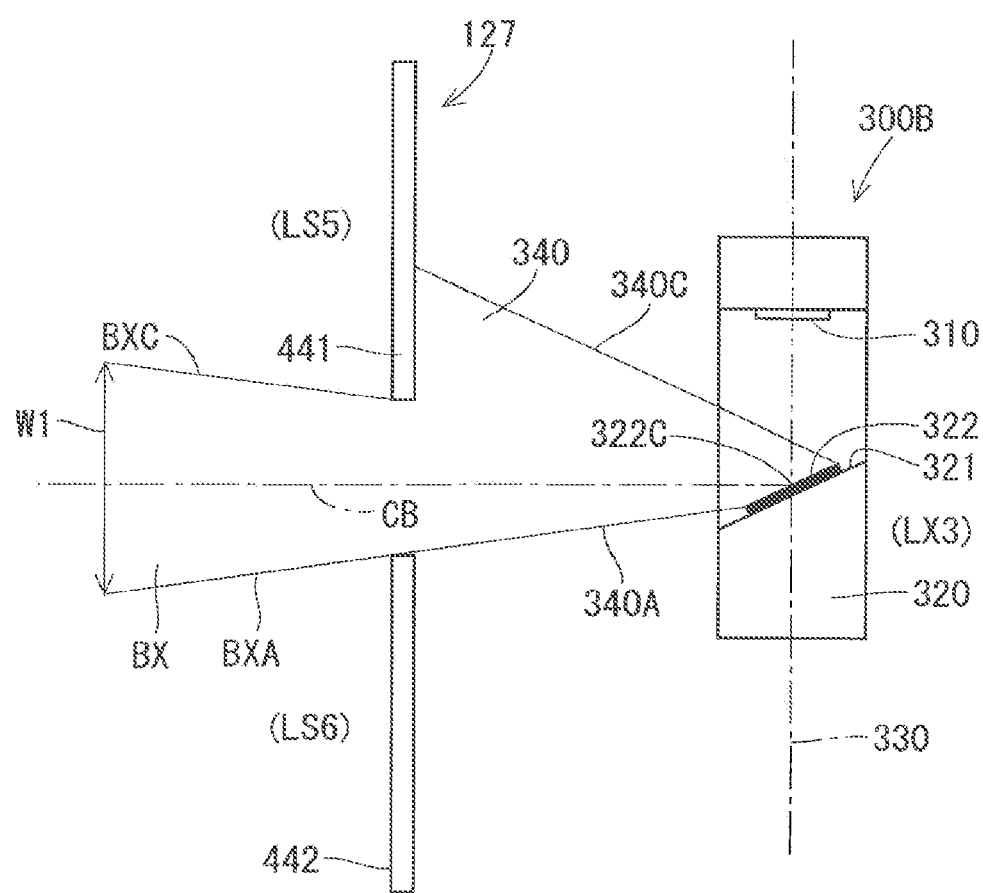
FIG. 20 is a view illustrating an example of the spread of the X-ray cone beam.
Figure 21:
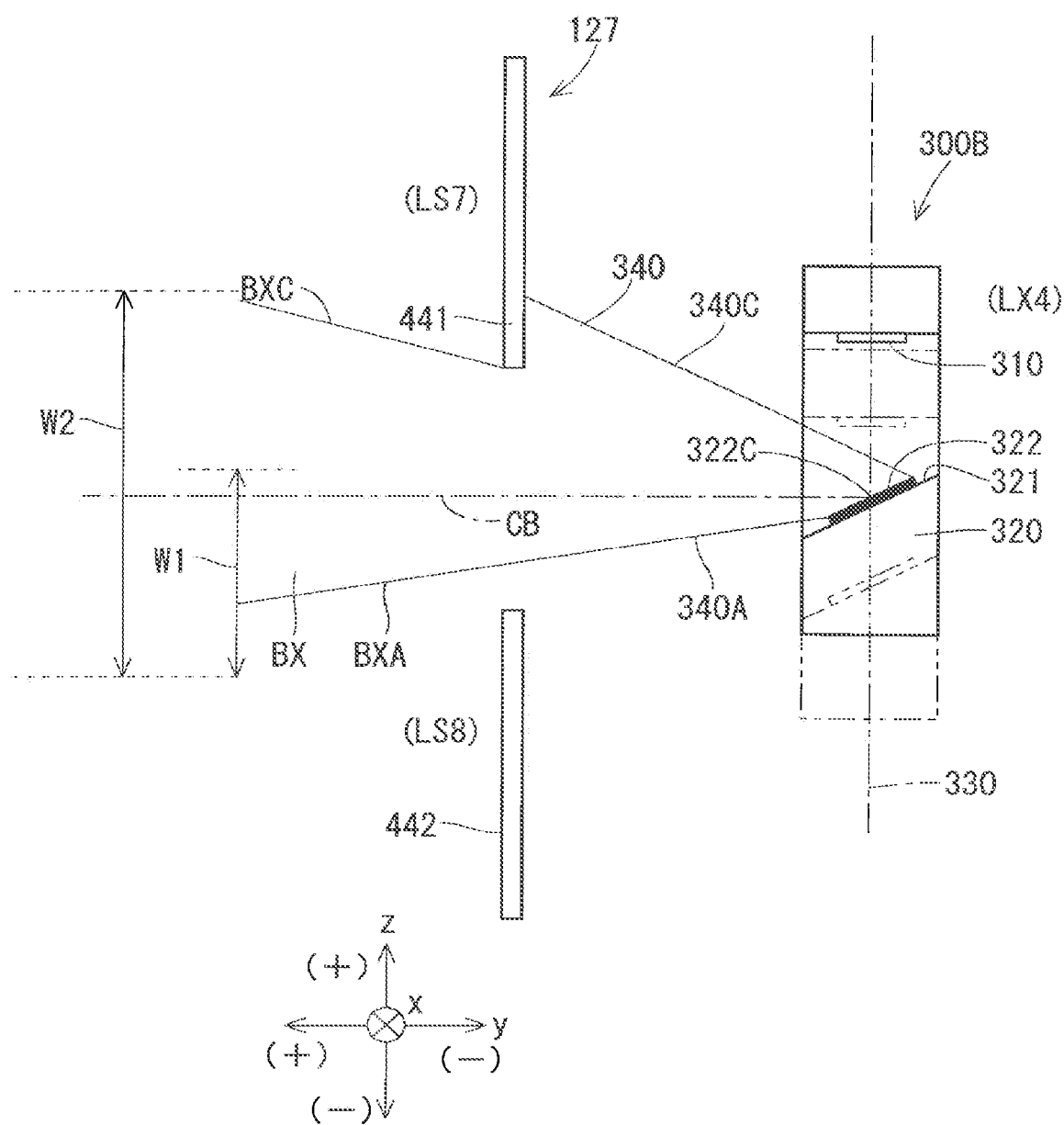
FIG. 21 is a view illustrating an example of the spread of the X-ray cone beam.
Figure 22:
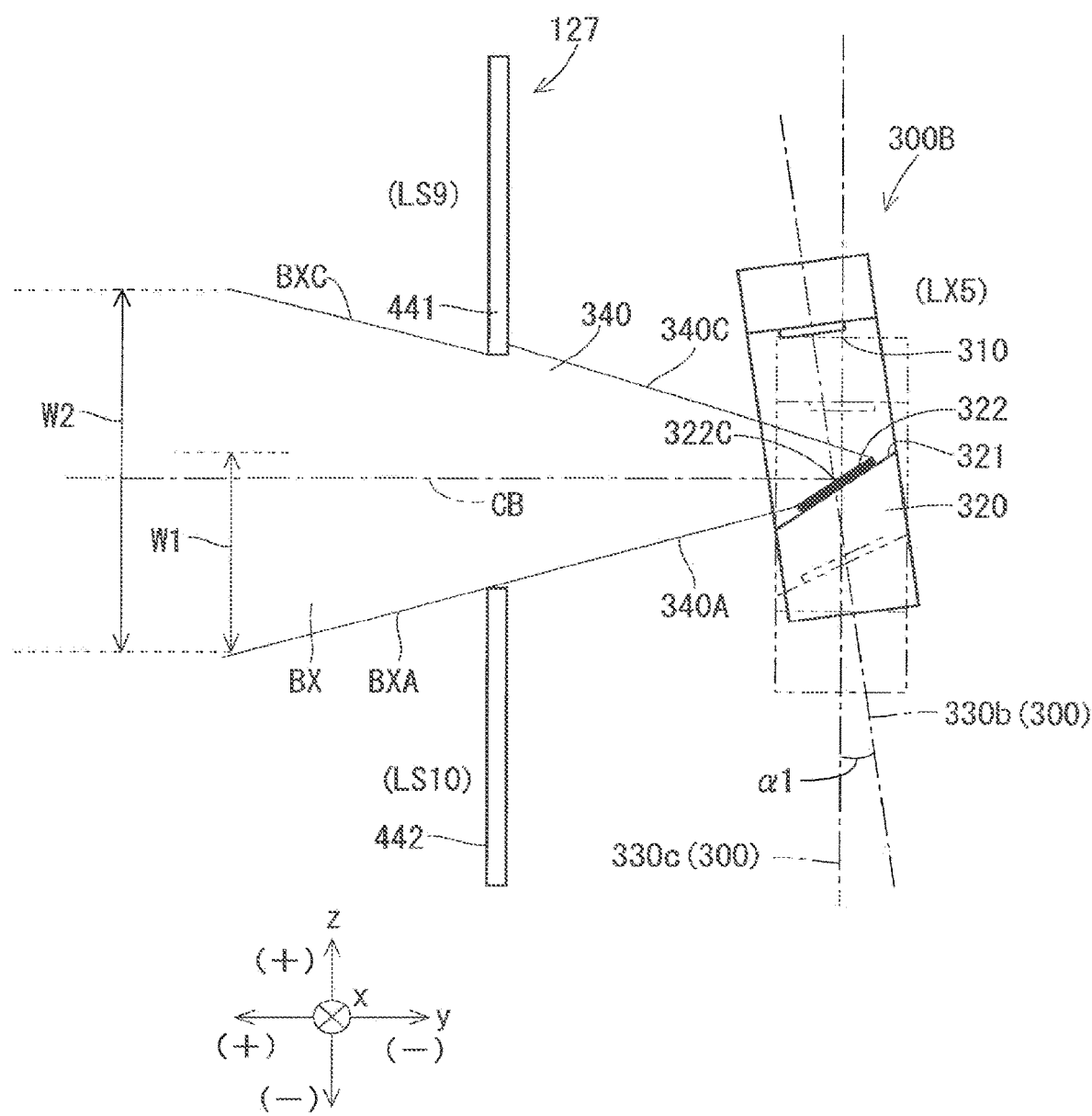
FIG. 22 is a view illustrating an example of the spread of the X-ray cone beam.

FIGS. 18 to 22 are views illustrating an example of the state in which the spread W (W1, W2) in the z-direction of the X-ray cone beam BX formed by the X-ray beam forming unit 127 changes according to the movement in the z-direction of the X-ray generation source 126. FIGS. 18 and 19 illustrate an example in which the X-ray tube 300 (also referred to as an X-ray tube 300A) in which the spread of the X-ray 340 from the target surface 322 is large is used, and FIGS. 20 to 22 illustrate an example in which the X-ray tube 300 (also referred to as an X-ray tube 300B) in which the spread of the X-ray 340 from the target surface 322 is small is used. Matters related to this are also referred to in the description of FIG. 30 described later. In the spread W of the X-ray cone beam BX, an end closer to the cathode 310 is defined as a cone beam end BXC, and an end farther from the cathode 310 is defined as a cone beam end BXA.

In the example of FIG. 18, the state of the disposition and posture of the X-ray tube 300A is a state LX1, and the X-ray cone beam BX has a spread W1, the X-ray cone beam BX being generated by regulating the X-ray 340 generated from the X-ray tube 300A using the X-ray beam forming unit 127. The shielding member 441 is located at a position LS1 and the shielding member 442 is located at a position LS2. The X-ray beam forming unit 127 forms the X-ray cone beam BX such that a center beam CB is horizontally irradiated (with a constant height in the z-direction from the −y-side toward the +y-side), spreads, and passes through the center of the spread W1.

The X-ray tube 300A in FIG. 19 is obtained by moving the X-ray tube 300A in FIG. 18 in the +z-direction without tilting. In the example of FIG. 19, the state of the disposition and posture of the X-ray tube 300A is a state LX2, and the X-ray cone beam BX has a spread W2 larger than the spread W1. The shielding member 441 is located at a position LS3 and the shielding member 442 is located at a position LS4. The center beam CB is horizontally irradiated and passes through the center of the spread W2. The distance between the position LS3 and the position LS4 is larger than the distance between the position LS1 and the position LS2.

Both the spread W1 of the X-ray cone beam BX in the example of FIG. 18 and the spread W2 of the X-ray cone beam BX in the example of FIG. 19 are within the range of the spread between the X-ray end 340C and the X-ray end 340A of the spread of the X-ray 340.

In the example of FIG. 20, the state of the disposition and posture of the X-ray tube 300B is a state LX3, and the X-ray cone beam BX has the spread W1. The shielding member 441 is located at a position LS5 and the shielding member 442 is located at a position LS6. The X-ray beam forming unit 127 forms the X-ray cone beam BX such that a center beam CB is horizontally irradiated (with a constant height in the z-direction from the −y-side toward the +y-side), spreads, and passes through the center of the spread W1. The X-ray tube 300B in FIG. 20 is disposed such that a position in the z-direction of the target surface y-direction center 322C of the X-ray tube 300B is matched with a position in the z-direction of the target surface y-direction center 322C of the X-ray tube 300A in FIG. 18.

In the example of FIG. 20, the shielding member 441 is located at the position LS5, and the position LS5 is substantially matched with the position LS1 of the example in FIG. 18. The shielding member 442 is at the position LS6, and the position LS6 is substantially matched with the position LS2 in the example of FIG. 18. In the example of FIG. 20, the spread of the X-ray 340 is restricted such that the cone beam end BXA continues on the straight line with the X-ray end 340A.

In the example of FIG. 20, although the X-ray tube 300B in which the spread of the X-ray 340 is small is used, when the disposition and posture of the X-ray tube 300B are similar to those of the X-ray tube 300A of the example in FIG. 18 and where the positions of the shielding members 441 and 442 are similar to those of the example in FIG. 18, the spread W of the X-ray cone beam BX is the same as that of the example in FIG. 18.

The X-ray tube 300B in FIG. 21 is obtained by moving the X-ray tube 300B in FIG. 20 in the +z-direction without tilting. In the example of FIG. 21, the state of the disposition and posture of the X-ray tube 300B is a state LX4, and the disposition and posture of the X-ray tube 300B are similar to the disposition and posture of the X-ray tube 300A of the example in FIG. 19. The X-ray tube 300B in FIG. 21 is disposed such that the position in the z direction of the target surface y-direction center 322C of the X-ray tube 300B is matched with the position in the z-direction of the target surface y-direction center 322C of the X-ray tube 300A in FIG. 19.

In the example of FIG. 21, the shielding member 441 is located at a position LS7, and the position LS7 is substantially matched with the position LS3 of the example in FIG. 19. The shielding member 442 is located at a position LS8, and the position LS8 is substantially matched with the position LS4 of the example in FIG. 19.

In the example of FIG. 21, the disposition and posture of the X-ray tube 300B are similar to those of the X-ray tube 300A of the example in FIG. 19, and the positions of the shielding members 441 and 442 are similar to those of the example in FIG. 19. However, the spread W of the X-ray cone beam BX is not the same as that of the example in FIG. 19, but is smaller than that of the example in FIG. 19. Specifically, in the example of FIG. 21, because the spread of the X-ray 340 is smaller than the spread W2 on the side of the X-ray end 340A, the spread W of the X-ray cone beam BX is insufficient on the −z-side of the spread W2.

Accordingly, as illustrated in FIG. 22, the X-ray tribe 300 is inclined such that the target surface 322 revolves counterclockwise when viewed from the −x-side, and the state of the disposition and posture of the X-ray tube 300B is set to the state LX5. That is, the side of the cathode 310 is closer to the +y-direction than the side of the anode 320 by tilting the X-ray generation source 126, and the state of the disposition and posture of the X-ray tube 300B is set to the state LX5. With reference to the example in FIG. 20, the X-ray tube 300B is moved in the +z-direction, the X-ray tube 330B is tilted counterclockwise in the drawing such that a new axis line 330b is tilted by an angle α1 with respect to an original axis line 300c, and the shielding member 441 is located at a position LS9 and the shielding member 442 is located at a position LS10, whereby the X-ray cone beam BX has the spread W2 and the center beam CB is irradiated horizontally and passes through the center of the spread W2. The distance between the position LS9 and the position LS10 is larger than the distance between the position LS5 and the position LS6 in the example of FIG. 20. Thus, the spread W1 and the spread W2 of the X-ray cone beam BX can be kept within the range of the spread between the X-ray end 340C and the X-ray end 340A of the spread of the X-ray 340. Comparing the focal sizes S in the examples of FIGS. 20 and 22, the focal size S in the example of FIG. 20 is small, and the focal size S in the example of FIG. 22 is large.

As described above, between the control in FIG. 20 and the control in FIG. 22, the focal size S increases according to the rise of the X-ray generation source 126, and the spread W in the z direction of the X-ray 340 is increased. As described above, because the imaging resolution decreases as the focal size S increases, it can be said that the imaging resolution decreases as the X-ray generation source 126 rises. On the other hand, as the X-ray generation source 126 is lowered, the focal size S decreases, and the spread W in the z direction of the X-ray 340 also decreases. The imaging resolution is improved as the focal size S decreases, so that it can be said that the imaging resolution is improved as the X-ray generation source 126 is lowered. It can be said that the moving unit 136 can change the focal size S of the X-ray generation source 126 by driving the X-ray generation source 126. Alternatively, it can be said that the moving unit 136 can change the spread W in the z-direction of the X-ray 340 by driving the X-ray generation source 126. However, although "the imaging resolution decreases as the focal size S increases", in the example of FIG. 22, because the cone beam end BXA continues to the X-ray end 340A on the straight line, the range in which the target surface 322 can be viewed at the most acute angle in the spread of the X-ray 340 is incorporated in the X-ray cone beam BX.

<Configuration Example of X-Ray Detection Unit Moving Unit>

Figure 23:
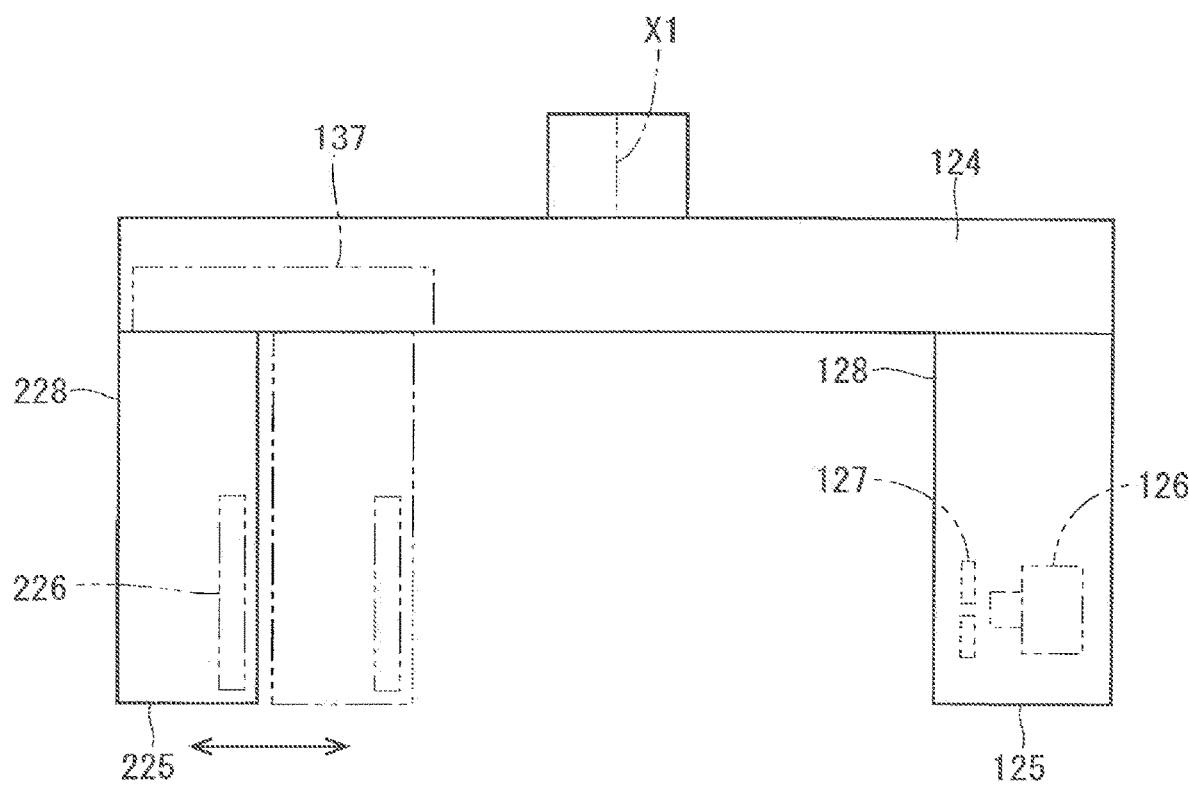
FIG. 23 is a schematic diagram illustrating an example of a state in which an X-ray detection unit moving unit moves an X-ray detection unit.
Figure 23:
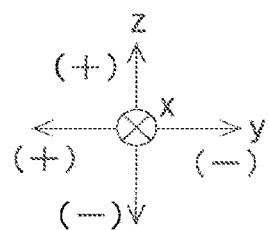

FIG. 23 is a schematic view illustrating a configuration example of the X-ray detection unit moving unit 137 (also simply referred to as the moving unit 137). The X-ray detection unit moving unit 137 is also an X-ray detection apparatus moving apparatus. As illustrated in FIG. 23, for example, the moving unit 137 is incorporated in the support 124. For example, the moving unit 137 includes a moving mechanism is configured of a ball screw mechanism including a motor, a ball screw, a nut, and a linear guide. The moving unit 137 may be configured of another linear actuator such as a linear motor.

The moving unit 137 can move the entire X-ray detection unit 225 in the y-direction under the control of the imaging controller 151a. Thus, the moving unit 137 can move the X-ray detection unit 225 close to and away from the X-ray generation unit 125. In other words, the moving unit 137 can bring the X-ray detection unit 225 close to and away from the head P. In the X-ray detection unit 225, as illustrated in FIG. 23, the bottom portion of the X-ray detector 226, in other words, the −z-side end portion of the X-ray detector 226 is disposed at the bottom portion of the extending unit 228.

When the X-ray detection unit 225 moves to the −y-side and approaches the X-ray generation unit 125, a magnification ratio of the X-ray imaging in the imaging body 120 decreases. When the magnification ratio of the X-ray imaging is decreased, the imaging resolution is improved. On the other hand, when the X-ray detection unit 225 moves to the +y-side and moves away from the X-ray generation unit 125, the magnification ratio of the X-ray imaging increases. When the magnification ratio of the X-ray imaging increases, the imaging resolution decreases.

<Operation Example of X-Ray Imaging Apparatus>

Various examples of the operation of the X-ray imaging apparatus 110, particularly, the operation of the imaging body 120 when the imaging body 120 performs the X-ray CT imaging will be described below.

First Operation Example

Figure 24:
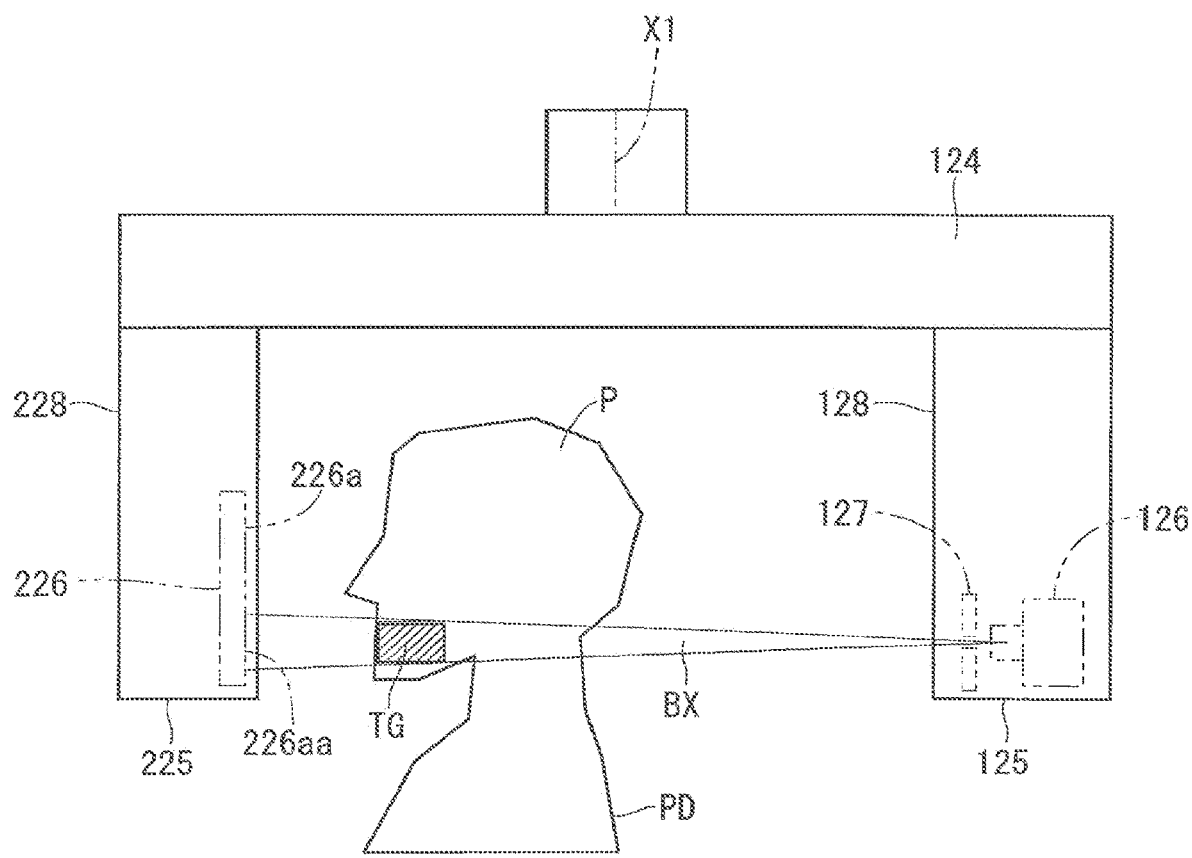
FIG. 24 is a schematic diagram illustrating an operation example of the X-ray imaging apparatus.
Figure 25:
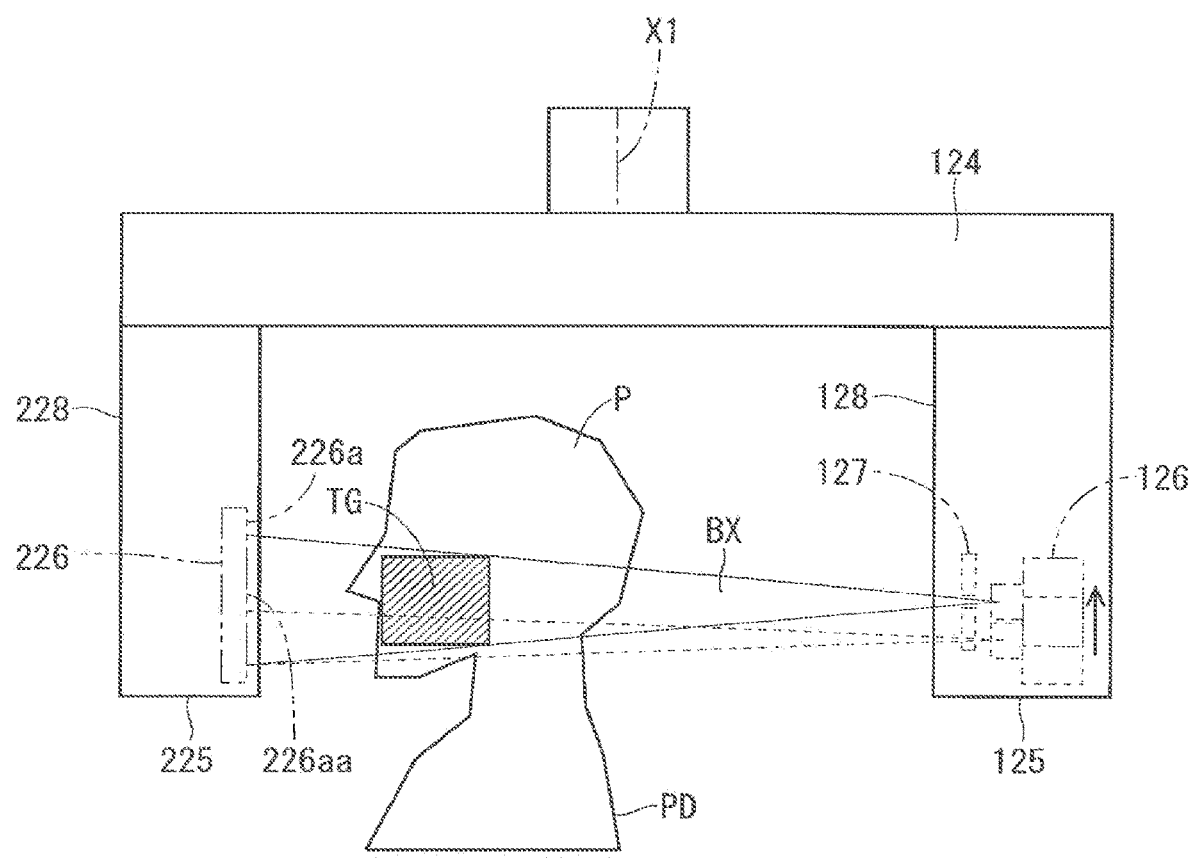
FIG. 25 is a schematic diagram illustrating an operation example of the X-ray imaging apparatus.
Figure 26:
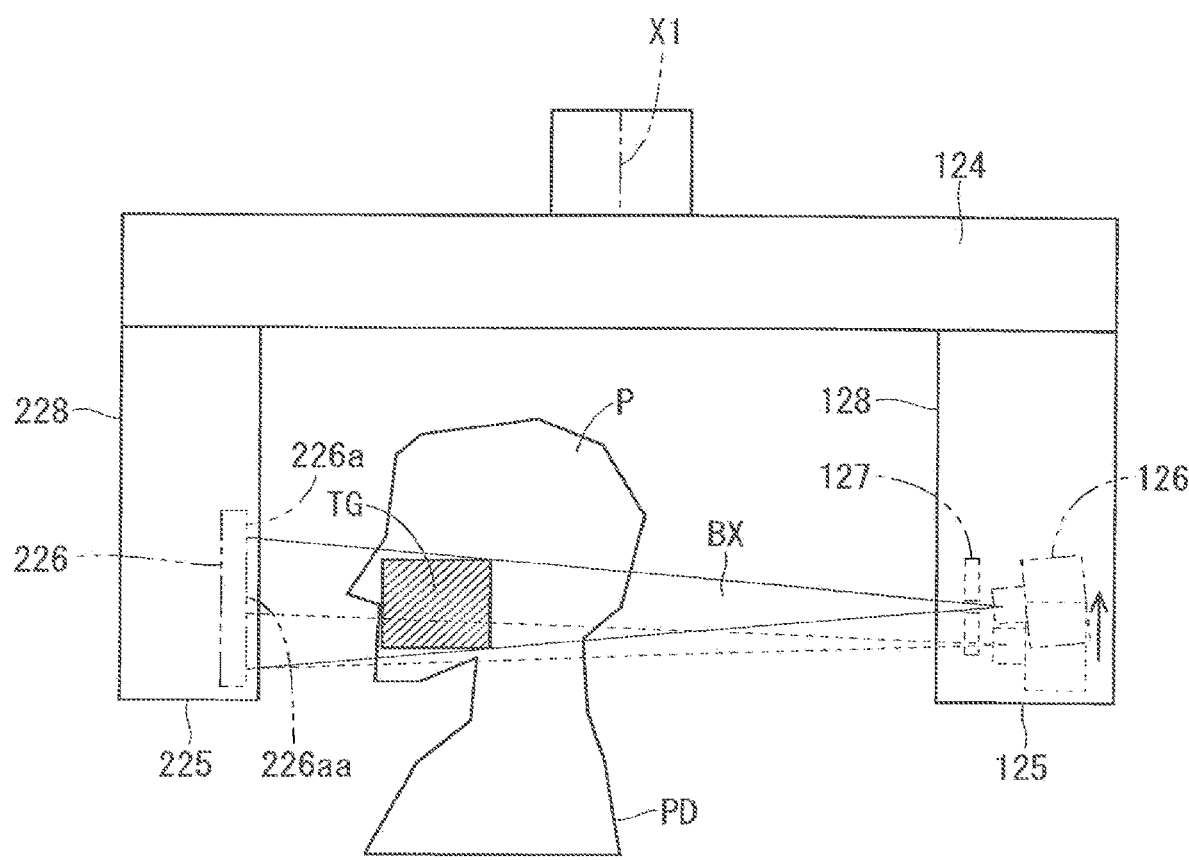
FIG. 26 is a schematic diagram illustrating an operation example of the X-ray imaging apparatus.

FIGS. 24 to 26 are schematic diagrams illustrating an example of the operation of the imaging body 120. FIG. 24 illustrates the state in which the X-ray generation source 126 is located at the bottom portion of the extending unit 128. FIGS. 25 and 26 illustrate the states in which the X-ray generation source 126 in FIG. 24 moves to the +z-side. In imaging target regions TG of FIGS. 25 and 26, both the spread in the z-direction and the spread in the y-direction are larger than those in an imaging target region TG of FIG. 24. FIG. 25 illustrates the state in which the X-ray generation source 126 moves to the +z-side without tilting. FIG. 26 illustrates the state in which the X-ray generation source 126 moves to the +z-side and tilts.

In this example, as illustrated in FIG. 24, when the X-ray generation source 126 is located on the −z-side, the spread in the z-direction of the X-ray cone beam BX emitted from the X-ray beam forming unit 127 is small. Thus, the imaging body 120 can appropriately perform the X-ray imaging on the small imaging target region TG set at the lower portion of the head P. For example, the X-ray cone beam BX in FIG. 24 is implemented using the configurations in FIGS. 18 and 20.

In this example, as illustrated in FIGS. 25 and 26, when the X-ray generation source 126 is located on the +z-side, the spread in the z-direction of the X-ray cone beam BX is large. Consequently, the imaging body 120 can appropriately perform the X-ray imaging on the large imaging target region TG in the head P.

For example, the X-ray cone beam BX in FIG. 25 is obtained by changing the states of the X-ray generation source 126 and the X-ray beam forming unit 127 from the state FIG. 18 (the state in FIG. 24) to the state in FIG. 19. When the states of the X-ray generation source 126 and the X-ray beam forming unit 127 change from the state in FIG. 24 to the state in FIG. 25, the X-ray tube 300 does not tilt, so that the focal size S does not change (strictly, the focal size S does not change at least in the range of the X-ray cone beam BX in the state of FIGS. 18 and 24).

For example, the X-ray cone beam BX in FIG. 26 is obtained by changing the states of the X-ray generation source 126 and the X-ray beam forming unit 127 from the state in FIG. 20 (the state in FIG. 24) to the state in FIG. 22. When the states of the X-ray generation source 126 and the X-ray beam forming unit 127 change from the state in FIG. 24 to the state in FIG. 26, the X-ray tube 300 tilts, so that the focal size S changes (strictly, the focal size S changes at least in the range of the X-ray cone beam BX in the states of FIGS. 20 and 24). Specifically, when the states of the X-ray generation source 126 and the X-ray beam forming unit 127 change from the state in FIG. 24 to the state in FIG. 26, the focal size S increases. In the state of FIG. 24, the focal size S of the X-ray generation source 126 is small, so that the resolution of the X-ray imaging for the small imaging target region TG can be improved. When the imaging target region TG is large, the X-ray tube 300 is tilted to increase the focal size S as in the example of FIG. 26, whereby the X-ray cone beam BX having the large spread in the z-direction can be obtained. Consequently, the large imaging target region TG can be appropriately irradiated with the X-ray cone beam BX.

In the examples of FIGS. 24 to 26, it can also be said that the X-ray generation source 126 moves in the z-direction according to the size of the imaging target region TG. The moving unit 136 moves the X-ray generation source 126 to the +z-side as the imaging target region TG increases under the control of the imaging controller 151a.

In the examples of FIGS. 24 to 26, it can be said that the moving unit 136 changes the position of the focal point of the X-ray generation source 126 by moving the X-ray generation source 126 according to the range of the imaging target region TG under the control of the imaging controller 151a.

As illustrated in FIGS. 24 to 26, a detection surface 226a of the X-ray detector 226 includes an irradiation region 226aa irradiated with the X-ray beam. In the examples of FIGS. 24 to 26, the X-ray beam forming unit 127 sets the position of the +z-side end of the X-ray cone beam BX in the irradiation region 226aa to the −z-side as compared with the case that the spread in the z-direction of the X-ray cone beam BX is large when the spread is small.

In the examples of FIGS. 24 to 26, the X-ray beam forming unit 127 matches the position of the −z-side end of the X-ray cone beam BX in the irradiation region 226aa when the spread in the z-direction of the X-ray cone beam BX is small and when the spread in the z-direction of the X-ray cone beam BX is large.

Assuming that the imaging target region TG in FIG. 24 is a first imaging target region TG1 and that the imaging target region TG in FIG. 25 or 26 is a second imaging target region TG2, a combination in which the first imaging target region TG1 is a dental arch region and the second imaging target region TG2 is a region including the dental arch region and a region above the dental arch region, a combination in which the first imaging target region TG1 is a lower jaw region and the second imaging target region TG2 is a region including both the lower jaw and the upper jaw, and the like can be considered as an example of the combination of the imaging target region TG in FIG. 24 and the imaging target region TG in FIG. 25 or 26.

At this point, the focal point of the X-ray generation source 126 turns around the head P according to the turning of the X-ray generation unit 125 and the X-ray detection unit 225. A virtual turning plane 600 is formed by the turning orbit of the focal point of the X-ray generation source 126.

Figure 27:
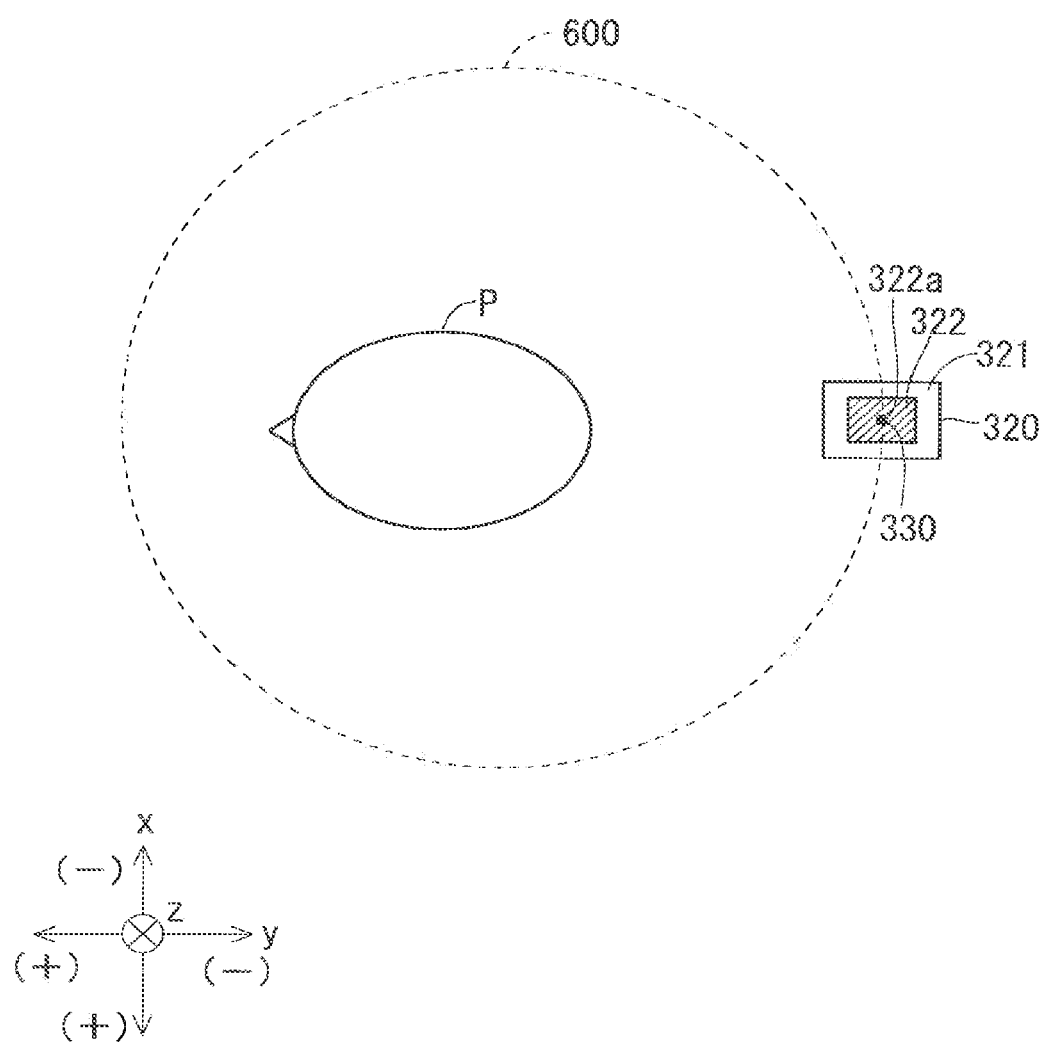
FIG. 27 is a schematic diagram illustrating an example of a turning plane of a focal point.

FIG. 27 is a schematic view illustrating an example of the turning plane 600. For example, the turning plane 600 is a plane formed by the turning orbit of a point 322a where the axis line 330 intersects on the target surface 322 to be the focal point of the anode 320 of the X-ray generation source 126. It is assumed that the axis line 330 passes through the target surface y-direction center 322C. A plane formed by the turning orbit at any point of the target surface 322 may be set to the turning plane 600.

Figure 28:
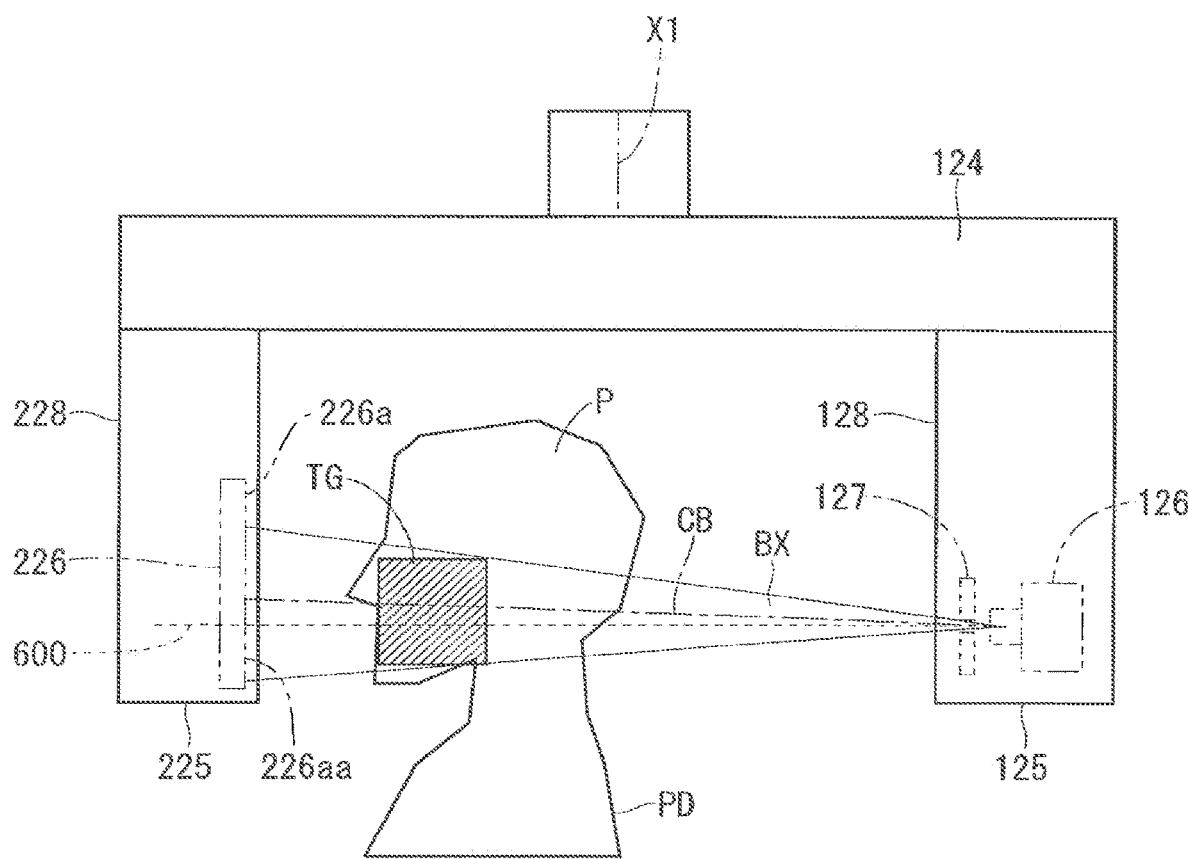
FIG. 28 is a schematic diagram illustrating an operation example of the X-ray imaging apparatus.

The X-ray beam forming unit 127 may form the X-ray cone beam BX such that the X-ray component on the turning plane 600 is included in an X-ray flux incident on the detection surface 226a of the X-ray detector 226 regardless of the position in the z-direction of the X-ray generation source 126. That is, the X-ray beam forming unit 127 may form the X-ray cone beam BX so as to include the X-ray component on the turning plane 600 even when the X-ray generation source 126 is located on the −z-side as illustrated in FIG. 24 or even when the X-ray generation source 126 is located on the +z-side as illustrated in FIGS. 25 and 26. FIG. 28 is a view illustrating an example of the X-ray imaging.

In the example of FIG. 28, the X-ray flux configuring the X-ray cone beam BX incident on the detection surface 226a includes the X-ray component located on the turning plane 600 of the focal point of the X-ray generation source 126. In the example of FIG. 28, the center beam CB that is the center (optical axis) of the X-ray cone beam BX is not parallel to the turning plane 600. However, the angle formed by the center beam CB and the turning plane 600 is small. At this point, the fact that the center beam CB is parallel to the turning plane 600 includes the fact that the center beam CB is located on the turning plane 600.

Figure 29:
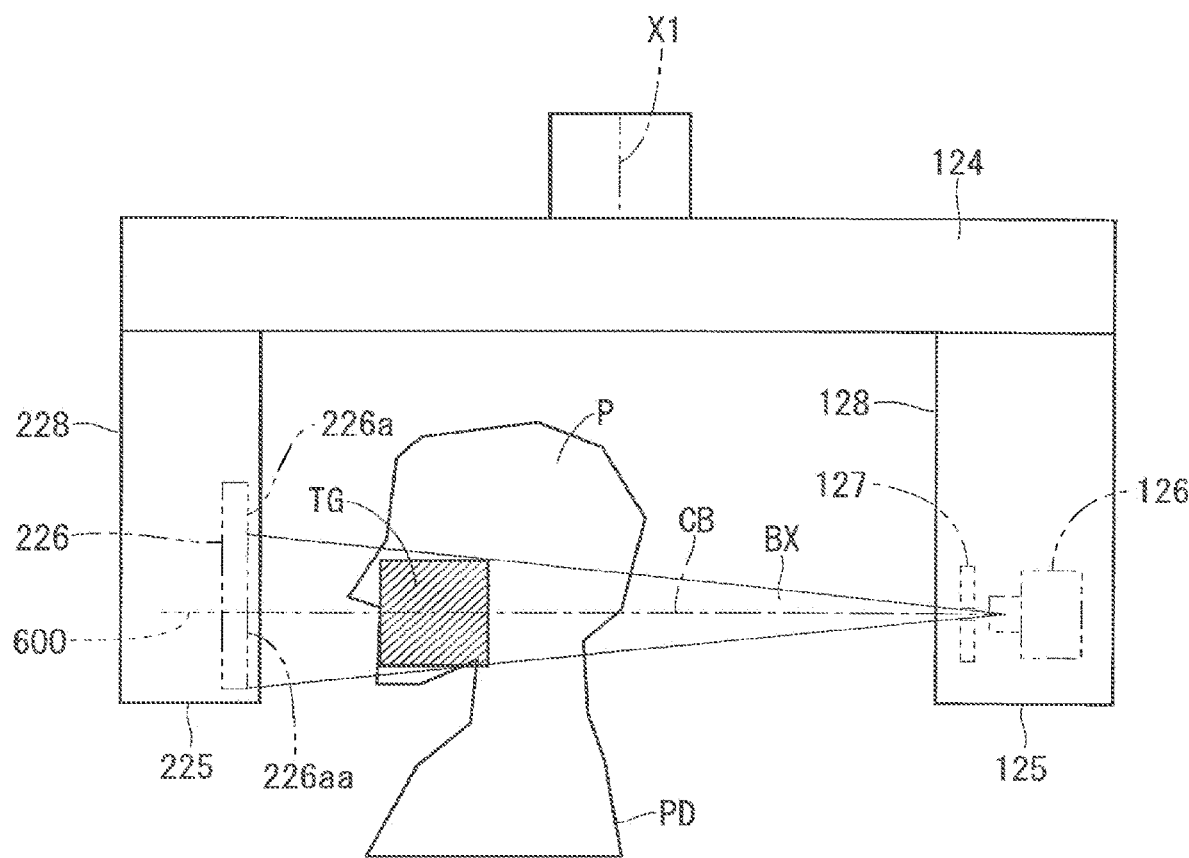
FIG. 29 is a schematic diagram illustrating an operation example of the X-ray imaging apparatus.

The X-ray beam forming unit 127 may form the X-ray cone beam BX such that the center beam CB is parallel to the turning plane 600 regardless of the position in the z-direction of the X-ray generation source 126. That is, the X-ray beam forming unit 127 may form the X-ray cone beam BX such that the center beam CB is parallel to the turning plane 600 even when the X-ray generation source 126 is located on the −z-side as illustrated in FIG. 24 or even when the X-ray generation source 126 is located on the +z-side as illustrated in FIGS. 25 and 26. FIG. 29 is a view illustrating an example of this state.

In the example of FIG. 29, the center beam CB is located on the turning plane 600 and is parallel to the y-direction. In the example of FIG. 29, similarly to the examples in FIGS. 18, 19, 20, 22 described above, the center beam CB is irradiated horizontally (the height in the z-direction from the −y-side toward the +y-side is set constant) and passes through the center of the spread of the X-ray cone beam BX. Unlike the example in FIG. 29, the center beam CB may be parallel to the turning plane 600 at the location away from the turning plane 600. In this example, when the z-direction is the vertical direction, it may be considered that the horizontal irradiation of the X-ray cone beam BX is performed by the X-ray beam forming unit 127 regulating the X-ray 340 such that the center beam CB passes in the plane orthogonal to the vertical direction.

Figure 30:
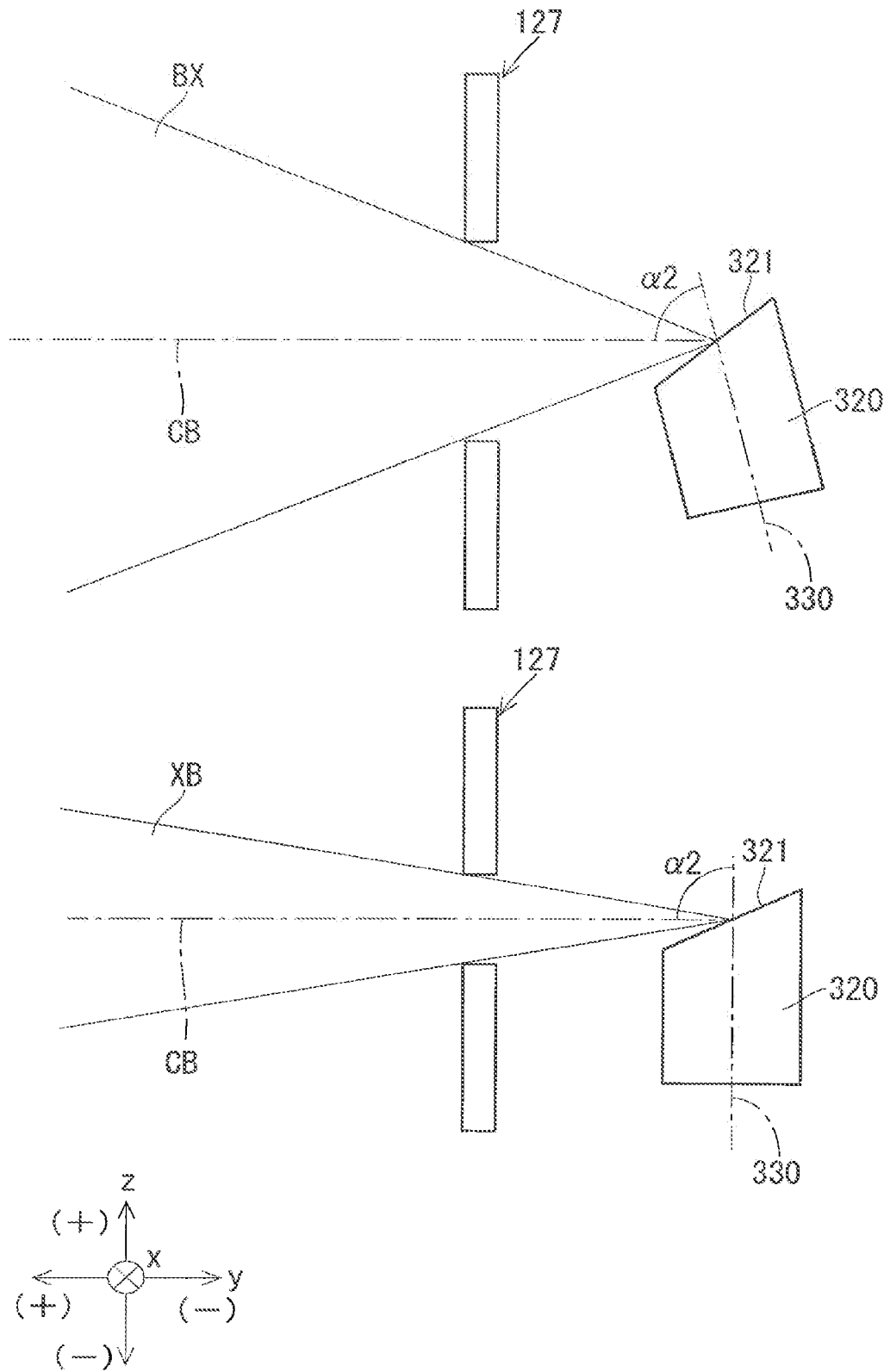
FIG. 30 is a schematic diagram illustrating an example of an angle formed by a center beam and an axis line of the X-ray generation source.

When the X-ray beam forming unit 127 forms the X-ray cone beam BX such that the center beam CB is parallel to the turning plane 600 regardless of the position in the z-direction of the X-ray generation source 126, and when the X-ray generation source 126 tilts according to the movement of the X-ray generation source 126 to the +z-side, the angle formed by the axis line 330 of the X-ray generation source 126 and the center beam CB of the X-ray cone beam BX decreases according to the expansion of the spread in the z-direction of the X-ray cone beam BX according to the movement of the X-ray generation source 126 to the +z-side. FIG. 30 is a schematic diagram illustrating an example of this state.

In FIG. 30, the anode 320 of the X-ray generation source 126 in FIG. 24 is illustrated on the lower side, and the anode 320 of the X-ray generation source 126 in FIG. 26 is illustrated on the upper side. In the example of FIG. 30, the X-ray beam forming unit 127 forms the X-ray cone beam BX such that the center beam CB is parallel to the turning plane 600 regardless of the position in the z-direction of the X-ray generation source 126.

As illustrated in FIG. 30, the anode 320 rotates counterclockwise as viewed from the +x-side according to the movement of the X-ray generation source 126 to the +z-side. Consequently, the axis line 330 also rotates counterclockwise as viewed from the +x-side according to the movement of the X-ray generation source 126 to the +z-side. The rotation amount of the axis line 330 increases according to the movement of the X-ray generation source 126 to the +z-side. Accordingly, an angle α2 formed by the center beam CB parallel to the y-direction and the axis line 330 decreases according to the movement of the X-ray generation source 126 to the +z-side. On the other hand, the spread in the z-direction of the X-ray cone beam BX is expanded according to the movement of the X-ray generation source 126 to the +z-side. Consequently, the angle α2 formed by the axis line 330 of the X-ray generation source 126 and the center beam CB of the X-ray cone beam BX decreases according to the expansion of the spread in the z-direction of the X-ray cone beam BX according to the movement of the X-ray generation source 126 to the +z-side. At this point, the angle α2 formed by the axis line 330 and the center beam CB is an angle formed by the axis line 310 and the center beam CB on the +z-direction side with respect to the center beam CB.

In the above example, the spread in the z-direction of the X-ray beam is large when the X-ray generation source 126 is located on the +z-side, and the spread in the z-direction of the X-ray beam is small when the X-ray generation source 126 is located on the −z-side. Accordingly, even in the small imaging target region TG in FIG. 24 or the large imaging target region TG in FIGS. 25 and 26, there is a high possibility that the X-ray imaging can be executed without moving the X-ray detection unit 225 to the −z-side or without moving the X-ray detection unit 225 to the −z-side much.

On the other hand, it is considered that the X-ray generation source 126 cannot move in the z-direction in the extending unit 128, and that the positional relationship between the X-ray detector 226 and the X-ray generation source 126 is fixed. In this case, for example, in order to perform the X-ray imaging on the imaging target region TG set at the lower portion of the head P, sometimes necessity to move the entire support 124 to the −z-side and move the X-ray detection unit 225 to the −z-side is generated. The movement of the entire support 124 to the −z-side can be implemented by the movement of the lifting unit 122 to the −z-side. When the X-ray detection unit 225 moves to the −z-side, there is a possibility that the X-ray detection unit 225 comes into contact with the shoulder of the subject PD. For this reason, for example, the distance between the X-ray detection unit 225 and the head P is required to increase by moving the entire support 124 to the +Y-side using the drive mechanism 130. As a result, the magnification ratio in the X-ray imaging increases, and the imaging resolution decreases.

In the X-ray imaging apparatus 110 of the example, there is a high possibility that the X-ray imaging can be executed without moving the X-ray detection unit 225 to the −z-side or without moving the X-ray detection unit 225 to the −z-side much in both the small imaging target region TG and the large imaging target region TG. Accordingly, the possibility of the necessity of increasing the distance between the X-ray detection unit 225 and the head P can be reduced in order to prevent the X-ray detection unit 225 from coming into contact with the subject due to the movement of the X-ray detection unit 225 to the z-side. As a result, the imaging resolution can be improved.

In this example, the moving unit 136 moves the X-ray generation source 126 in the z-direction the extending unit 128. Accordingly, the contact of the extending unit 128 with the subject PD can be prevented as compared with the case where the entire support 124 is moved by the drive mechanism 130 to move the X-ray generation source 126.

In this example, the bottom portion of the X-ray detector 226 is disposed at the bottom portion of the extending unit 228, so that the X-ray detection unit 225 can be brought close to the head P of the subject PD. Consequently, a magnification ratio in the X-ray imaging can be decreased. As a result, the imaging resolution can be improved.

In the examples of FIGS. 24 to 26, by the X-ray beam former 127, the position of the +z-side end of the X-ray beam in the irradiation region 226aa of the X-ray detection unit 225 when the spread in the z-direction of the X-ray beam is small is set to a positon closer to the −z-side than that when the spread in the z-direction of the X-ray beam is large. Consequently, there is a high possibility that the X-ray imaging can be executed without moving the X-ray detection unit 225 to the −z-side or without moving the X-ray detection unit 225 to the −z-side much in both the small imaging target region and the large imaging target region. Accordingly, the possibility of the necessity of increasing the distance between the X-ray detection unit 225 and the head P can be more reduced in order to prevent the X-ray detection unit 225 from coming into contact with the subject due to the movement of the X-ray detection unit 225 to the −z-side. As a result, the imaging resolution can be improved.

In the examples of FIGS. 24 to 26, the X-ray beam forming unit 127 sets the positions of the −z-side end of the X-ray beam in the irradiation region 226aa when the spread in the z-direction of the X-ray beam is small to the same position so that when the spread in the z-direction of the X-ray beam is large. Consequently, there is a high possibility that the X-ray imaging can be executed without moving the X-ray detection unit 225 to the −z-side or without moving the X-ray detection unit 225 to the −z-side much in both the small imaging target region and the large imaging target region. Accordingly, the possibility of the necessity of increasing the distance between the X-ray detection unit 225 and the head P can be more reduced in order to prevent the X-ray detection unit 225 from coming into contact with the subject due to the movement of the X-ray detection unit 225 to the −z-side. As a result, the imaging resolution can be improved.

In this example, the X-ray CT imaging is performed by irradiating the head P with the X-ray cone beam BX while the X-ray generation unit 125 and the X-ray detection unit 225 are turning, so that the X-ray CT image having the high resolution can be obtained.

In the examples of FIGS. 28 and 29, the X-ray beam forming unit 127 forms the X-ray cone beam BX such that the X-ray component on the turning plane 600 in which the focal point turns is included in the X-ray flux incident on the detection surface 226a of the X-ray detector 226 from the focal point of the X-ray generation source 126. Consequently, the X-ray CT image can be generated using the plurality of X-ray components transmitted through the head P from the opposite directions during the turning of the X-ray detection unit 225 and the X-ray generation unit 125. As a result, the resolution of the X-ray CT image can be improved.

In the examples of FIGS. 18, 19, 20, 22, 29, the X-ray beam forming unit 127 forms the X-ray cone beam BX such that the center beam CB of the X-ray cone beam BX is parallel to the turning plane 600 of the focal point of the X-ray generation source 126. In other words, when the z-direction is set to the vertical direction, the X-ray beam forming unit 127 regulates the X-ray 340 such that the center beam CB passes in the plane orthogonal to the vertical direction, whereby the horizontal irradiation of the X-ray cone beam BX is performed. Consequently, during the turning of the X-ray generation unit 125 and the X-ray detection unit 225, the direction in which the center beam CB of the X-ray cone beam BX emitted from the X-ray generation unit 125 at a certain position advances and the direction in which the center beam CB of the X-ray cone beam BX emitted from the X-ray generation unit 125 at a position opposed to the certain position advances are opposite to each other. The resolution of the X-ray CT image can be improved by performing the X-ray CT imaging using the X-ray cone beam BX.

As in the examples of FIGS. 24 to 26, when the spread in the z-direction of the X-ray cone beam BX increases according to the movement of the X-ray generation source 126 on the +z-side, the horizontal irradiation of the X-ray cone beam BX becomes possible even when the imaging target region TG spreads. Consequently, the X-ray CT image having the high resolution can be obtained even in the large imaging target region TG.

In the X-ray generation unit 125 of the example, one of the cathode 310 and the anode 320 is disposed on the +z-side, and the other of the cathode 310 and the anode 320 is disposed on the −z-side. In an intensity distribution of the X-ray beam on the detection surface 226a of the X-ray detector 226, the intensity on the side of the anode 320 is relatively large, and the X-ray on the side of the anode 320 in the X-ray beam received on the detection surface 226a has a good radiation quality with the small apparent focal size. Because one of the cathode 310 and the anode 320 is disposed on the +z-side and while the other of the cathode 310 and the anode 320 is disposed on the −z-side, when a site to be observed in detail in the head P is unevenly distributed at any position in the z-direction within the range of the X-ray irradiation field (imaging target region TG), the X-ray of the good radiation quality having the small apparent focal size on the anode side included in the X-ray beam can be irradiated toward the unevenly distributed site. Accordingly, the quality of the X-ray image of the region of interest can be improved.

In this example, the X-ray generation unit 125 includes the X-ray generation source 126 such that the cathode 310 is disposed on the +z-side and the anode 320 is disposed on the −z-side. As described above, the X-ray on the side of the anode 320 of the X-ray beam received by the detection surface 226a has the good radiation quality with the small apparent focal size, the resolution of the X-ray imaging for the lower portion of the head P can be improved by disposing the anode 320 on the −z-side. For example, the resolution of the X-ray imaging for the dental arch can be improved. Furthermore, as in the example of FIG. 25, in the case of the large imaging target region TG, the imaging resolution of the site that is at a low position of the imaging target region TG and is highly important from a dental viewpoint can be increased.

Furthermore, in the example, when the spread in the z-direction of the imaging target region TG is large, the moving unit 136 drives the X-ray generation source 126 such that the apparent focal size S becomes large in the z-direction. Thus, when the spread in the z-direction of the imaging target region TG is large, the X-ray generation unit 125 can appropriately emit the X-ray beam having the large spread in the z-direction.

Furthermore, in the example, the moving unit 136 drives the X-ray generation source 126 such that the apparent focal size S becomes small in the z-direction when the spread in the z-direction of the imaging target region TG is small. Consequently, the resolution of the X-ray imaging can be improved when the spread in the z-direction of the imaging target region TG is small. Accordingly, the X-ray imaging of the small imaging target region TG can be performed with high definition.

In the example of FIG. 30, the moving unit 136 drives the X-ray generation source 126 such that the angle α2 formed between the axis line 330 and the center beam CB of the X-ray cone beam BX decreases according to the expansion of the spread of the X-ray beam in the z-direction according to the movement of the X-ray generation source 126 to the +z-side by the moving unit 136. At this point, the angle α2 formed by the axis line 330 and the center beam CB is an angle formed by the axis line 330 and the center beam CB on the +z-direction side with respect to the center beam CB. Consequently, the apparent focal size S can be increased according to the expansion of the spread in the z-direction of the X-ray beam. In other words, the apparent focal size S can be reduced according to the reduction in the spread in the z-direction of the X-ray beam. Thus, the resolution of the X-ray imaging can be improved when the spread in the z-direction of the imaging target region TG is small. Accordingly, the X-ray imaging of the small imaging target region TG can be performed with high definition. When the imaging target region TG is large as in the example of FIG. 26, the X-ray 340 from the target surface 322 having the high acute angle when viewed from the side of the imaging target region TG can be used to the maximum as in the example of FIG. 22.

Furthermore, in the example, because the X-ray generation source 126 can be moved in the z-direction, for example, regardless of the position and range of the imaging target region TG, the center beam CB of the X-ray cone beam BX with which the imaging target region TG is irradiated can be parallel to the turning plane 600 of the focal point of the X-ray generation source 126 or as parallel as possible to the turning plane 600 as illustrated in FIGS. 28 and 29. Consequently, the resolution of the X-ray CT image can be improved.

Second Operation Example

In the above example, the moving unit 136 changes the position of the focal point of the X-ray generation source 126 by moving the X-ray generation source 126 according to the range of the imaging target region TG, but the position of the focal point of the X-ray generation source 126 may be changed by moving the X-ray generation source 126 according to the position of the imaging target region TG. The moving unit 136 may change the position of the focal point of the X-ray generation source 126 by moving the X-ray generation source 126 according to at least one of the position and the range of the imaging target region TG.

Figure 31:
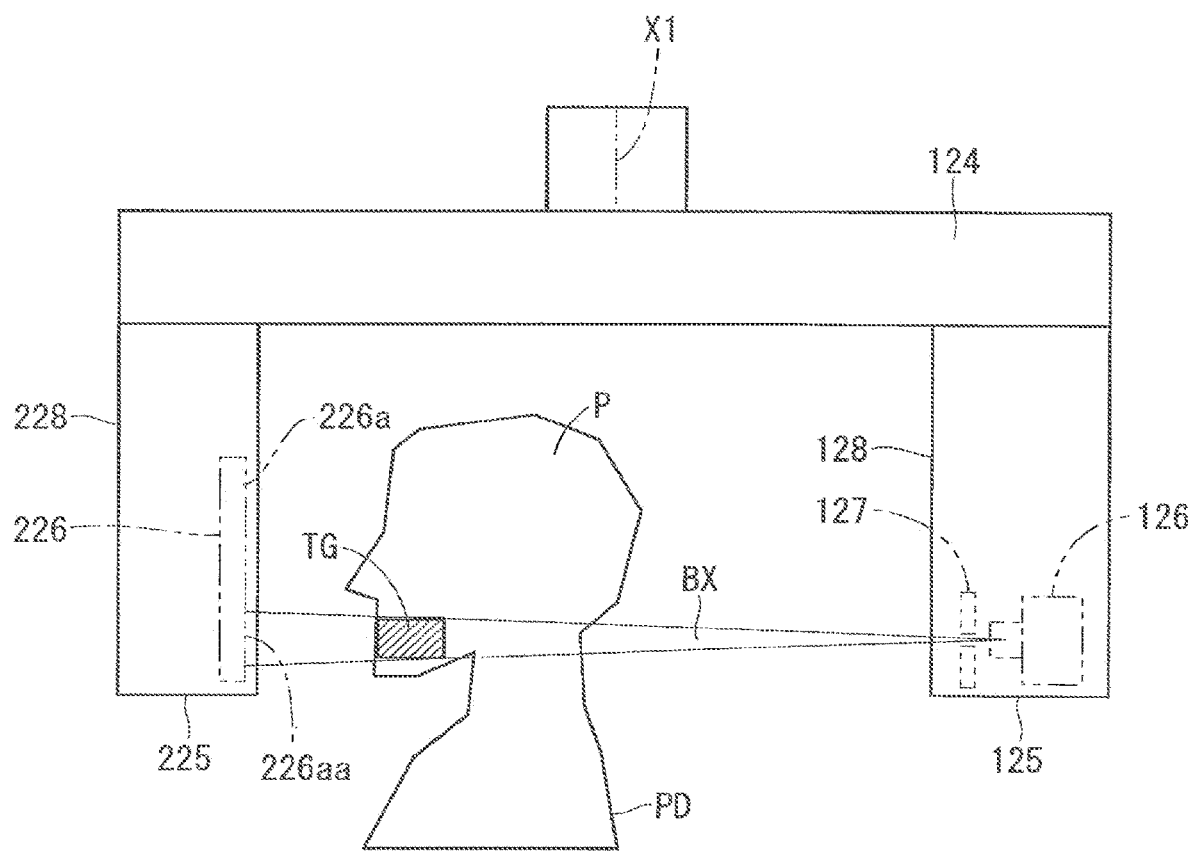
FIG. 31 is a schematic diagram illustrating an operation example of the X-ray imaging apparatus.
Figure 32:
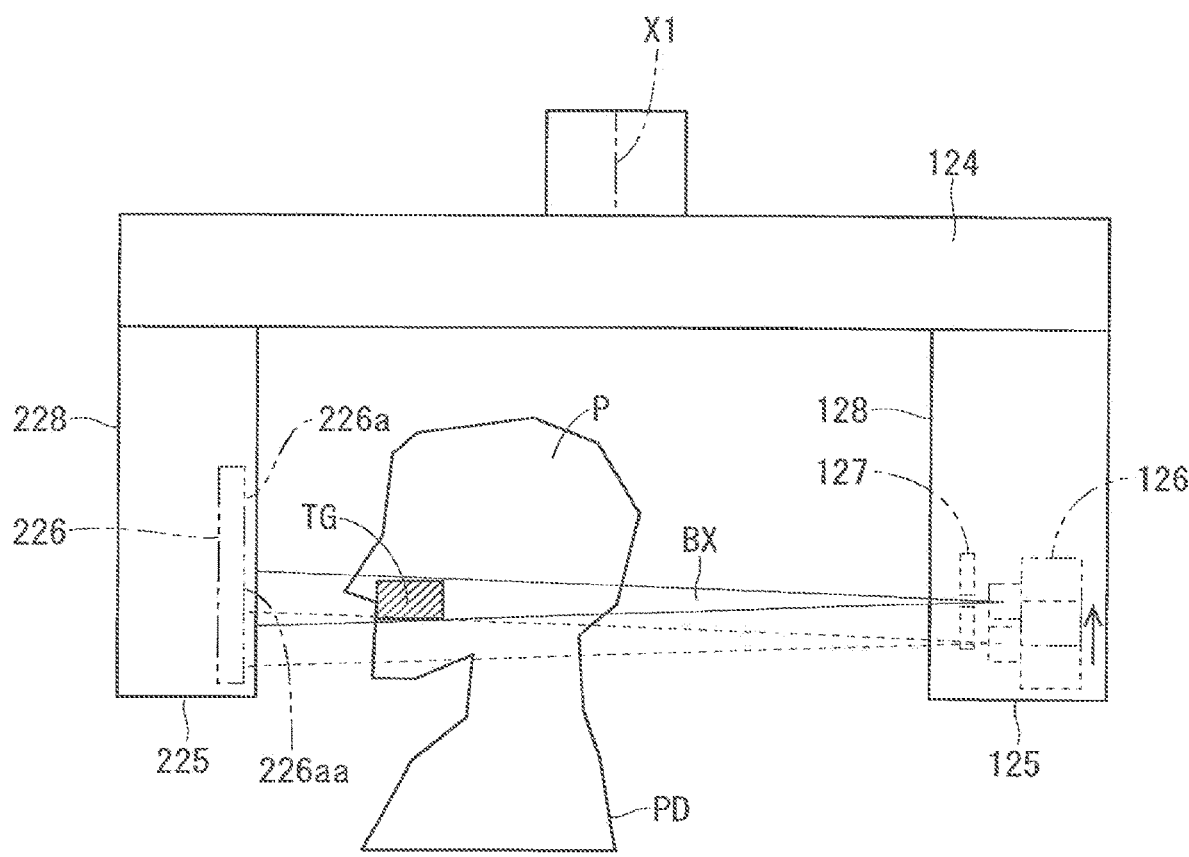
FIG. 32 is a schematic diagram illustrating an operation example of the X-ray imaging apparatus.

FIGS. 31 and 32 are schematic diagrams illustrating an example of the state in which the moving unit 136 changes the position of the focal point of the X-ray generation source 126 by moving the X-ray generation source 126 according to the position of the imaging target region TG. The imaging target region TG in FIG. 32 is located on the +z-side as compared with the imaging target region TG in FIG. 31. As illustrated in FIGS. 31 and 32, when the position of the imaging target region TG moves to the +z-side, the moving unit 136 moves the X-ray generation source 126 to the +z-side and moves the position of the focal point of the X-ray generation source 126 to the +z-side.

The position and range of the imaging target region TG in FIG. 24 can be regarded as being different from the position and range of the imaging target region TG in FIG. 25. Accordingly, in the examples of FIGS. 24 and 25, it can be said that the moving unit 136 changes the position of the focal point of the X-ray generation source 126 by moving the X-ray generation source 126 according to the position and range of the imaging target region TG.

As described above, when the moving unit 136 moves the X-ray generation source 126 according to at least one of the position and the range of the imaging target region TG to change the position of the focal point of the X-ray generation source 126, the position of the focal point of the X-ray generation source 126 can be changed to an appropriate position according to at least one of the position and the range of the imaging target region TG. For example, as illustrated in FIG. 28, the position of the focal point can be changed according to at least one of the position and the range of the imaging target region TG such that the X-ray beam forming unit 127 can form the X-ray cone beam BX including the X-ray component on the turning plane 600 of the focal point. Alternatively, the position of the focal point can be changed according to at least one of the position and the range of the imaging target region TG such that the X-ray beam forming unit 127 can form the X-ray cone beam BX including the center beam CB parallel to the turning plane 600 of the focal point.

Hereinafter, a configuration in which the position of the support 124 is relatively changed with respect to the head P according to at least one of the position and the range of the imaging target region TG, and a configuration in which the X-ray detection unit 225 is brought close to and separated from the X-ray generation unit 125 according to at least one of the position and the range of the imaging target region TG can be appropriately combined with a configuration in which the X-ray generation source 126 is relatively moved in the apparatus vertical direction with respect to the X-ray detection unit 225.

Third Operation Example

Figure 33:
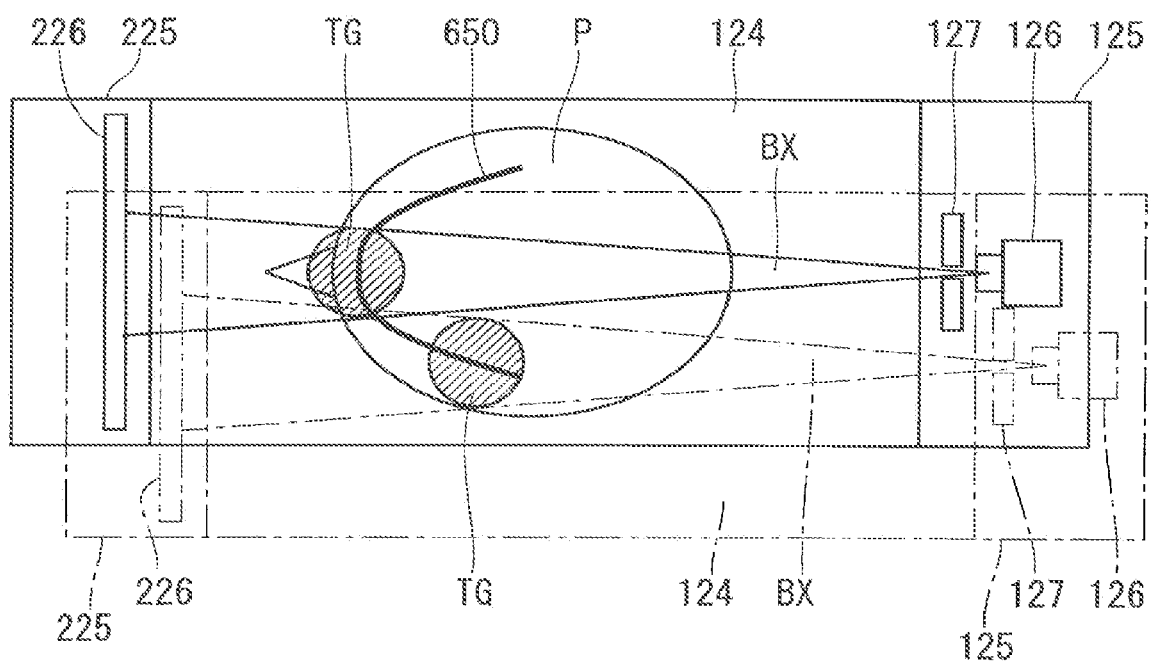
FIG. 33 is a schematic diagram illustrating an operation example of the X-ray imaging apparatus.
Figure 33:
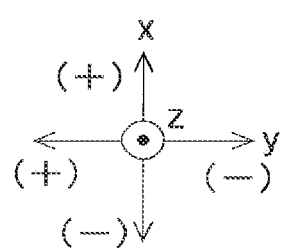
Figure 34:
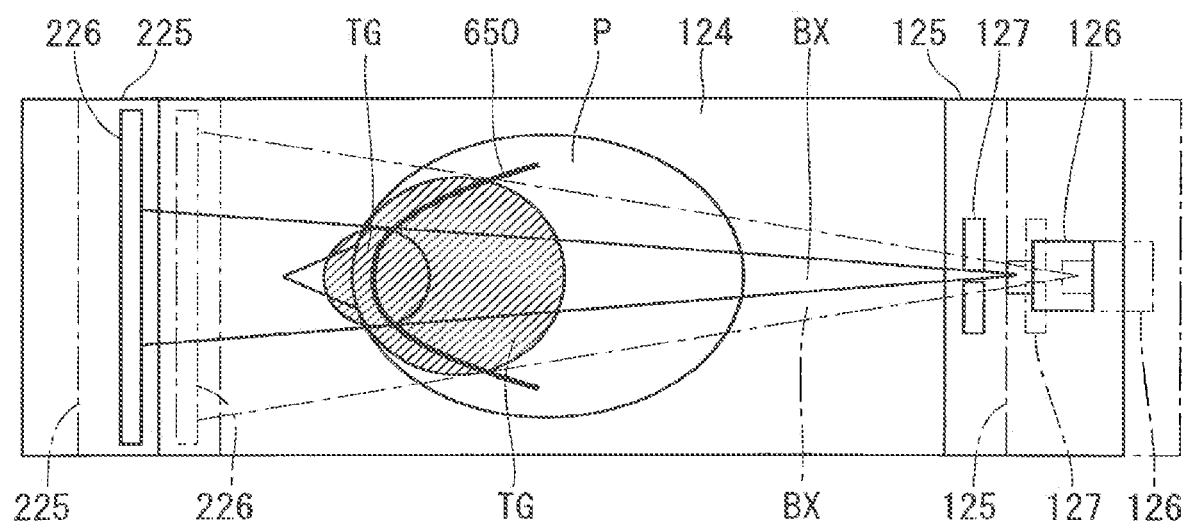
FIG. 34 is a schematic diagram illustrating an operation example of the X-ray imaging apparatus.
Figure 34:
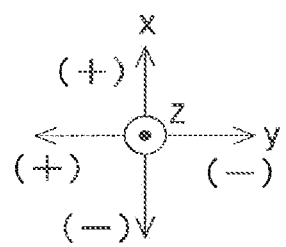

FIGS. 33 and 34 are schematic diagrams illustrating an example of the state in which the drive mechanism 130 relatively changes the position of the support 124 with respect to the head P according to at least one of the position and the range of the imaging target region TG. FIGS. 33 and 34 illustrate the state in which the support 124 moves. In FIGS. 33 and 34, the support 124, the X-ray generation unit 125, and the X-ray detection unit 225 before the movement are schematically illustrated by a one-dot chain line, and the support 124, the X-ray generation unit 125, and the X-ray detection unit 225 after the movement are schematically illustrated by a solid line. FIGS. 33 and 34 schematically illustrate a dental arch 650 in the head P.

In the example of FIG. 33, the drive mechanism 130 relatively changes the position of the support 124 with respect to the head P according to the position of the imaging target region TG. In the example of FIG. 33, the drive mechanism 130 moves the support 124 under the control of the imaging controller 151a in response to the position change of the imaging target region TG such that the X-ray detector 226 can appropriately receive the X-ray cone beam BX transmitted through the imaging target region TG.

In the example of FIG. 34, the drive mechanism 130 relatively changes the position of the support 124 with respect to the head P according to the range of the imaging target region TG. In the example of FIG. 34, the drive mechanism 130 moves the support 124 under the control of the imaging controller 151a in response to the change of the range of the imaging target region TG such that the X-ray detector 226 can appropriately receive the X-ray cone beam BX transmitted through the imaging target region TG. In the example of FIG. 34, it can be seen that the position and range of the imaging target region TG are changed, so that it can be said that the drive mechanism 130 relatively changes the position of the support 124 with respect to the head P according to the position and range of the imaging target region TG.

As described above, when the drive mechanism 130 relatively changes the position of the support 124 with respect to the head P according to at least one of the position and the range of the imaging target region TG, the positions of the X-ray detection unit 225 and the X-ray generation unit 125 can be changed to appropriate positions according to at least one of the position and the range of the imaging target region TG. That is, the positions of the X-ray detection unit 225 and the X-ray generation unit 125 can be changed such that the X-ray detector 226 can appropriately receive the X-ray cone beam BX transmitted through the imaging target region TG.

Fourth Operation Example

As described above, the X-ray imaging apparatus 110 includes the moving unit 137 that brings the X-ray detection unit 225 close to and away from the X-ray generation unit 125. Consequently, the moving unit 137 moves the X-ray detection unit 225 close to and away from the X-ray generation unit 125, so that the magnification ratio in the X-ray imaging can be easily adjusted. When the magnification ratio changes, the imaging resolution also changes, so that the moving unit 137 can easily adjust the imaging resolution by moving the X-ray detection unit 225 close to and away from the X-ray generation unit 125. The imaging body 120 includes the moving unit 137 that moves the X-ray detection unit 225 close to and away from the X-ray generation unit 125, so that the X-ray detection unit 225 can be easily prevented from coming into contact with the subject PD.

Figure 35:
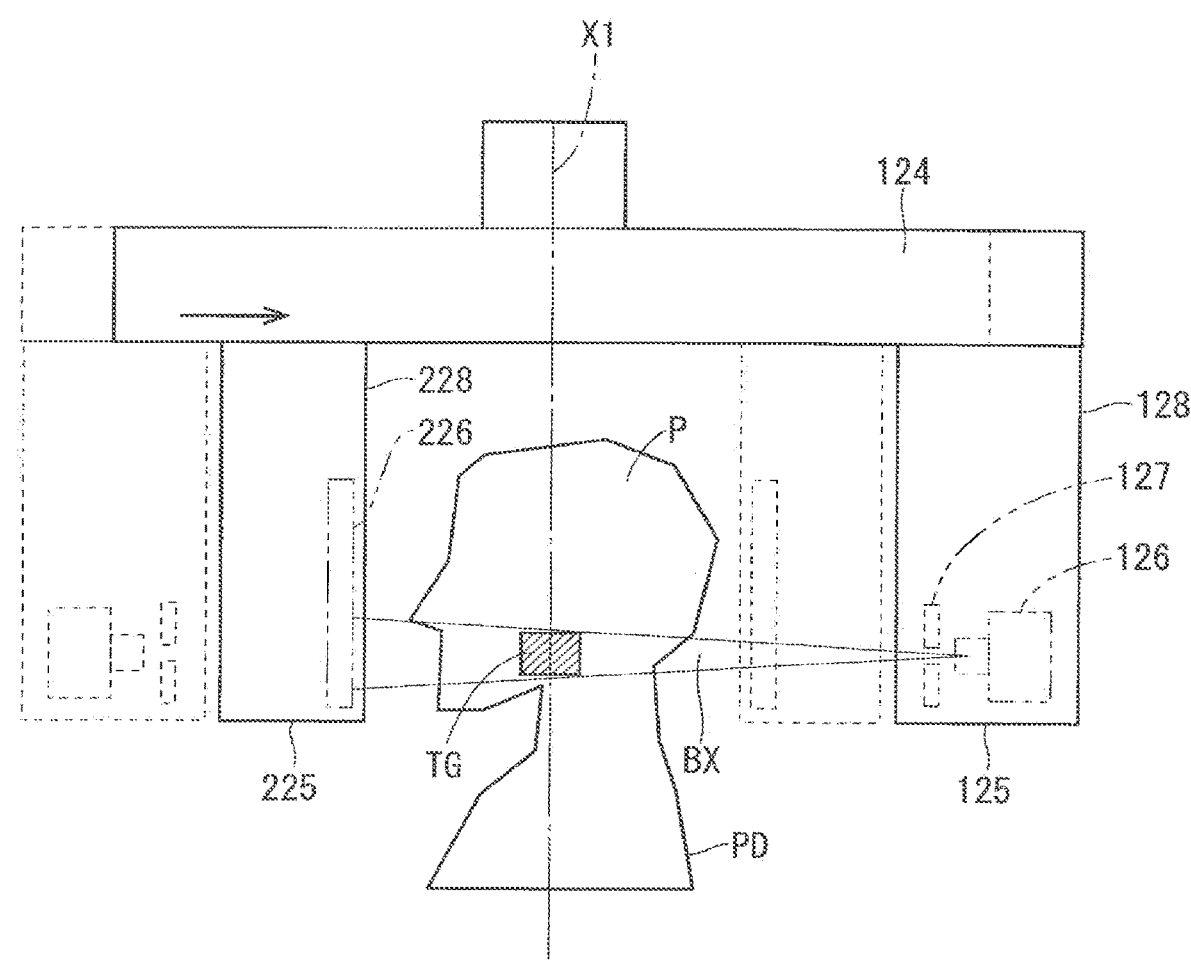
FIG. 35 is a schematic diagram illustrating an operation example of the X-ray imaging apparatus.
Figure 36:
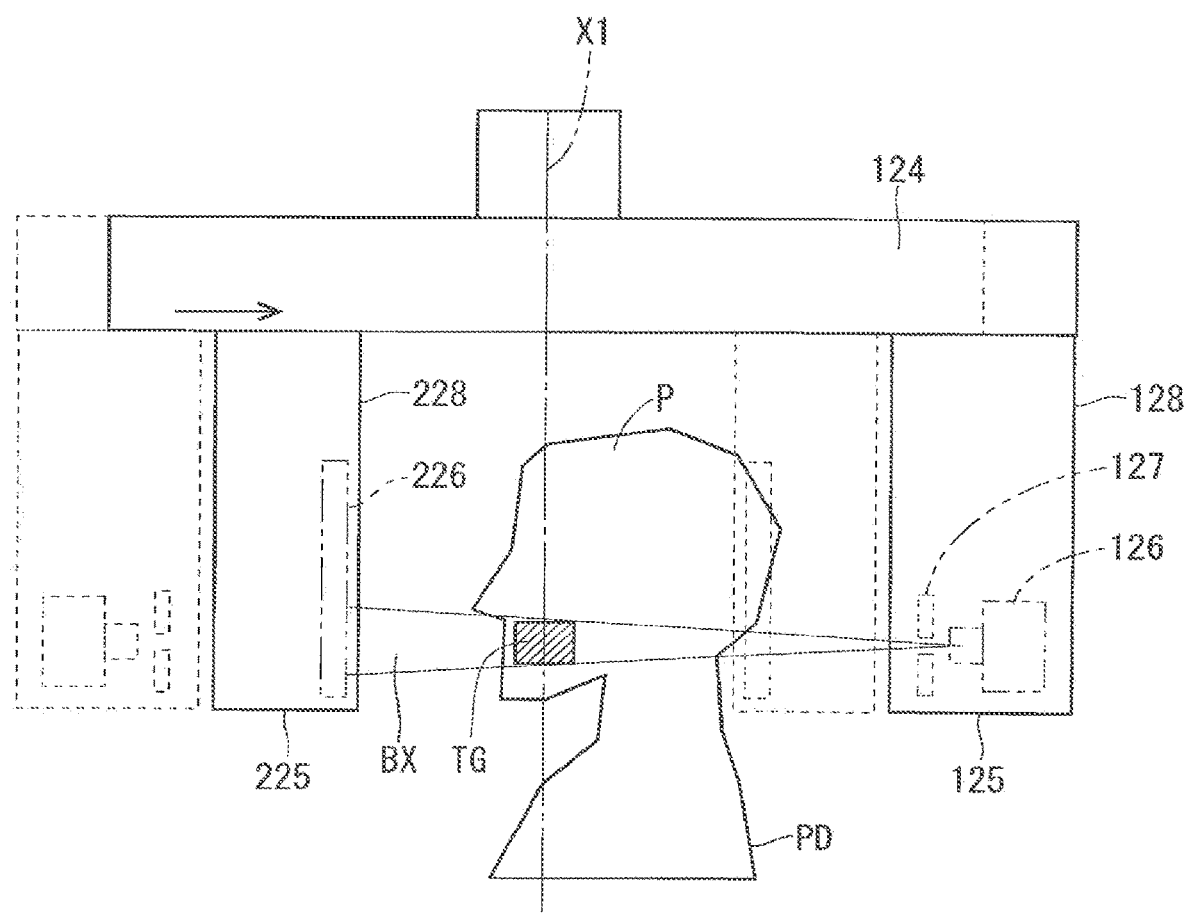
FIG. 36 is a schematic diagram illustrating an operation example of the X-ray imaging apparatus.
Figure 37:
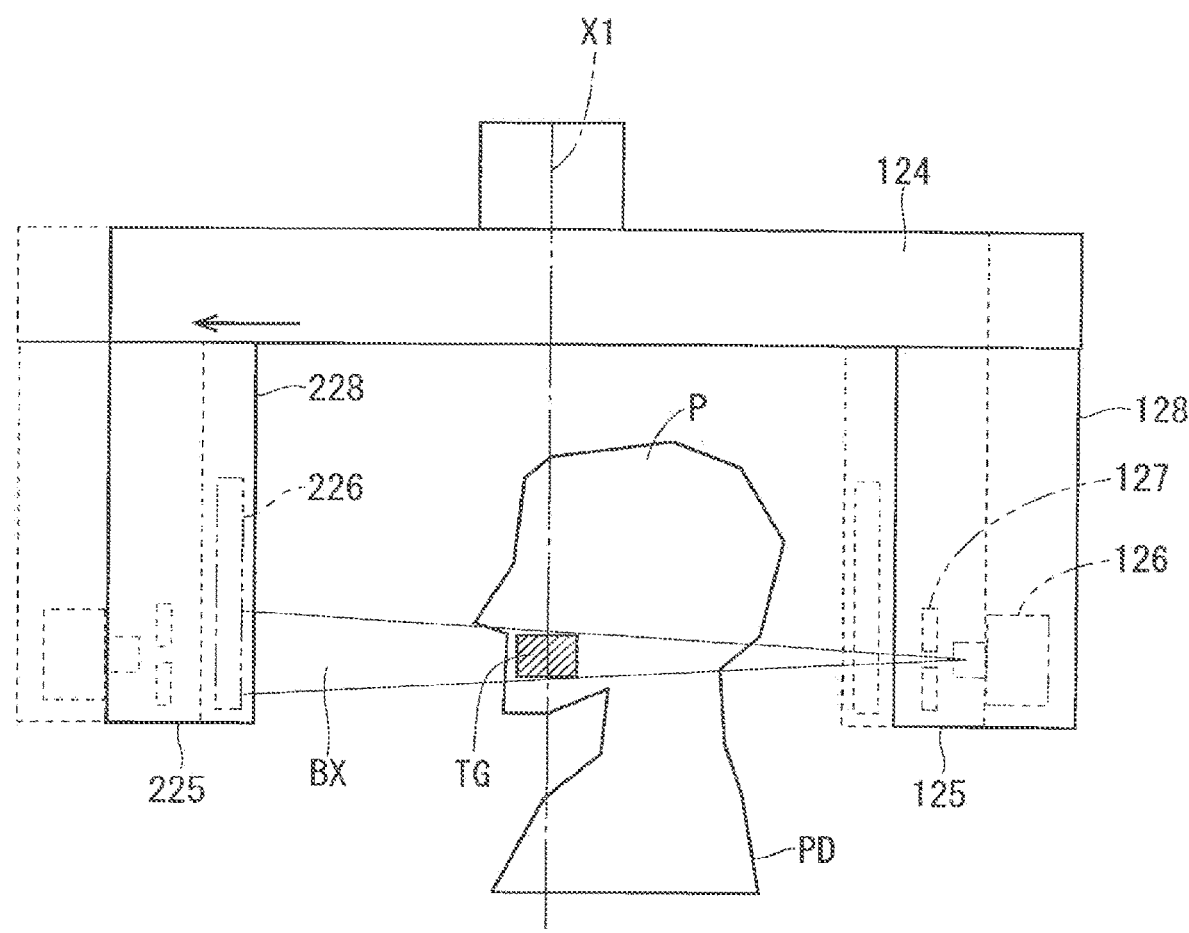
FIG. 37 is a schematic diagram illustrating an operation example of the X-ray imaging apparatus.

FIGS. 35 to 37 are schematic diagrams illustrating an example of the state in which the moving unit 137 moves the X-ray detection unit 225 according to the position of the imaging target region TG. In the examples of FIGS. 35 to 37, the support 124 rotates to perform the X-ray imaging while the turning axis X1 passes through the center of the imaging target region TG. In FIGS. 35 to 37, the support 124, the X-ray generation unit 125, and the X-ray detection unit 225 are indicated by broken lines when the support 124 indicated by the solid line rotates by 180 degrees.

As in the example of FIG. 35, for example, when the imaging target region TG is located near the center of the head P, the X-ray detection unit 225 does not come into contact with the head P even when the support 124 rotates while the X-ray detection unit 225 is brought close to the X-ray generation unit 125. That is, the imaging body 120 can perform the X-ray imaging while the X-ray detection unit 225 is brought close to the head P. Consequently, the magnification ratio of the X-ray imaging is reduced, and as a result, the imaging resolution is improved.

On the other hand, in the case that the imaging target region TG is located near the front of the head P as in the example of FIG. 36, there is a possibility that the X-ray detection unit 225 comes into contact with the head P when the X-ray imaging is performed while the imaging body 120 brings the X-ray detection unit 225 close to the head P as in the example in FIG. 35.

Accordingly, when the imaging target region TG is located near the front of the head P, the X-ray imaging is performed while the X-ray detection unit 225 is separated from the X-ray generation unit 125 as in the example of FIG. 37. Consequently, the X-ray detection unit 225 is prevented from coming into contact with the head P. At this point, the magnification ratio of the X-ray imaging increases.

Figure 38:
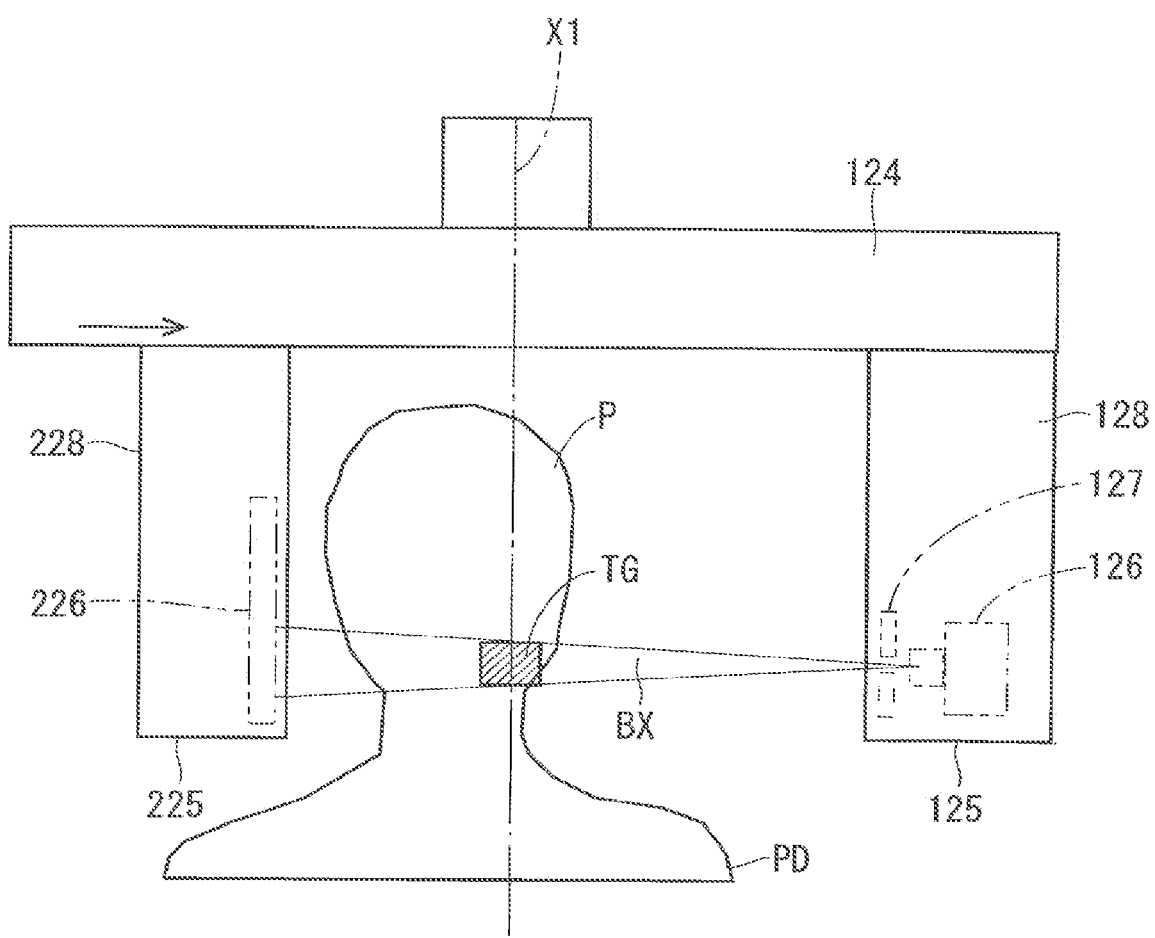
FIG. 38 is a schematic diagram illustrating an operation example of the X-ray imaging apparatus.
Figure 39:
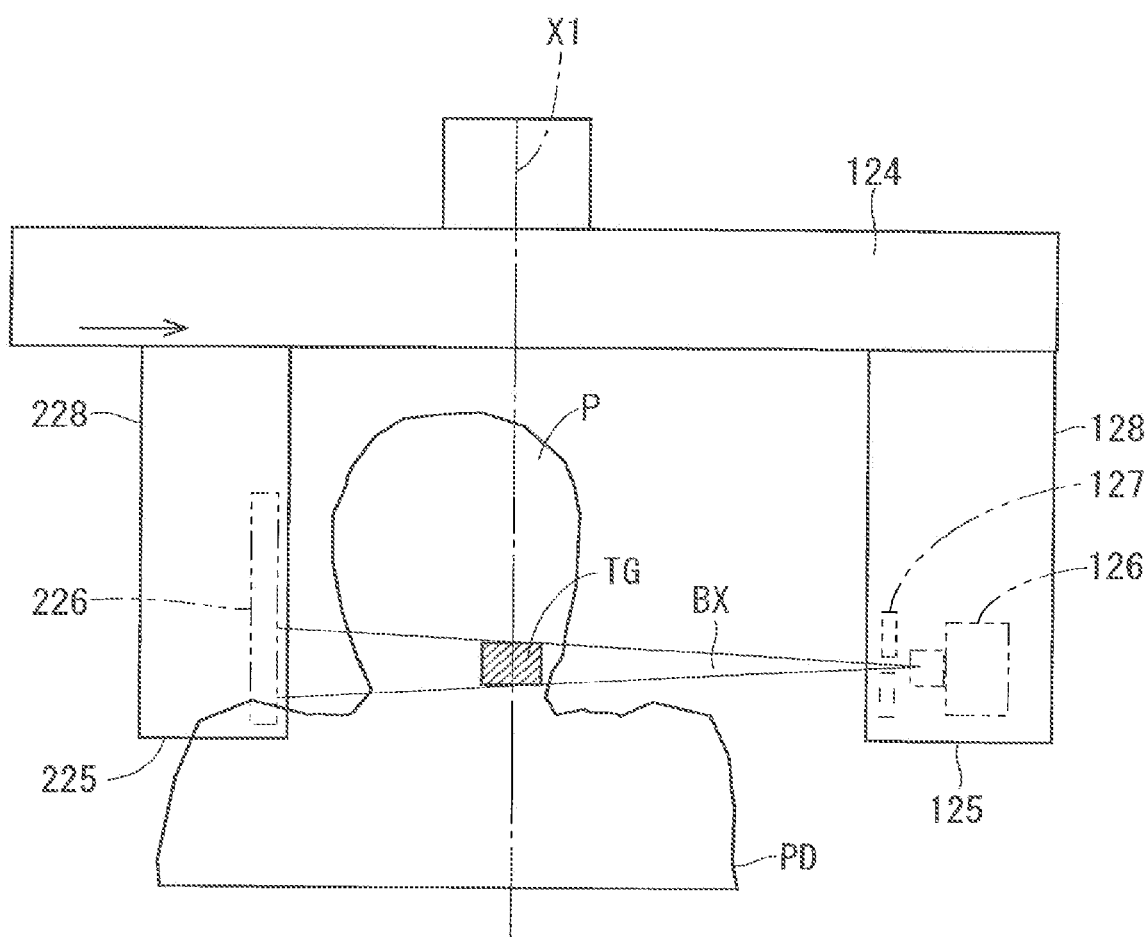
FIG. 39 is a schematic diagram illustrating an operation example of the X-ray imaging apparatus.
Figure 39:
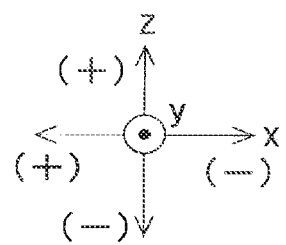
Figure 40:
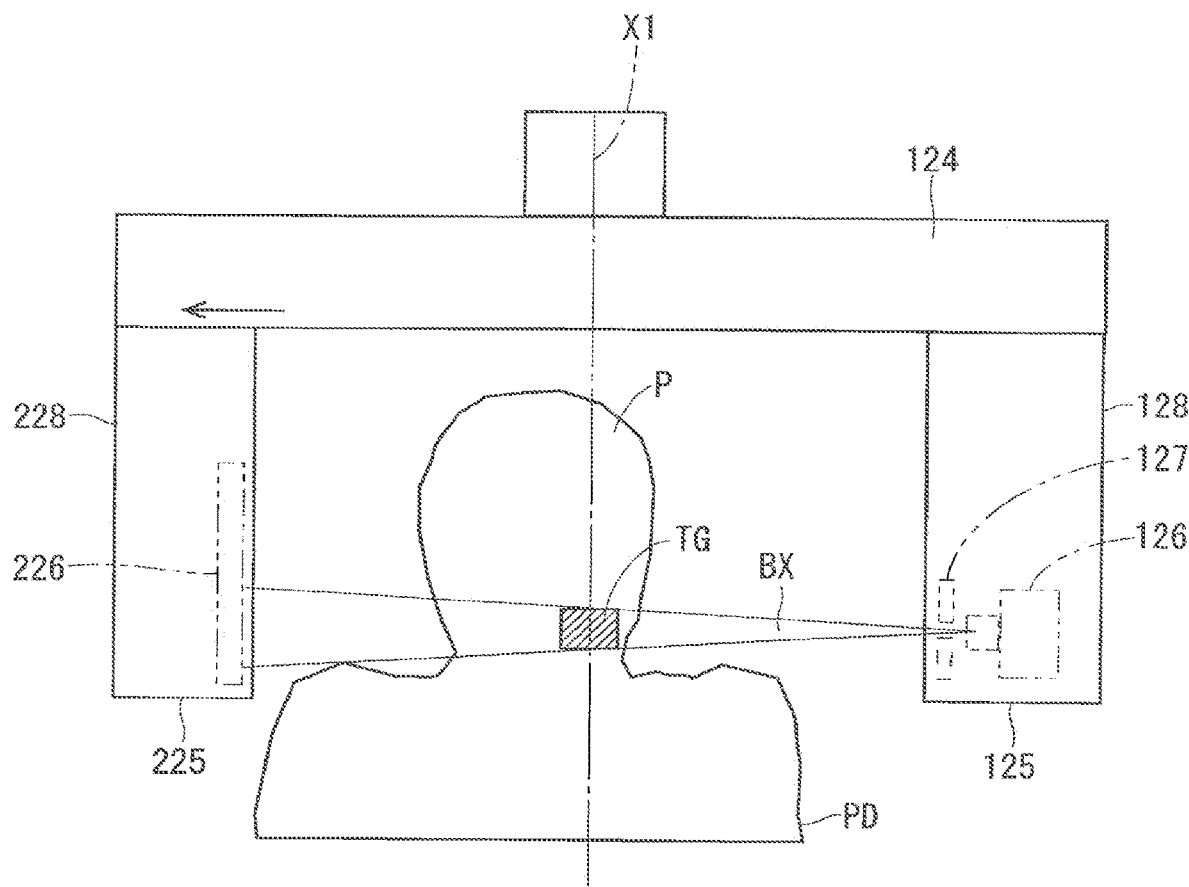
FIG. 40 is a schematic diagram illustrating an operation example of the X-ray imaging apparatus.

FIGS. 38 to 40 are schematic diagrams illustrating an example of the state in which the moving unit 137 moves the X-ray detection unit 225 according to the body shape of the subject PD. Also in the examples of FIGS. 38 to 40, the support 124 rotates to perform the X-ray imaging while the turning axis X1 passes through the center of the imaging target region TG. FIG. 38 illustrates the subject PD having a standard body shape, and FIGS. 39 and 40 illustrate the subject PD having a square shoulder shape.

As in the example of FIG. 38, in the ease Where the subject PD has the standard body shape, the X-ray detection unit 225 does not come into contact with the subject PD even when the support 124 rotates while the X-ray detection unit 225 is brought close to the X-ray generation unit 125. That is, the imaging body 120 can perform the X-ray imaging while the X-ray detection unit 225 is brought close to the head P. Consequently, the magnification ratio of the X-ray imaging is reduced, and as a result, the imaging resolution is improved.

On the other hand, in the case that the subject PD has the square shoulder shape as in the example of FIG. 39, the X-ray detection unit 225 may come into contact with the shoulder of the subject PD when the X-ray imaging is performed while the imaging body 120 brings the X-ray detection unit 225 close to the head P as in the example of FIG. 38.

When the subject PD has the square shoulder shape, the X-ray imaging is performed while the X-ray detection unit 225 is separated from the X-ray generation unit 125 as in the example of FIG. 40. Consequently, the X-ray detection unit 225 is prevented from coming into contact with the shoulder of the subject PD. At this point, the magnification ratio of the X-ray imaging increases.

As can be understood from the above description, the imaging body 120 can change the magnification ratio in the X-ray imaging by the proximity separation of the X-ray detector 226 to the head P. Consequently, the imaging resolution can be easily changed by approaching and separating the X-ray detector 226 to and from the head P.

<Other Examples of X-Ray Imaging Apparatus>

The configuration of the X-ray imaging apparatus 110 is not limited to the above example. For example, the moving unit 136 may be configured to bring the X-ray generation source 126 close to and separate from the X-ray detector 226.

Figure 41:
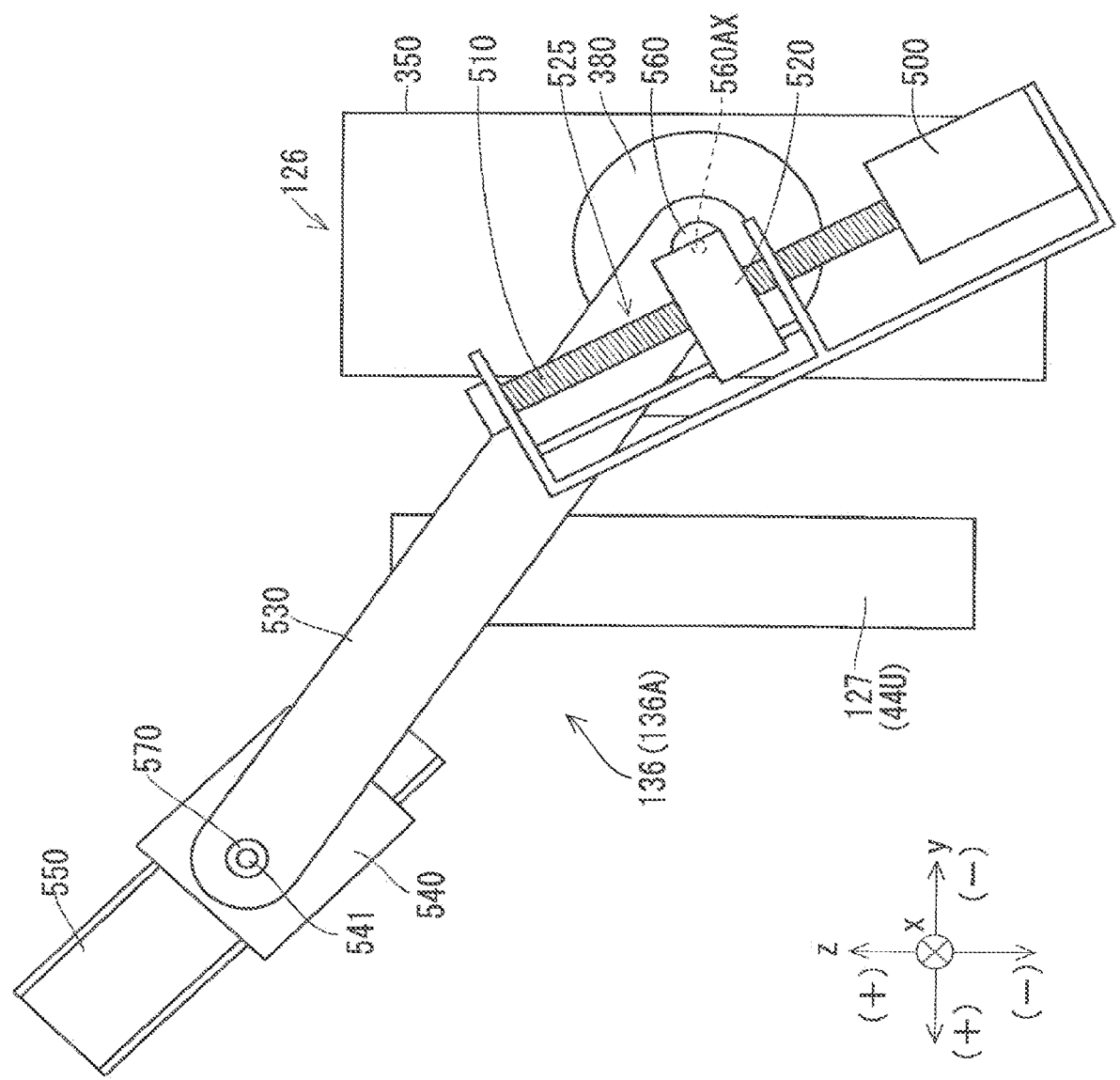
FIG. 41 is a schematic diagram illustrating a configuration example of the X-ray generation source moving unit.

FIG. 41 is a schematic diagram illustrating an example of another configuration of the moving unit 136. The moving unit 136 (also referred to as a X-ray generation source moving unit 136A or a moving unit 136A) in FIG. 41 is fixed to the extending unit 128 by rotating the guide rail 550 and the ball screw mechanism 525 counterclockwise by about 30 degrees as a whole when viewed from the −x-side in the moving unit 136 in FIGS. 8 and 9. The ball screw 510 of the moving unit 136A is inclined with respect to the z-direction such that the end portion on the +z-side falls to the +y-side.

The moving unit 136A can move the X-ray generation source 126 along the axial direction of the ball screw 510. The axial direction of the ball screw 510 extends along the direction between the +z-direction and the +y-direction, so that the moving unit 136A can move the X-ray generation source 126 along the direction between the +z-direction and the +y direction. Consequently, the X-ray generation source 126 can move in both the z-direction and the y-direction (in the combining direction). The moving unit 136A can change the posture of the X-ray generation source 126 according to the movement of the X-ray generation source 126 along the axial direction of the ball screw 510. Specifically, the moving unit 136A rotates the X-ray generation source 126 counterclockwise as viewed from the +x-side according to the movement of the X-ray generation source 126 along the axial direction of the ball screw 510.

Figure 42:
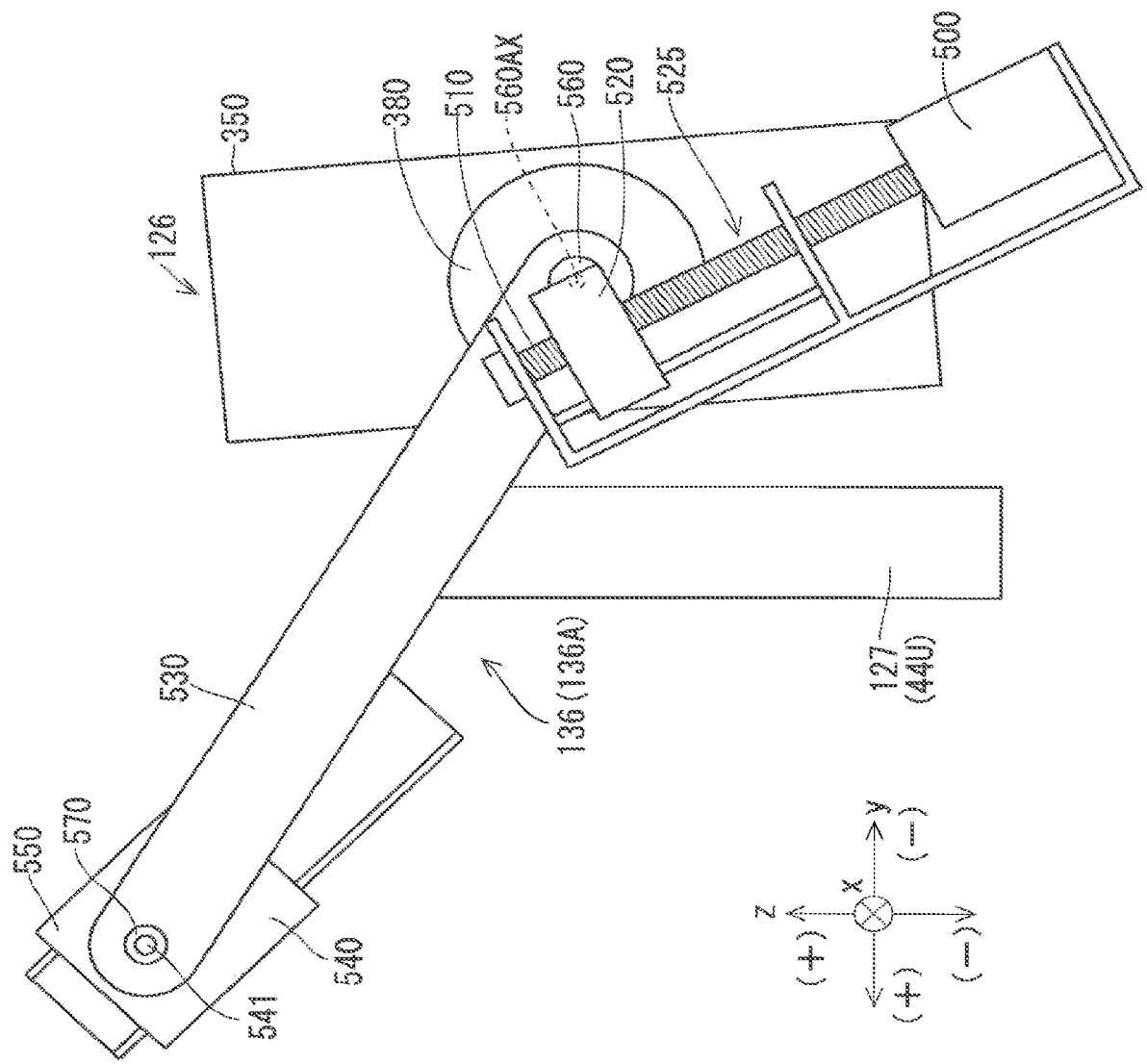
FIG. 42 is a schematic diagram illustrating a configuration example of the X-ray generation source moving unit.

FIG. 42 is a view illustrating an example of the state after the moving unit 136A moves the X-ray generation source 126 in FIG. 41 to the +z side. When the X-ray generation source 126 is located closest to the −z-side, for example, the posture of the X-ray generation source 126 is as illustrated in FIG. 41. On the other hand, when the X-ray generation source 126 is located closest to the +z-side, for example, the posture of the X-ray generation source 126 is as illustrated in FIG. 42.

Figure 43:
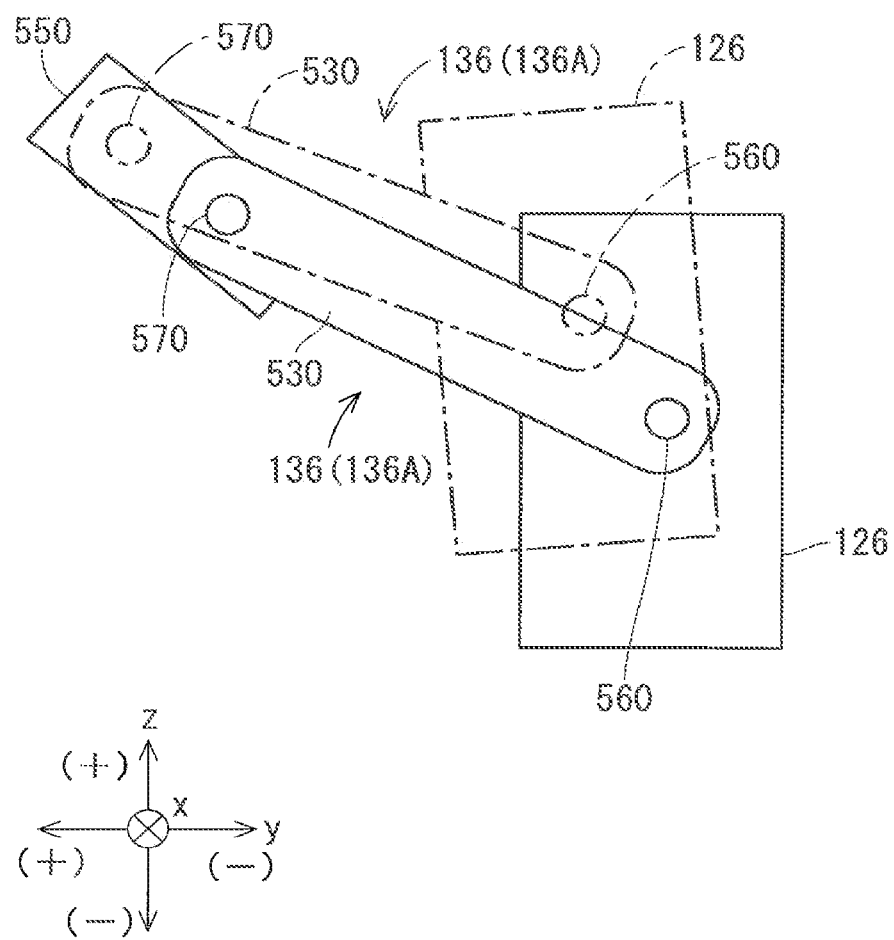
FIG. 43 is a schematic view illustrating an example of a state in which the X-ray generation source moves.

FIG. 43 is a view schematically illustrating the structure in FIG. 41 and the structure in FIG. 42 in an overlapping manner. In FIG. 43, the structure in FIG. 41 is indicated by the solid line, and the structure in FIG. 42 is indicated by the one-dot chain line.

The X-ray generation source 126 is driven by the moving unit 136A to revolve about the x-direction according to the movement of the ball screw 510 along the axial direction, so that the apparent focal size S of the X-ray generation source 126 changes according to the movement of the ball screw 510 along the axial direction.

Figure 44:
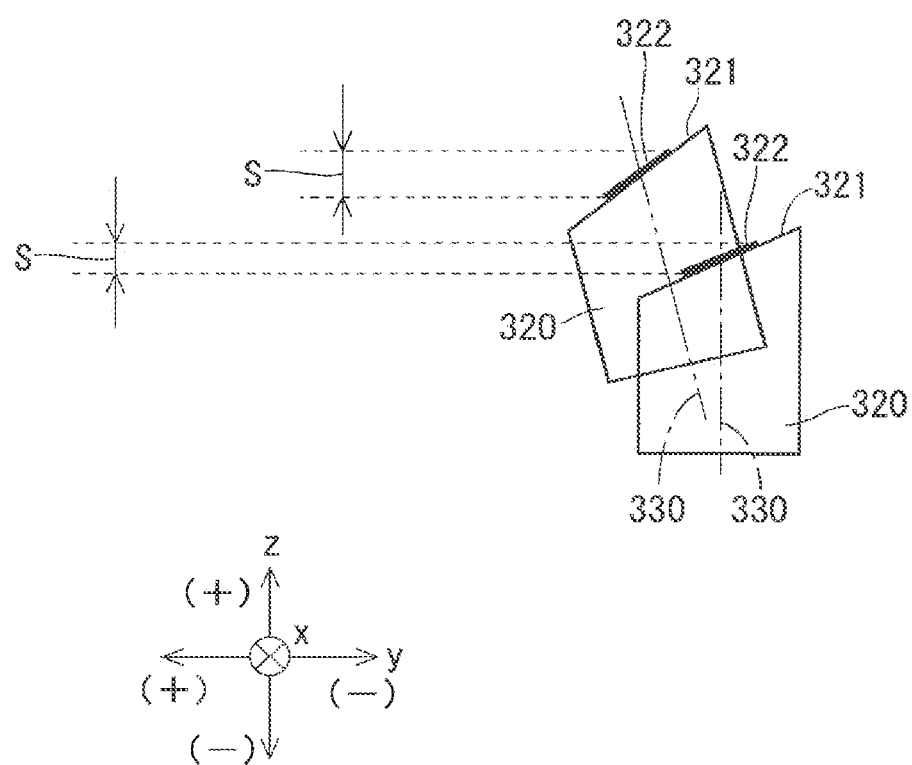
FIG. 44 is a schematic view illustrating an example of the state in which the apparent focal size changes.

FIG. 44 is a schematic diagram illustrating an example of the state in which the apparent focal size S changes according to the movement of the X-ray generation source 126 along the axial direction of the ball screw 510. In FIG. 44, the anode 320 of the X-ray generation source 126 in FIG. 41 is illustrated on the lower side, and the anode 320 of the X-ray generation source 126 in FIG. 42 is illustrated on the upper side. As illustrated in FIG. 44, also in the example, the apparent focal size S increases according to the rise of the X-ray generation source 126. On the other hand, the apparent focal size S decreases according to the descent of the X-ray generation source 126.

As described above, the moving unit 136A can move the X-ray generation source 126 along the direction between the +z-direction and the +y-direction. Consequently, the moving unit 136 can reduce the distance between the X-ray generation source 126 and the X-ray detector 226 when the X-ray generation source 126 is located on the +z-side, and the moving unit 136A can increase the distance between the X-ray generation source 126 and the X-ray detector 226 when the X-ray generation source 126 is located on the −z-side. When the distance between the X-ray generation source 126 and the X-ray detector 226 increases due to the separation of the X-ray generation source 126 from the X-ray detector 226, the magnification ratio of the X-ray imaging decreases, and as a result, the imaging resolution is improved. As illustrated in FIG. 24, in the case where the spread in the z-direction of the X-ray cone beam BX is decreased when the X-ray generation source 126 is located on the −z-side, the distance between the X-ray generation source 126 and the X-ray detector 226 is increased when the X-ray generation source 126 is located on the −z-side, so that the magnification ratio can be decreased when the spread in the z-direction of the X-ray cone beam BX is small. Accordingly, the imaging resolution can be improved when the imaging target region TG is small. That is, the X-ray imaging of the small imaging target region TG can be performed with the high definition.

As can be understood from the above description, the imaging body 120 can change the magnification ratio in the X-ray imaging by approaching and separating the X-ray generation source 126 to and from the head P. Consequently, the imaging resolution can be easily changed by approaching and separating the X-ray generation source 126 to and from the head P.

Figure 45:
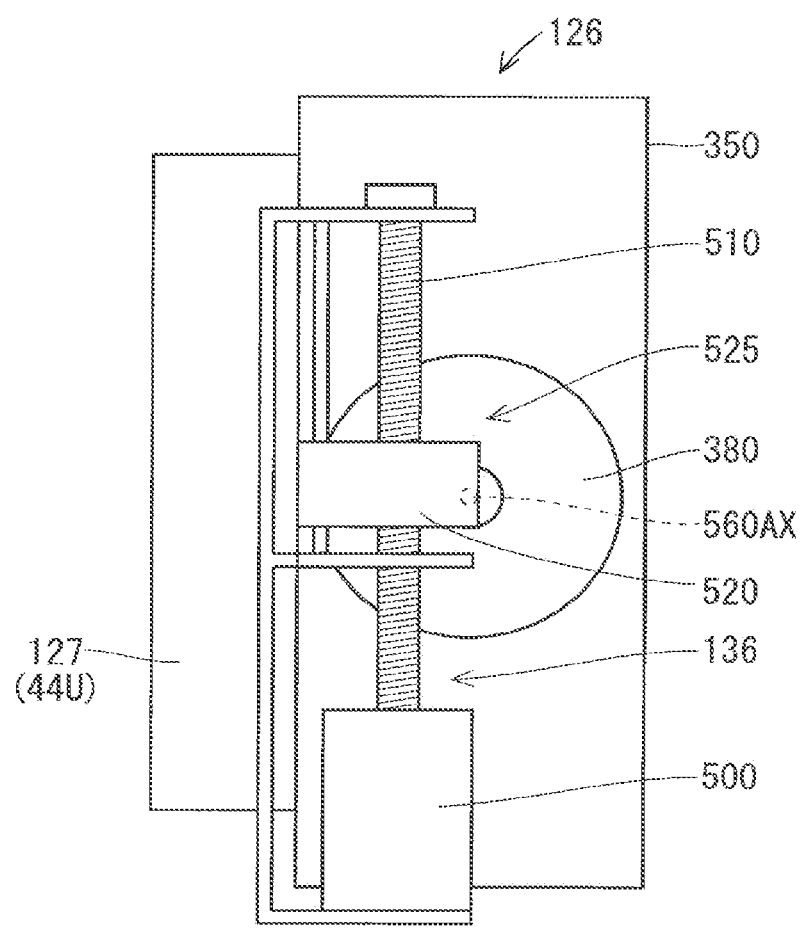
FIG. 45 is a schematic diagram illustrating a configuration example of the X-ray generation source moving unit.
Figure 45:
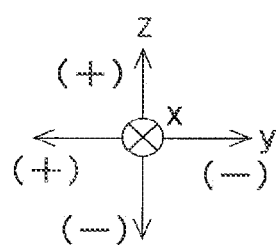

In the above example, the X-ray beam forming unit 127 (X-ray beam forming unit 44U) is not fixed to the X-ray generation source 126, but may be fixed to the X-ray generation source 126. FIG. 45 is a view illustrating an example of the state in which the X-ray beam forming unit 127 is fixed to the X-ray generation source 126. For example, the X-ray beam forming unit 127 is fixed to the case 350 of the X-ray generation source 126. FIG. 45 illustrates the state in which the X-ray beam forming unit 127 is fixed to the X-ray generation source 126 in the examples of FIGS. 6 and 7. The X-ray beam forming unit 127 may be fixed to the X-ray generation source 126 in the examples of FIGS. 8 and 9, and the X-ray beam forming unit 127 may be fixed to the X-ray generation source 126 in the examples of FIGS. 41 and 42. When the X-ray beam forming unit 127 is fixed to the X-ray generation source 126, the X-ray beam forming unit 127 also moves similarly to the movement of the X-ray generation source 126. When the posture of the X-ray generation source 126 changes as in the examples of FIGS. 6, 9, 41, 42, the posture of the X-ray beam forming unit 127 also changes similarly to the posture change of the X-ray generation source 126.

As described above, the X-ray imaging apparatus according to the present disclosure can be expressed as follows.

An X-ray imaging apparatus according to a first aspect includes: a head holder that holds a head of a subject; an X-ray generation apparatus that includes an X-ray generator generating an X-ray and a shield forming the X-ray into an X-ray beam, the X-ray generation apparatus irradiating the head held by the head holder with the X-ray beam; an X-ray detection apparatus that includes an X-ray detector receiving and detecting the X-ray beam transmitted through the head; a supporter that supports the X-ray generation apparatus and the X-ray detection apparatus such that the X-ray generation apparatus and the X-ray detection apparatus are opposite to each other with the head interposed therebetween; a supporter driving motor that relatively moves the supporter with respect to the subject while the head is sandwiched between the X-ray generation apparatus and the X-ray detection apparatus; and an X-ray generator driving motor that moves the X-ray generator with respect to the X-ray detector. When an apparatus vertical direction is determined such that an upper side of the head is determined as an apparatus upper side while a lower side of the head is determined as an apparatus lower side, the supporter driving motor moves the supporter such that the X-ray generation apparatus and the X-ray detection apparatus turn around an axis extending in a direction parallel to the apparatus vertical direction and around the head, and the X-ray generator driving motor relatively moves the X-ray generator with respect to the X-ray detector in the apparatus vertical direction, and is configured to increase spread in the apparatus vertical direction of the X-ray beam when the X-ray generator is located on the apparatus upper side, and to decrease a spread in the apparatus vertical direction of the X-ray beam when the X-ray generator located on the apparatus lower side.

A second aspect is the X-ray imaging apparatus according to the first aspect, in which the X-ray generation apparatus includes a first casing that accommodates the X-ray generator and extends from the supporter to the apparatus lower side, the X-ray detection apparatus includes a second casing that accommodates the X-ray detector and extends from the supporter to the apparatus lower side, and the X-ray generator driving motor moves the X-ray generator in the apparatus vertical direction in the first casing.

A third aspect is the X-ray imaging apparatus of the second aspect, in which a bottom portion of the X-ray detector is disposed in a bottom portion of the second casing.

A fourth aspect is the X-ray imaging apparatus according to the third aspect, in which a detection surface of the X-ray detector includes an irradiation region irradiated with the X-ray beam, and the shield sets a position of an end of the X-ray beam on the apparatus upper side in the irradiation region when a spread in the apparatus vertical direction of the X-ray beam is small to a position lower than that when a spread in the apparatus vertical direction of the X-ray beam is large.

A fifth aspect is the X-ray imaging apparatus of the fourth aspect, in which the shield sets a position of an end of the X-ray beam on the apparatus lower side in the irradiation region when a spread in the apparatus vertical direction of the X-ray beam is small to the same position as that when a spread in the apparatus vertical direction of the X-ray beam is large.

A sixth aspect is the X-ray imaging apparatus according to any one of the first to fifth aspects, in which the shield partially shields the X-ray generated from the X-ray generator to form a passage region, the X-ray passing through the passage region is formed in the X-ray beam, and according to a movement of the X-ray generator toward the apparatus upper side by the X-ray generator driving motor, the shield increases a spread in the apparatus vertical direction of the passage region, thereby increasing a spread in the apparatus vertical direction of the X-ray beam.

A seventh aspect is the X-ray imaging apparatus according to any one of the first to sixth aspects, in which the X-ray beam is an X-ray cone beam, and X-ray CT imaging is performed by irradiating the head with the X-ray cone beam while the X-ray generation apparatus and the X-ray detection apparatus are turned.

An eighth aspect is the X-ray imaging apparatus of the seventh aspect, in which a focal point of the X-ray generator turns around the head according to turning of the X-ray generation apparatus and the X-ray detection apparatus, a turning plane is formed by a turning orbit of the focal point, and the shield forms the X-ray cone beam such that an X-ray component on the turning plane is included in an X-ray flux incident on the detection surface of the X-ray detector from the focal point.

A ninth aspect is the X-ray imaging apparatus of the eighth aspect, in which the shield forms the X-ray cone beam such that a center beam of the X-ray cone beam is parallel to the turning plane.

A tenth aspect is the X-ray imaging apparatus according to any one of the seventh to ninth aspects, in which when an axial direction of an axis extending in a direction parallel to the apparatus vertical direction is set to a vertical direction, the shield regulates the X-ray such that the center beam of the X-ray cone beam passes in a plane orthogonal to the vertical direction, thereby performing horizontal irradiation of the X-ray cone beam.

An eleventh aspect is the X-ray imaging apparatus according to any one of the first to tenth aspects, in which the X-ray generator driving motor is configured to move the X-ray generator close to and away from the X-ray detector, a distance between the X-ray generator and the X-ray detector is set small when the X-ray generator is located on the apparatus upper side, and a distance between the X-ray generator and the X-ray detector is large when the X-ray generator is located on the apparatus lower side.

A twelfth aspect is the X-ray imaging apparatus according to any one of the first to eleventh aspects, in which the X-ray generator includes a cathode and an anode that are opposite to each other, the anode includes an inclined surface inclined with respect to an axis line connecting the cathode and the anode, the X-ray is emitted lateral to the axis line from the inclined surface, and the X-ray generation apparatus includes the X-ray generator such that one of the cathode and the anode is disposed on the apparatus upper side while the other of the cathode and the anode is disposed on the apparatus lower side, and such that an emission direction of the X-ray emitted from the inclined surface is directed to the X-ray detector.

A thirteenth aspect is the X-ray imaging apparatus of the twelfth aspect, in which the X-ray generation apparatus includes the X-ray generator such that the cathode is disposed on the apparatus upper side and such that the anode is disposed on the apparatus lower side.

A fourteenth aspect is the X-ray imaging apparatus of the twelfth or thirteenth aspect, in which when a direction orthogonal to the apparatus vertical direction is set to an apparatus horizontal direction, the X-ray generator driving motor drives the X-ray generator such that an apparent size of a focal point of the X-ray generator viewed in the apparatus horizontal direction from the X-ray detector side becomes large in the apparatus vertical direction when a spread in the apparatus vertical direction of an imaging target region in the head is large, and drives the X-ray generator such that the apparent size of the focal point viewed in the apparatus horizontal direction from the X-ray detector side becomes small in the apparatus vertical direction then a spread in the apparatus vertical direction of the imaging target region is small.

A fifteenth aspect is the X-ray imaging apparatus according to any one of the twelfth to fourteenth aspects, in which the X-ray beam is air X-ray cone beam, and the X-ray generator driving motor drives the X-ray generator such that an angle formed by the axis line and a center beam of the X-ray cone beam decreases according to an expansion of a spread in the apparatus vertical direction of the X-ray beam according to a movement of the X-ray generator toward the apparatus upper side by the X-ray generator driving motor.

A sixteenth aspect is the X-ray imaging apparatus according to any one of the first to fifteenth aspects, in which the supporter driving motor relatively changes a position of the supporter with respect to the head according to at least one of a position and a range of an imaging target region in the head.

A seventeenth aspect is the X-ray imaging apparatus according to any one of the first to sixteenth aspects, in which the X-ray generator driving motor moves the X-ray generator according to at least one of a position and a range of the imaging target region in the head to change a position of a focal point of the X-ray generator.

An eighteenth aspect is the X-ray imaging apparatus according to any one of the first to seventeenth aspects further including an X-ray detection apparatus driving motor that moves the X-ray detection apparatus close to and away from the X-ray generation apparatus.

A nineteenth aspect is the X-ray imaging apparatus according to any one of the first to eighteenth aspects, in which a magnification ratio is changed in the X-ray imaging by approaching and separating at least one of the X-ray detector and the X-ray generator to and from the head.

Although the X-ray imaging apparatus is described in detail, the above description is illustrative in all aspects, but the disclosure is not limited thereto. In addition, the various modifications described above can be applied in combination as long as they do not contradict each other. Innumerable modifications not illustrated can be envisaged without departing from the scope of the present disclosure.

EXPLANATION OF REFERENCE SIGNS

110: X-ray imaging apparatus
124: support
125: X-ray generation unit
126: X-ray generation source
127: X-ray beam forming unit
128, 228: extending unit
130: drive mechanism
136, 136A: X-ray generation source moving unit
117: X-ray detection unit moving unit
225: X-ray detection unit
226: X-ray detector
226a: detection surface
226aa: irradiation region
310: cathode
320: anode
445: opening (passage region)
443: shielding portion BX: X-ray cone beam.
CB: center beam
P: head portion
PD: subject
S: apparent focal size

The invention claimed is:

1. An X-ray imaging apparatus comprising:
a head holder that holds a head of a subject;
an X-ray generation apparatus that includes an X-ray generator generating an X-ray and a shield forming the X-ray into an X-ray beam, the X-ray generation apparatus irradiating the head held by the head holder with the X-ray beam;
an X-ray detection apparatus that includes an X-ray detector receiving and detecting the X-ray beam transmitted through the head;
a supporter that supports the X-ray generation apparatus and the X-ray detection apparatus such that the X-ray generation apparatus and the X-ray detection apparatus are opposite to each other with the head interposed therebetween;
a supporter driving motor that relatively moves the supporter with respect to the subject while the head is sandwiched between the X-ray generation apparatus and the X-ray detection apparatus; and
an X-ray generator driving motor that moves the X-ray generator with respect to the X-ray detector,
wherein when an apparatus vertical direction is determined such that an upper side of the head is determined as an apparatus upper side while a lower side of the head is determined as an apparatus lower side,
the supporter driving motor moves the supporter such that the X-ray generation apparatus and the X-ray detection apparatus turn around an axis extending in a direction parallel to the apparatus vertical direction and around the head, and
the X-ray generator driving motor relatively moves the X-ray generator with respect to the X-ray detector in the apparatus vertical direction, and is configured to increase a spread in the apparatus vertical direction of the X-ray beam when the X-ray generator is located on the apparatus upper side, and to decrease the spread in the apparatus vertical direction of the X-ray beam when the X-ray generator is located on the apparatus lower side,
wherein
the X-ray generator includes a cathode and an anode that are opposite to each other,
the anode includes an inclined surface inclined with respect to an axis line connecting the cathode and the anode,
the X-ray is emitted lateral to the axis line from the inclined surface,
the X-ray generation apparatus includes the X-ray generator such that one of the cathode and the anode is disposed on the apparatus upper side while the other of the cathode and the anode is disposed on the apparatus lower side, and such that an emission direction of the X-ray emitted from the inclined surface is directed to the X-ray detector,
wherein when a direction orthogonal to the apparatus vertical direction is set to an apparatus horizontal direction and an apparent size of a focal point of the X-ray generator viewed in the apparatus horizontal direction from a X-ray detector side is set to a focal size, the X-ray generator driving motor moves the X-ray generator toward the apparatus upper side and changes a posture of the X-ray generator according to a movement of the X-ray generator toward the apparatus upper side such that the focal size becomes large in the apparatus vertical direction, and moves the X-ray generator toward the apparatus lower side and changes the posture according a movement of the X-ray generator toward the apparatus lower side such that the focal size becomes small in the apparatus vertical direction, when a spread in the apparatus vertical direction of an imaging target region in the head is large, the X-ray generator driving motor moves the X-ray generator toward the apparatus upper side such that the focal size becomes large in the apparatus vertical direction, and when a spread in the apparatus vertical direction of the imaging target region is small, the X-ray generation driving motor moves the X-ray generator toward the apparatus lower side such that the focal size becomes small in the apparatus vertical direction.

2. The X-ray imaging apparatus according to claim 1, wherein
the X-ray generation apparatus includes a first casing that accommodates the X-ray generator and extends from the supporter to the apparatus lower side,
the X-ray detection apparatus includes a second casing that accommodates the X-ray detector and extends from the supporter to the apparatus lower side, and the X-ray generator driving motor moves the X-ray generator in the apparatus vertical direction in the first casing.

3. The X-ray imaging apparatus according to claim 2, wherein a bottom portion of the X-ray detector is disposed in a bottom portion of the second casing.

4. The X-ray imaging apparatus according to claim 3, wherein
a detection surface of the X-ray detector includes an irradiation region irradiated with the X-ray beam, and
the shield sets a position of an end of the X-ray beam on the apparatus upper side in the irradiation region when the spread in the apparatus vertical direction of the X-ray beam is small to a position lower than that when the spread in the apparatus vertical direction of the X-ray beam is large.

5. The X-ray imaging apparatus according to claim 4, wherein the shield sets a position of an end of the X-ray beam on the apparatus lower side in the irradiation region when the spread in the apparatus vertical direction of the X-ray beam is small to the same position as that when the spread in the apparatus vertical direction of the X-ray beam is large.

6. The X-ray imaging apparatus according to claim 1, wherein
the shield partially shields the X-ray generated from the X-ray generator to form a passage region,
the X-ray passing through the passage region is formed in the X-ray beam, and
according to a movement of the X-ray generator toward the apparatus upper side by the X-ray generator driving motor, the shield increases a spread in the apparatus vertical direction of the passage region, thereby increasing the spread in the apparatus vertical direction of the X-ray beam.

7. The X-ray imaging apparatus according to claim 1, wherein
the X-ray beam is an X-ray cone beam, and
X-ray CT imaging is performed by irradiating the head with the X-ray cone beam while the X-ray generation apparatus and the X-ray detection apparatus are turned.

8. The X-ray imaging apparatus according to claim 7, wherein
a focal point of the X-ray generator turns around the head according to turning of the X-ray generation apparatus and the X-ray detection apparatus,
a turning plane is formed by a turning orbit of the focal point, and
the shield forms the X-ray cone beam such that an X-ray component on the turning plane is included in an X-ray flux incident on a detection surface of the X-ray detector from the focal point.

9. The X-ray imaging apparatus according to claim 8, wherein the shield forms the X-ray cone beam such that a center beam of the X-ray cone beam is parallel to the turning plane.

10. The X-ray imaging apparatus according to claim 7, wherein when an axial direction of an axis extending in a direction parallel to the apparatus vertical direction is set to a vertical direction, the shield regulates the X-ray such that a center beam of the X-ray cone beam passes in a plane orthogonal to the vertical direction, thereby performing horizontal irradiation of the X-ray cone beam.

11. The X-ray imaging apparatus according to claim 1, wherein
the X-ray generator driving motor is configured to move the X-ray generator close to and away from the X-ray detector,
a distance between the X-ray generator and the X-ray detector is set small when the X-ray generator is located on the apparatus upper side, and
the distance between the X-ray generator and the X-ray detector is large when the X-ray generator is located on the apparatus lower side.

12. The X-ray imaging apparatus according to claim 1, wherein the X-ray generation apparatus includes the X-ray generator such that the cathode is disposed on the apparatus upper side and such that the anode is disposed on the apparatus lower side.

13. The X-ray imaging apparatus according to claim 1, wherein
the X-ray beam is an X-ray cone beam, and
the X-ray generator driving motor drives the X-ray generator such that an angle formed by the axis line and a center beam of the X-ray cone beam decreases according to an expansion of a spread in the apparatus vertical direction of the X-ray beam according to a movement of the X-ray generator toward the apparatus upper side by the X-ray generator driving motor.

14. The X-ray imaging apparatus according to claim 1, wherein the supporter driving motor relatively changes a position of the supporter with respect to the head according to at least one of a position and a range of an imaging target region in the head.

15. The X-ray imaging apparatus according to claim 1, wherein the X-ray generator driving motor moves the X-ray generator according to at least one of a position and a range of an imaging target region in the head to change a position of a focal point of the X-ray generator.

16. The X-ray imaging apparatus according to claim 1, further comprising an X-ray detection apparatus driving motor that moves the X-ray detection apparatus close to and away from the X-ray generation apparatus.

17. The X-ray imaging apparatus according to claim 1, wherein a magnification ratio is changed in the X-ray imaging by approaching and separating at least one of the X-ray detector and the X-ray generator to and from the head.

\* \* \* \* \*